United States Patent
Frisch et al.

(10) Patent No.: US 9,625,588 B2
(45) Date of Patent: *Apr. 18, 2017

(54) USE OF FLAT PANEL MICROCHANNEL PHOTOMULTIPLIERS IN SAMPLING CALORIMETERS WITH TIMING

(71) Applicants: The University of Chicago, Chicago, IL (US); Minotech Engineering, Inc., Andover, MA (US)

(72) Inventors: Henry Frisch, Chicago, IL (US); Fukun Tang, Chicago, IL (US); Herve Grabas, Louvecienne (FR); Eric J. Oberla, Chicago, IL (US); Michael Minot, Andover, MA (US)

(73) Assignees: The University of Chicago, Chicago, IL (US); Minotech Engineering, Inc., Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/982,387

(22) Filed: Dec. 29, 2015

(65) Prior Publication Data

US 2016/0116605 A1    Apr. 28, 2016

Related U.S. Application Data

(63) Continuation of application No. 14/090,647, filed on Nov. 26, 2013, now Pat. No. 9,244,180, which is a continuation of application No. 13/044,442, filed on Mar. 9, 2011, now Pat. No. 8,604,440.

(60) Provisional application No. 61/339,865, filed on Mar. 9, 2010, provisional application No. 61/464,749, filed on Mar. 8, 2011.

(51) Int. Cl.
G01T 1/20 (2006.01)
G01T 1/208 (2006.01)
G01T 1/36 (2006.01)
G01T 1/29 (2006.01)

(52) U.S. Cl.
CPC .......... *G01T 1/208* (2013.01); *G01T 1/2928* (2013.01); *G01T 1/2985* (2013.01); *G01T 1/363* (2013.01)

(58) Field of Classification Search
CPC ... G01T 1/1642; G01T 1/1644; G01T 1/2018; G01T 1/20; G01T 1/204
See application file for complete search history.

(56) References Cited

U.S. PATENT DOCUMENTS 9,244,180 B2 * 1/2016 Frisch .................. G01T 1/208

* cited by examiner

*Primary Examiner* — David Porta
*Assistant Examiner* — Mamadou Faye
(74) *Attorney, Agent, or Firm* — Bell & Manning, LLC

(57) ABSTRACT

Large-area, flat-panel photo-detectors with sub-nanosecond time resolution based on microchannel plates are provided. The large-area, flat-panel photo-detectors enable the economic construction of sampling calorimeters with, for example, enhanced capability to measure local energy deposition, depth-of-interaction, time-of-flight, and/or directionality of showers. In certain embodiments, sub-nanosecond timing resolution supplies correlated position and time measurements over large areas. The use of thin flat-panel viewing radiators on both sides of a radiation-creating medium allows simultaneous measurement of Cherenkov and scintillation radiation in each layer of the calorimeter. The detectors may be used in a variety of applications including, for example, medical imaging, security, and particle and nuclear physics.

15 Claims, 37 Drawing Sheets

DETAIL A

DETAIL B

ALL DIMENSIONS IN INCHES
SUPER - MODULE

GLASS SPACER DETAILS
3.0mm Dia
+ 0.30mm - 00

REV A MINOR TCL CHANGES
3.0mm Dia
+ 0.30mm - 00

0.50 mm + 0.05 mm
- 0.04mm

MATERIAL - B33 OR B270
3.00 mm + 0.05 mm
- 0.04mm

| Detector head spacing | Energy window | Scanner configuration | | | |
|---|---|---|---|---|---|
| | | (a) | (b) | (c) | (d) |
| 4 cm | 250-750 | - | 18.64% | 14.30% | 14.30% |
| | 350-750 | - | 16.79% | 12.30% | 12.30% |
| | 450-750 | - | 15.58% | 11.37% | 11.37% |
| 6 cm | 250-750 | - | 12.67% | 9.98% | 9.98% |
| | 350-750 | - | 11.46% | 8.61% | 8.61% |
| | 450-750 | - | 10.58% | 7.97% | 7.97% |
| 8 cm (8.13 cm for (a)) | 250-750 | 9.28% | 9.16% | 7.44% | 7.44% |
| | 350-750 | 8.01% | 8.24% | 6.40% | 6.40% |
| | 450-750 | 7.34% | 7.69% | 5.96% | 5.96% |

FIG. 24

| SOURCE CONFIGURATION | MOUSE | | | | | RAT | | | |
|---|---|---|---|---|---|---|---|---|---|
| | (A) | (B) | (C) | | (D) | (A) | (B) | (C) | | (D) |
| SOURCE POSITION | CENTER | CENTER | CENTER | 40.6mm OFFSET | CENTER | CENTER | CENTER | CENTER | 40.6mm OFFSET | CENTER |
| 4cm SPACING | - | 10.64% | 7.53% | 5.85% | 10.66% | - | 5.04% | 3.65% | 2.27% | 8.16% |
| 6cm SPACING | - | 6.90% | 4.98% | 3.59% | 7.14% | - | 3.45% | 2.39% | 1.72% | 5.41% |
| 8cm SPACING | 4.49% | 4.85% | 3.64% | 2.41% | - | 2.07% | 2.39% | 1.63% | 1.17% | - |

*FIG. 25*

| SPACING | ENERGY INDEX | MOUSE | | | | RAT | | | |
|---|---|---|---|---|---|---|---|---|---|
| | | (A) | (B) | (C) | (D) | (A) | (B) | (C) | (D) |
| 4cm | 250-750 | - | 14.58% | 14.78% | 16.52% | - | - | - | - |
| | 350-750 | - | 10.66% | 10.52% | 11.87% | - | - | - | - |
| | 450-750 | - | 4.68% | 4.58% | 5.23% | - | - | - | - |
| 6cm | 250-750 | - | 12.98% | 13.95% | 15.34% | - | 29.61% | 31.52% | 32.12% |
| | 350-750 | - | 9.99% | 10.15% | 11.34% | - | 22.03% | 22.15% | 23.65% |
| | 450-750 | - | 4.53% | 4.33% | 5.19% | - | 10.16% | 9.82% | 10.88% |
| 8cm (8.13cm FOR (A)) | 250-750 | 15.76% | 11.38% | 12.87% | 13.87% | 36.32% | 27.20% | 30.36% | 29.53% |
| | 350-750 | 10.25% | 9.23% | 9.55% | 10.63% | 24.07% | 20.41% | 20.96% | 22.16% |
| | 450-750 | 4.23% | 4.36% | 4.17% | 4.99% | 9.74% | 9.28% | 9.22% | 10.25% |

*FIG. 26*

|  | | (B) | (C) | (D) |
|---|---|---|---|---|
| MOUSE | 4cm/6cm | 1.47 | 1.44 | 1.38 |
|  | 4cm/8cm | 2.04 | 1.99 | 1.81 |
|  | 4cm/(A) | 2.10 | 1.51 | 1.64 |
| RAT | 6cm/8cm | 1.37 | 1.37 | 1.36 |
|  | 6cm/(A) | 1.46 | 1.06 | 2.04 |

USE OF FLAT PANEL MICROCHANNEL PHOTOMULTIPLIERS IN SAMPLING CALORIMETERS WITH TIMING

REFERENCE TO RELATED APPLICATIONS

This application is a continuation of U.S. application Ser. No. 14/090,647 that was filed Nov. 26, 2013, which is a continuation of U.S. application Ser. No. 13/044,442 (now U.S. Pat. No. 8,604,440), which claims priority to U.S. Provisional Application No. 61/339,865 that was filed Mar. 9, 2010, and to U.S. Provisional Application No. 61/464,749, entitled "Use of Flat Panel Microchannel Photomultipliers in Sampling calorimeters with Timing", that was filed Mar. 8, 2011, all of which are incorporated by reference herein in their entirety.

GOVERNMENT LICENSE RIGHTS

This invention was made with Government support under Grant Numbers NSF-PHY-0757-196 and DOE-DE-SC0002015. The Government may have certain rights to this invention.

BACKGROUND

In typical sampling calorimeters, the amount of light created by an incoming particle, such as a gamma ray from PET, or a high-energy electron from an accelerator beam, is proportional to the energy of the particle. Typically, the light is then turned into an electrical signal whose total charge is proportional to the amount of light.

The detection of energetic radiation such as gamma rays, neutrons, and charged particles depends on their interaction with matter, in particular the energy the radiation deposits inside material. For energetic radiation, the amount of material needed in the path of the particle for a measurement of the energy of the particle (gamma, neutron, or charged) depends on the energy and type of the particle. Detectors that measure the total energy of particles typically contain all the energy deposited along the path of the particle, necessitating a detector with substantial depth, and therefore a large volume. For detectors that cover a large area, the requirement of substantial depth to contain all the energy results in a large detector mass, and typically thus a large cost.

Medical imaging cameras such as those used in Positron Emission Tomography (PET), Single photon emission computed tomography (SPECT, or less commonly, SPET), Scintigraphy, or other nuclear medicine tomographic imaging techniques use dense crystals or glass to measure the position and energy of gamma rays emerging from the subject, allowing reconstruction of tumors and other pathologies. The spatial resolution is typically limited by the position resolution of the detector arrays, scattering, blurring due to depth-of-interaction uncertainty, and limited signal-to-noise due to the 2-dimensional nature of the recorded information.

Sampling calorimeter radiation detectors, commonly called calorimeters, are also used for energy measurements of high-energy particles such as electrons, photons, protons, neutrons, and mesons. However both spatial and time resolutions are typically limited by the granularity of the construction geometry, which is constrained by the problem of getting the light produced by the radiation inside the detector out to the photo-detectors and the electronics.

SUMMARY

Large-area, flat-panel photo-detectors with sub-nanosecond time resolution based on microchannel plates are provided. The large-area, flat-panel photo-detectors enable the economic construction of sampling calorimeters with, for example, enhanced capability to measure local energy deposition, depth-of-interaction, time-of-flight, and/or directionality of showers. In certain embodiments, sub-nanosecond timing resolution supplies correlated position and time measurements over large areas. In certain embodiments, the use of thin flat-panel viewing radiators on both sides of a radiation-creating medium allows simultaneous measurement of Cherenkov and scintillation radiation in each layer of the calorimeter. Applications of certain embodiments of the method include, for example, medical imaging, security, and particle and nuclear physics.

The detector may include a substantially planar slab of radiation-creating material, and at least one substantially planar photodetector, wherein the substantially planar photodetector comprises a photocathode, at least one microchannel plate and one or more transmission line anodes. For example, the detector may include multiple planar photodetectors located on opposite faces of the planar slab of radiation-creating material, where each of the photodetectors includes a photocathode, at least one microchannel plate and one or more transmission line anodes. As another example, the detector may include multiple planar slabs of radiation creating material, with the planar photodetectors interleaved between the planar slabs of radiation creating material. The radiation-creating material may include a scintillator, a crystal, a Cherenkov radiator, or the like.

The one or more transmission line anodes in the photodetector may include a plurality of transmission line anodes, with each of the transmission line anodes being parallel to one another. The detector may further include sampling electronic circuitry at both ends of each transmission line, and an additional electronic circuit connected to the sampling electronic circuitry that is capable of determining the distance along the transmission line anode at which electron collisions with the transmission line anode occur.

In one aspect, the planar photodetector is thinner than the planar slab of radiation creating material (such as is thinner than half the thickness of the planar slab of radiation creating material).

The detector may be part of a detector system that includes a first detector and a second detector (or more than two detectors, such as four detectors). The second detector may be configured to face the first detector and on an opposite side of a sample holder from the first detector, and electronic circuitry may further be included in the detector system, the electronic circuitry connected to the first detector and the second detector and configured to detect a pair of correlated gamma rays resulting from presence of a positron-emitting radionuclide in a sample. The first and second detectors in the detector system may be configured to be moved relative to one another by a user into a plurality of configurations, and wherein the plurality of configurations may differ from one another in their field of view.

In certain embodiments, the invention comprises a PET instrument comprising two planar detectors configured to be moved relative to one another by a user into a plurality of configurations, wherein the plurality of configurations differ from one another in their field of view. In certain embodiments, the invention comprises a PET system comprising a substantially planar slab of radiation-creating material, a first substantially planar photodetector, wherein the substantially planar photodetector comprises a photocathode, at least one microchannel plate and one or more transmission line anodes. In certain embodiments, the invention comprises a PET instrument comprising two planar detectors configured to be moved relative to one another by a user into a plurality of configurations, wherein the plurality of configurations differ from one another in their field of view. In certain embodiments, the configurable PET system comprises at least one substantially planar photodetector, wherein the at least one substantially planar photodetector comprises a photocathode, at least one microchannel plate and one or more transmission line anodes. In certain embodiments, the configurable PET system comprises at least two of the planar detectors that form a stack. In certain embodiments, the configurable PET system comprises at least two planar detectors that are configured to move relative to one another into at least four configurations, wherein the four configurations differ from one another in their field of view.

In certain embodiments of the invention, the detector has a surface area that is greater than 25, 36, 49, or 64 square inches.

In certain embodiments, the invention comprises a first substantially planar photodetector, a substantially planar slab of radiation-creating material, a substantially planar photodetector wherein the substantially planar photodetector comprises a photocathode, at least one microchannel plate and one or more transmission line anodes and a standard electronic connector. In certain embodiments, the standard electronic connector, for example, conforms to Underwriters Laboratories standards. In certain embodiments, the standard electronic connector makes the invention more easily sold as an OEM part and more readily connected into a manufacturer's existing system, for example a manufacturer selling PET imaging systems. PET is described in, for example, U.S. Pat. No. 7,381,959 and U.S. Pat. No. 7,750,311, incorporated by reference herein in its entirety.

In certain embodiments, the invention comprises a detector for detecting a particle or ionizing radiation comprising: a charge emitter for emitting charge in response to receiving the particle or ionizing radiation; an anode comprising a plurality of linear conduits for receiving the emitted charge and transmitting the charge; and circuitry in communication with the anode at each end of each conduit for sensing the emitted charge on the anode and calculating the time, location and depth within the charge emitter at which the particle was received.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

FIGS. 15A-F show a typical "SuperModule" layout of 6 MCP-PMT-TL detector tiles in a 3×2 array, forming a unit with a photo-sensitive area of 24"×16". The tiles may be fastened with an adhesive, including but not limited to, a light glue or double-sticky tape, onto a "Tray" that contains the bottom anode strip lines, which run the length of the tray. On each end of the bottom anode substrate a printed-circuit card (the "Analog Card") contains twenty 4-channel Psec ASICs. The analog card is soldered onto the anode substrate, picking up and continuing the anode strips directly into the 50-ohm inputs of the front-end ASICs. A "Digital Card" that contains the FPGA for front-end control and data-reduction, a jitter-cleaner chip, and the optical fiber interface, is situated on the backside of the honeycomb support structure.

FIG. 24 shows a table listing the predicted central sensitivities of scanners configured according to the geometries shown in FIG. 23, particularly with the detector head spacing and energy window parameters listed here.

FIG. 25 shows a table listing the predicted sensitivities for 7 cm (mouse) and 15 cm (rat) line sources placed at the center of the scanner or 40.6 mm offset from the center using a 450-750 keV energy window. The scanner configurations (a), (b), and (c) are as described in FIG. 23.

FIG. 26 shows a table listing the predicted scatter fractions of scanners configured according to the geometries shown in FIG. 23, particularly with the detector head spacing and energy window parameters listed here.

FIG. 27 shows a table with the noise-equivalent count rates (NECR) ratios.

FIG. 31A illustrates the top anode pattern, showing the transmission lines interconnected to allow for a continuous smooth hermetic sealing of the photodetector. FIG. 31B illustrates the bottom anode pattern, showing the independent transmission lines available for signal waveform sampling readout.

DETAILED DESCRIPTION

As discussed in the background, both spatial and time resolutions are typically limited by the granularity of the construction geometry, which is constrained by the problem of getting the light produced by the radiation inside the detector out to the photo-detectors and the electronics. The development of planar, large-area, thin photo-detectors allows solving this fundamental problem, allowing new detector designs for, for example, scientific, security, and medical imaging applications.

Figure 2:
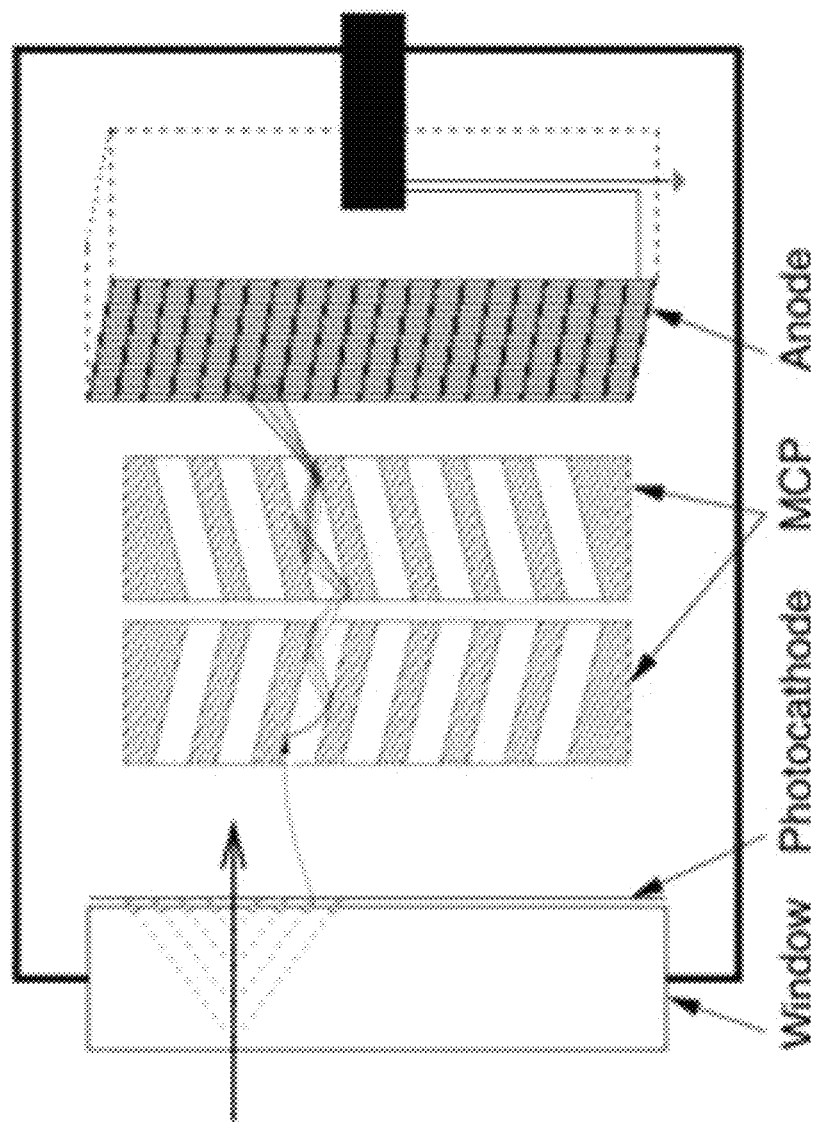
FIG. 2 is a schematic drawing of an MCP-PMT. The drawing shows a photo-cathode on the inside of the front window to absorb photons and emit electrons, an amplification section to amplify these initial photo-electrons, and a micro-strip, or transmission line anode to collect the charge that constitutes the electrical signal.
Figure 3A:
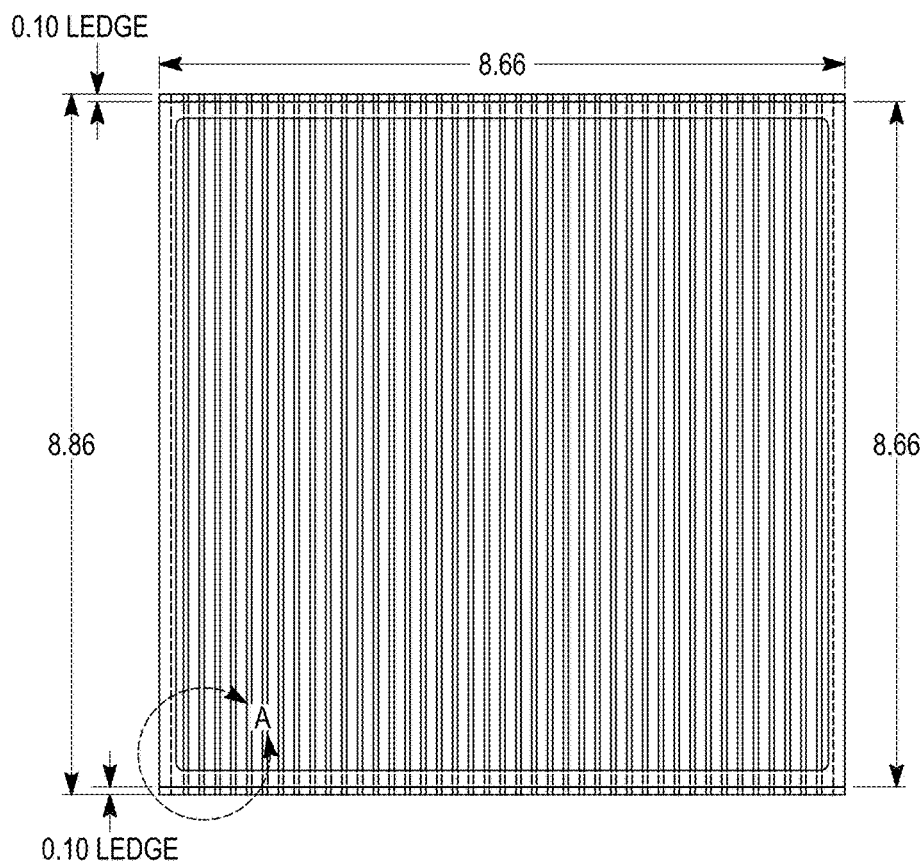
FIGS. 3A-F are an anode plane with transmission lines. The waveform at each end of each transmission line can be digitized by, for example, a multi-channel custom application-specific integrated circuit (ASIC), sampling at a rate such that the leading edge of the waveform and the length of the pulse are sampled many times.
Figure 3B:
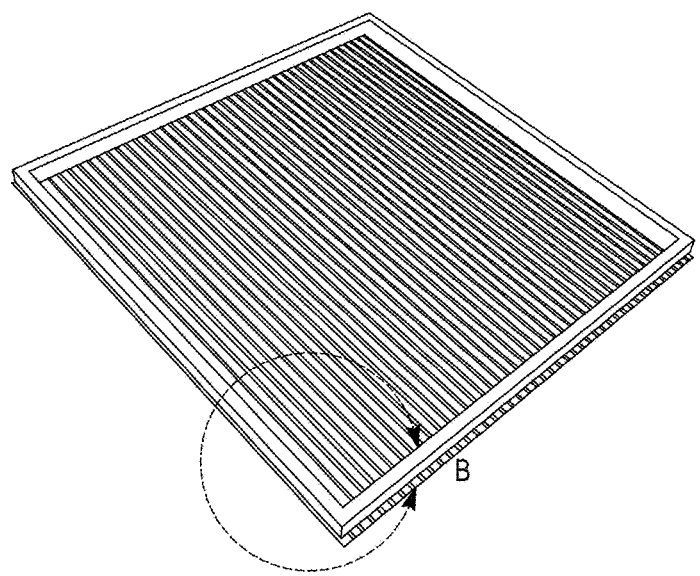
Figure 3C:
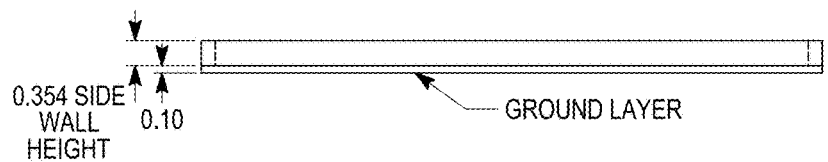
Figure 3D:
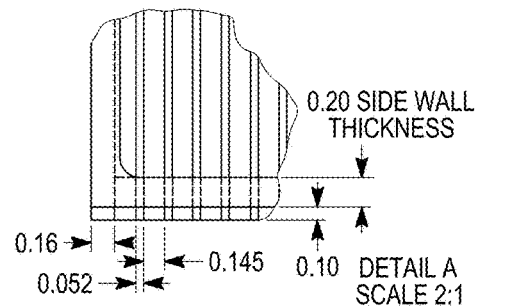
Figure 3E:
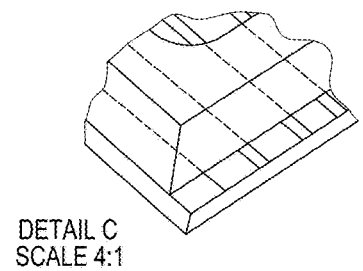
Figure 3F:
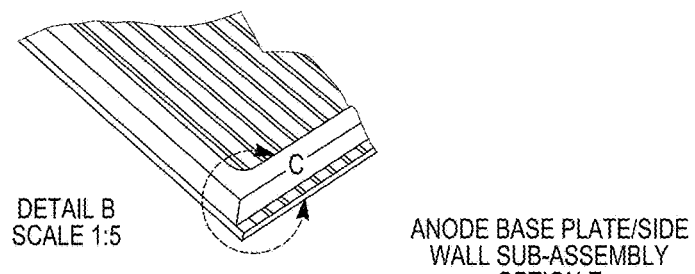
Figure 4:
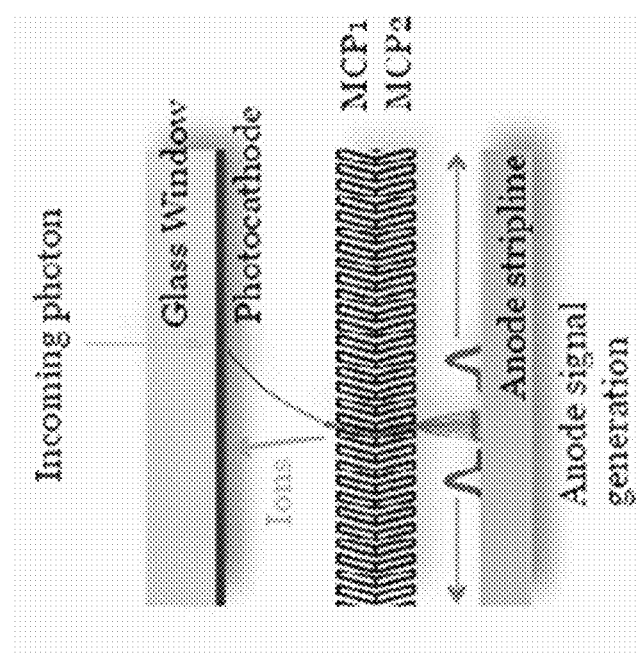
FIG. 4 is an illustration of the operation of a photodetector. An incoming photon, such as a photon generated within a radiation-creating material due to interaction between the material and ionizing radiation, impinges on a photocathode (here shown as being backed by a glass spacer), which produces an ion. The ion enters a micropore in a microchannel plate and collides with the wall of the pore to generate a cascade of electrons, which emerges from the other side of the MCPs. The construction of the MCPs ensures that the spatial position of the emerging electron cascade corresponds to the spatial position of the incoming ion. The emerging electron cascade impinges on the anode stripline (transmission line anode), generating electromagnetic signals that propagate in opposite directions along the transmission line anode.

Large-area photo-detectors capable of sub-nanosecond timing and sub-millimeter spatial resolution are described. In certain embodiments, the photo-detectors are preferably planar. In certain embodiments, each photo-detector has a photo-cathode to absorb photons and emit electrons, an amplification section to amplify these initial photo-electrons, and a micro-strip, or transmission line, anode to collect the charge that constitutes the electrical signal, as shown for example in FIG. 2. The signals are digitized at an end (such as each end of each anode strip); FIGS. 3A-F show a typical layout of the anode strip-lines, or transmission lines. The digitization is preferably performed by waveform sampling chips that allow a precise measurement of the time of arrival, amplitude, shape, and integrated charge for each pulse at both ends of the strips. Typical propagation velocities for signals along the strip are 10 ps (1 ps=$10^{-12}$ seconds) per mm. From these data, one can reconstruct the position of the pulse along the strip from the difference in times at the two ends, and the time of the pulse from the average of the two times. The position in the direction orthogonal to the strips is given by the amplitude distribution among the strips. The 2-ps time and 100-μm space resolution for transmission lines coupled with a commercial MCP-PMT were tested with a fast laser pulse. The position resolution at 158 PEs was shown to decrease with increasing HV (kV) from 650 μm at 2.3 kVA to nearly 100 μm above 2.4 kV. 2-ps time and 100-μm space resolution can be achieved for large signals.

Figure 1:
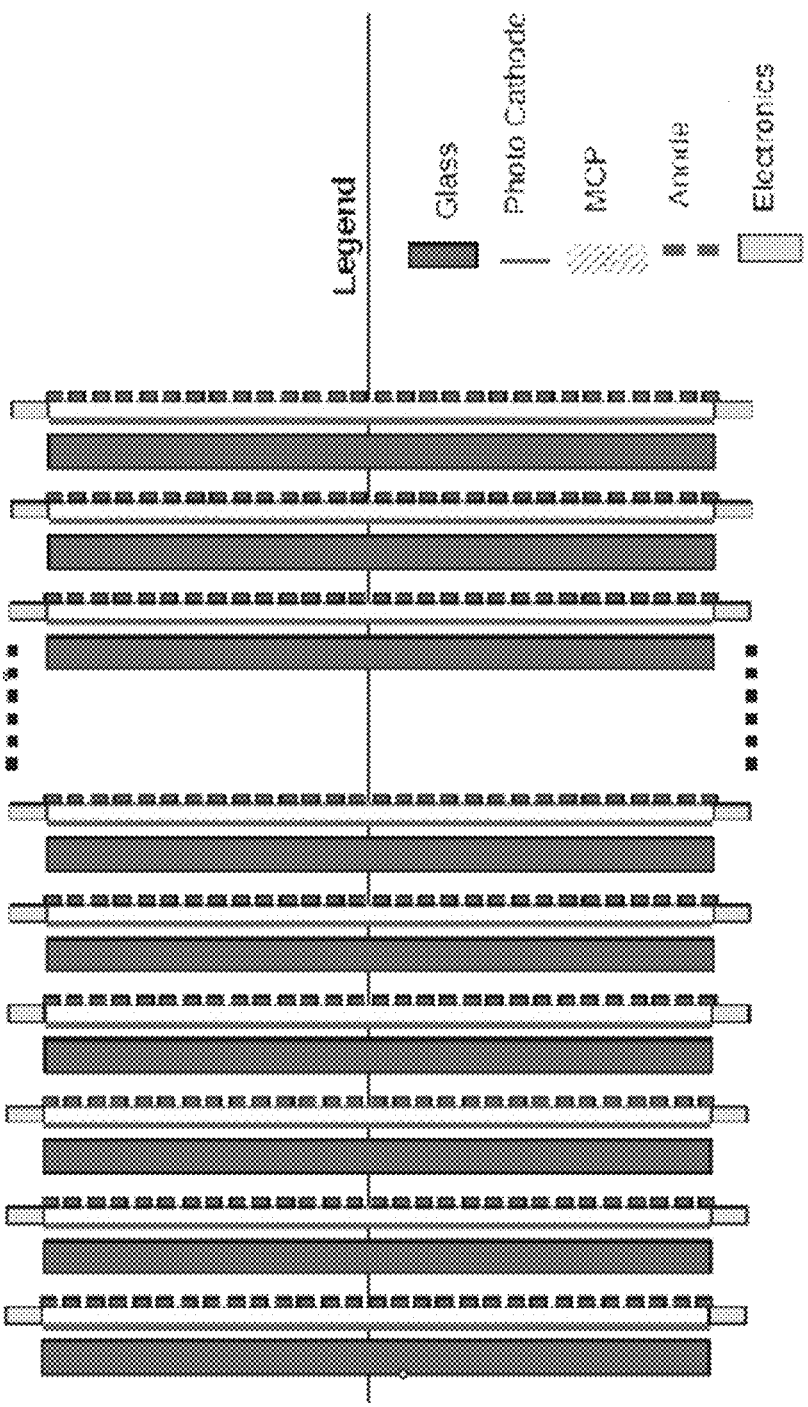
FIG. 1 is a construction of a sampling calorimeter using thin planar photo-detectors based on transmission-line readout. The calorimeter comprises alternating transparent layers of glass or crystal (radiation-creating media) in which particles create light by Cherenkov or fluorescence, respectively, backed by a photocathode, and thin fast micro-channel-plate based large-area photo-detectors with anodes connected to electronics for signal detection and fast waveform sampling.

The use of transmission lines with sampling integrated circuits (chips) at each end as the anodes for functionalized glass-substrate micro-channel plate amplification allows the construction of thin large-area planar photo-detectors that can be inserted as the photo-sensitive layers in a calorimeter. FIG. 1 shows an example embodiment, wherein a stack of radiation-creating layers and photo-detectors are alternated, of a sampling calorimeter using thin planar photo-detectors based on transmission-line readout.

As discussed in more detail below, the detector may be used in a variety of application and using a stack of layers. For example, certain embodiments discussed below comprise a stack of layers arranged as follows: a MCP-PMT-TL photodetector directed toward a radiation source for detecting radiation, such as electromagnetic showers; a radiation-creating material; and a second MCP-PMT-TL photodetector for, for example, monitoring the trajectories of radiation or high-energy particles that passed through the first photo-detector. In certain embodiments, behind the second MCP-PMT-TL, additional layers, comprising one or more layers of radiation-creating material and MCP-PMT-TL photodetectors, may be present to form a sampling calorimeter that can detect the particle's trajectory through each layer with spatial, timing, and/or energy resolution at each layer. The stacked structure is analogous to the classic cloud-chambers used to visualize the cascading formation of large electromagnetic showers as they develop. The granularity (along the stacking axis) of the stacked arrangement improves the resolution of energy, timing, and/or spatial characterization of a particle's trajectory.

Further, the MCP-PMT-TL detectors described here are not limited to applications that rely on a radiation source endogenous to the sample. These detectors may also be used as detectors for X-ray imaging, X-ray computed tomography (CT or CAT imaging techniques). The MCP-PMT-TL detectors described here may be used in medical imaging applications that rely on the detection of high-energy radiation or particles. The MCP-PMT-TL detectors described here may be used in security imaging applications, such as but not limited to passenger screening, luggage screening, cargo screening, freight screening, vehicle screening, equipment screening, or other imaging techniques that rely on the detection of high-energy radiation or particles.

The "inside-out" anode design described here solves a problem in the art, that protrusion of the anode signal lines through the vacuum seal barrier provides weakness in the vacuum seal, which limits the vacuum strength and degrades the performance of the photodetector. Embodiments of the inside-out anode design address this problem in the art of the bottom seal as follows. One concern in the feasibility of large-area fast thin planar photo-detectors is the hermetic seal for the anode signal lines. Optimally one would like a 50 ohm connection to the outside of the vacuum volume, inside of which the signal is generated on the anode, with no discontinuities for the dominant TEM mode of the strip-line at the vacuum boundary. One way to do this is to have the anode consist of strip-lines on the bottom glass plate of the body, with the strip lines running continuously on the surface under the side-wall of the body and a hermetic seal formed between the side-wall and the top surface of the bottom plate. Studies of the discontinuity formed by the dielectric wall over the traces show that the effect of the wall is negligible, as expected. However, sealing over the surface of alternating metal strips and glass could lead to problems with a robust seal. The joints along the strips, in which one would have to mate the frit with the side of the metal strip as well as the thin glass surface between the strips, seem particularly vulnerable to developing leaks. Having a continuous surface, without the steps and edges of strips, would allow fritting that would seem to be more robust. To that end we have developed a proposal that has such a surface.

In medical imaging, in particular Positron-Emission Tomography (PET), the use of crystal layers between thin photo-detectors that have excellent space and time resolution can improve resolution, sensitivity, and throughput.

Large-area fast economical MCP-PMTs can be used in the detection of high energy photons and charged particles in astro-, high-energy and nuclear physics, and gamma rays in, for example, Positron Emission Tomography with Time-of-Flight (TOF-PET).

Certain embodiments of the photo-detectors described herein allow measurements of the transverse profiles of energy flow in fine-grained successive slices through the longitudinal development of the shower, giving a granularity in the longitudinal direction finer than is economically possible in typical existing calorimeters. The granularity in the transverse direction can be matched to the needs of the application by the density and length of the anode strips, with the trade-off being occupancy versus number of electronics channels. In certain embodiments, the width of the anode strips can vary between 50 nm and 1 cm, preferably between 1 µm and 25 mm.

Certain embodiments of the photo-detectors described herein can give a precise measurement of timing for each strip. The use of waveform sampling allows the reconstruction of the time and position of multiple pulses, which can be used for centroid and energy flow reconstruction.

The development of large-area homogeneous photo-detectors with sub-millimeter path-lengths for direct Cherenkov light and for secondary electrons may be applicable to large time-of-flight systems for relativistic particles with resolutions in the picosecond range. Modern ASIC techniques allow fast multi-channel front-end electronics capable of sub-picosecond resolution directly integrated with the photo-detectors. However, achieving resolution in the picosecond range typically requires a precise knowledge of the signal generation process in order to understand the pulse waveform, the signal dynamics, and the noise induced by the detector itself, as well as the noise added by the processing electronics. The typical resolution for measuring time-of-flight of relativistic particles achieved in large detector systems in high energy physics has not changed in many decades, being on the order of 100 ps. This is set by the characteristic scale size of the light collection paths in the system and the size of the drift paths of secondary electrons in the photo-detector itself, which in turn are usually set by the transverse size of the detectors, characteristically on the order of 1 in. (85 ps). However, a system built on the principle of Cherenkov radiation directly illuminating a photo-cathode followed by a photo-electron amplifying system with characteristic dimensions of 10 µm or less, such as certain embodiments of the present invention, has a much smaller characteristic size, and consequently a much better intrinsic time resolution.

Time-of-flight techniques with a resolution of less than several picoseconds allows the measurement of the mass, and hence the quark content, of relativistic particles at upgraded detectors at high energy colliders such as the Fermilab Tevatron, the LHC, Super-B factories, and future lepton-colliders such as the ILC or a muon-collider, and the association of a photon with its production vertex in a high-luminosity collider. Other new capabilities for colliders include associating charged particles and photons with separate vertices in the two-dimensional time-versus-position plane, and searching for new heavy particles with short lifetimes. The difference in transit times over a path-length of 1.5 m, typical of the transverse dimension in a solenoidal collider detector such as CDF or ATLAS may be calculated as a function of the particle momentum. Many other applications with different geometries, such as forward spectrometers, have significantly longer path-lengths, with a consequent reach in separation to higher momenta.

Other applications of fast timing requiring resolutions of several picoseconds in smaller area systems (e.g., about 0.001 to 1 $m^2$), such as missing-mass searches for the Higgs at the LHC, and non-magnetic spectrometers for the development of six-dimensional phase-space muon cooling. There are applications in other fields as well, such as measuring longitudinal emittances in accelerators, precision time-of-flight in mass spectroscopy in chemistry and geophysics, and applications in medical imaging such as time-of-flight for Positron Emission Tomography (PET) applications.

At lower time and position resolution, the same techniques can be used for instrumenting the surfaces of large-ring imaging water Cherenkov counters, in which measurement of both the position and time-of-arrival of Cherenkov photons allow reconstruction of track directions and momenta.

In order to take advantage of photo-detectors with intrinsic single photo-electron resolutions of tens of picoseconds to build large-area time-of-flight systems, one may solve the problem of collecting signal over distances large compared to the time resolution while preserving the fast time resolution inherent in the small feature size of the detectors themselves. Since some of these applications can cover tens of square meters and require tens of thousands of detector channels, the readout electronics is preferably integrated via transmission lines with the photo-detector itself in order to reduce the physical dimensions and power, increase the analog bandwidth, improve readout speed, and provide all-digital data output.

There are a number of techniques to measure the arrival time of very fast electrical pulses. Typically, one measures the time at which the pulse crosses a single threshold, or, for better resolution, the time at which the pulse reaches a constant fraction of its amplitude. An extension of the threshold method is to measure the time that a pulse crosses multiple thresholds.

A recent development is the large-scale implementation of fast analog waveform sampling onto arrays of storage capacitors using CMOS integrated circuits at rates on the order of a few GSa/s. Most, if not all of them, have actually 3-dB analog bandwidths below 1 GHz. The steady decrease in feature size and power for custom integrated circuits enables multi-channel chips with multi-GHz analog bandwidths, and the ability to sample between 10 and 100 GHz, providing both time and amplitude after processing. Assuming that the signals are recorded over a time interval from before the pulse to after the peak of the pulse, with sufficient samples fast waveform sampling provides the information to get the time of arrival of the first photo-electrons, the shape of the leading edge, and the amplitude and integrated charge. While other techniques can give time, amplitude, or integrated charge, fast sampling has the advantage that it collects all the information, and so can support, for example, corrections for pileup, baseline shifts before the pulse, and filtering for noisy or misshapen pulses. In applications such as using time-of-flight to search for rare slow-moving particles, having the complete pulse shape provides an important check that rare late pulses are consistent with the expected waveform.

Known photo-detectors such as micro-channel plate photo-multipliers and silicon photo-multipliers achieve risetimes well below 1 ns. Preferred timing readout electronics extract the time-of-arrival of the first charge collected, adding nothing to the intrinsic detector resolution. Traditionally, the best ultimate performance in terms of timing resolution has been obtained using constant fraction discriminators (CFDs) followed by high precision time digitization. However, these discriminators make use of wideband delay lines that cannot be integrated easily into silicon integrated circuits, and so large front-end readout systems using CFDs to achieve sub-ns resolution have not yet been implemented. Several other techniques in addition to constant-fraction discrimination have long been used for timing extraction of the time-of-arrival of a pulse: (1) single threshold on the leading edge; (2) multiple thresholds on the leading edge, followed by a fit to the edge shape; (3) pulse waveform sampling, digitization and pulse reconstruction.

Applying a fixed threshold to the leading edge, which is a one-parameter technique, suffers from a dependence of the extracted time with the pulse amplitude, even for identical waveforms. In addition, this method is sensitive to baseline shifts due to pileup, the overlap of a pulse with a preceding one or many, a situation common in high-rate environments such as in collider applications. Also, for applications in which one is searching for rare events with anomalous times, the single measured time does not give indications of possible anomalous pulse shapes due to intermittent noise, rare environmental artifacts, and other real but rare annoyances common in real experiments.

In contrast, constant fraction discrimination takes into account the pulse amplitude. The most commonly used constant fraction discriminator technique forms the difference between attenuated and delayed versions of the original signal, followed by the detection of the zero crossing of the difference signal. There are therefore three parameters: the delay, the attenuation ratio, and the threshold. These parameters are preferably set with respect to the pulse characteristics in order to optimize the timing resolution.

The multiple-threshold technique samples the leading edge at amplitudes set to several values, for instance at 4 values equally spaced between a minimum and a maximum threshold. The leading edge is then reconstructed from a fit to the times the pulse reaches the thresholds to extract a single time as characteristic of the pulse. As in the case of constant fraction discrimination, if the pulse shape is independent of amplitude, the reconstructed time will also not depend upon the pulse amplitude, provided the thresholds are properly set.

In the simulation, the single threshold was set at 8% of the average pulse amplitude, providing the best timing resolution. Lower threshold values were not used due to the noise, particularly at low photo-electron numbers. For multiple threshold, almost no improvement was found at more than four thresholds; the lowest and highest thresholds were determined to avoid insensitivity and inefficiencies at low photo-electrons numbers.

Waveform sampling stores successive values of the pulse waveform. For precision time-of-arrival measurements, such as considered here, one preferably fully samples at least the leading edge over the peak. In order to fulfill the Shannon-Nyquist condition, the sampling period is preferably chosen short enough to take into account all frequency components containing timing information, such that the minimum sampling frequency is preferably set at least at twice the highest frequency in the signal's Fourier spectrum. In practice, there are frequency components contributing to the leading edge well above the 3-dB bandwidth of the signal spectrum, before the noise is dominant, and these components should preferably not be filtered out. After digitization, using the knowledge of the average waveform, pulse reconstruction allows reconstructing the edge or the full pulse with good fidelity. The sampling method is unique among the four methods in providing the pulse amplitude, the integrated charge, and figures of merit on the pulse-shape and baseline, important for detecting pileup or spurious pulses.

The multiple-threshold technique is a clear improvement compared to the one-threshold discriminator for input signals above 10 photo-electrons. The constant fraction discriminator also is a significant improvement over a single threshold for any input signal. However, the preferred method is waveform sampling, which can achieve resolutions below 3 ps for input signals of 50 photo-electrons in the baseline case of a SIN ratio of 80, 1.5 GHz analog input bandwidth, and random sampling jitter less than 5 ps.

The sensitivity of sampling varies with the digitization. The curve flattens out such that an 8-bit digitization is sufficient to get a resolution of a few picoseconds at a 40 GSa/s sampling rate. This greatly relaxes the constraints on the analog-to-digital converter design. (The analog-to-digital conversion does not have to be fast; using switched capacitor arrays it is possible to sample at high rates, and read more slowly, at a rate allowed by the analog-to-digital converter.) Higher sampling rates provide better time resolution. In some embodiments, the sampling rate is 5-20 GSa/s. In some embodiments, the sampling rate is 18 GSa/s. In some embodiments the sampling rate is 40 GSa/s, and the digitization rate set by the occupancy requirements of the application, and for the small pixel sizes typically used for time-of-flight applications the digitization can be done in real time at rates below 1 MHz. The dependence of the time resolution on the analog bandwidth was simulated for our baseline sampling rate of 40 GSa/s, and the time resolution versus analog bandwidth for a sampling rate proportional to the analog bandwidth showed that the time resolution improved with the analog bandwidth, but flattened above a 2 GHz analog bandwidth and 80 GSa/s sampling rate. The waveform sampling technique was also robust against random sampling clock jitter provided there are enough samples taken.

A simulation package based on MATLAB was used to model the time resolution for fast pulses from photo-detectors. Using the parameters measured from commercial micro-channel plate photo-multipliers, the time-resolutions for four signal processing techniques were simulated and compared: leading edge discriminators, constant fraction discriminators, multiple-threshold discriminators and pulse waveform sampling. For certain embodiments, timing using pulse waveform sampling is preferred, giving the highest resolution in many cases, particularly in the presence of white noise and a substantial signal, such as 50 photo-electrons. With micro-channel plate photo-detectors, it is possible to reach a precision of several picoseconds or better with pulse waveform sampling given large-enough input signals. At high sampling rates of the order of 40 GSa/s, a relatively low precision digitization (8-bit) can be used.

For single high-energy particles, in particular, photons and electrons for which the showers are purely electromagnetic, the measurement of the energy flow in fine-grained slices allows the reconstruction of the particle direction. There are a number of applications of certain embodiments of the present invention in which data on the position, time, and directionality can be used to reconstruct the vertex (point of origin) of the parent particle of the observed particles and the decay products.

Certain embodiments of the photo-detectors described herein are thin and economical enough to be used as photo-detectors on each side of a radiator slice. Cherenkov light is directional, and will be detected preferentially by the side in the direction of the particle direction; scintillation light is isotropic, and will be detected by both sides. Cherenkov light is generated by relativistic particles only, and is insensitive to nuclear effects and low-energy neutrons and other particles, while scintillation light has contributions from all these sources.

In conventional PET detectors, the uncertainty in depth-of-interaction is a factor limiting spatial resolution and signal-to-noise; there is consequently a compelling reason to use high-density crystals, which are expensive. A detector with a thin layer of crystals interspersed with active photo-detectors can be used to directly measure the depth-of-interaction (DOI), allowing the use of lower-density crystals, which can be substantially less expensive, while providing better DOI resolution than the most expensive crystals. In addition, the distributed high-resolution spatial measuring capability allows block crystals to be used, avoiding the costs of making an array of a large number of highly-polished separate small crystals.

The typical calorimeter detector design using an array of crystals has a large number of photomultipliers attached head-on to the rear of the calorimeter. This requires space for the full length of the photomultiplier and base behind the calorimeter, increasing the volume occupied by the detector. In many applications this space increases the size of supporting structures and other systems, and hence increases costs. Certain embodiments of the photo-detectors described herein allow optimizing the space required for each application.

Positron-Emission Tomography (PET) uses a tracer which emits positrons to locate tumors and other areas of enhanced biologic activity. The annihilation of the positron with an electron at the tumor site produces a pair of back-to-back 511 keV gamma rays, which form the detected signal. The detection is typically performed with arrays of dense transparent crystals observed by an array of photo-multipliers (PMTs) on the backside (i.e. the side away from the patient or subject).

One aspect of the present invention enables replacement of the traditional geometry of a layer of crystals observed by an array of photomultipliers by a layered geometry of alternating thin crystal layers and photo-sensitive thin detectors based on large-area micro-channel plate amplification sections and transmission-line readout, with waveform sampling at each end of each transmission line strip. This geometry solves the problem of determining the depth-of-interaction in the crystal blocks by using thin blocks, gives an accurate position measurement, and in addition gives a precise measurement of the time of the gamma arrival, allowing suppression of backgrounds from random coincidences and scattering events. In addition it allows the use of less expensive crystals and/or block crystal instead of individually polished small very dense crystal blocks.

In some embodiments, the waveforms of the pulses are digitized at each end of each transmission line strip using an inexpensive multi-channel CMOS sampling chip that continuously records the waveform into a ring buffer. When a coincidence is detected by trigger logic, the writing to the buffer is stopped, and the amplitude, integrated charge, time-of-arrival, and pulse-shape integrity can be calculated locally in a local Field-Programmable Gate Array (FPGA).

In certain embodiments the MCP-PMT-TL flat panel photodetector comprises several constituent layers. For the purposes of discussion, a "top to bottom" orientation in which the "top" layer faces a high-energy particle or radiation emitter, such as a sample or an animal. A top layer is the front window and a photocathode. A second layer comprises spacers. A third layer comprises one or more MCPs, separated by spacers. A fourth layer is a side frame. A fifth layer is a top transmission line pattern, a sixth layer is a dielectric base plate, a bottom layer is a bottom transmission line pattern. The bottom transmission line pattern may be in contact with a printed circuit board. The front window, spacers, MCPs, side frame, top transmission line pattern, and dielectric base plate may be sealed under vacuum. In certain embodiments, the transmission lines of the top anode may be separated from one another by non-conductive material, for example, they may be printed onto a non-conductive substrate, or silk-screened onto a non-conductive support. In certain embodiments, the ends of the top transmission line pattern extend beyond the vacuum seal between the side wall and the base plate to permit electrical connection to the detection circuitry, which includes a HV source and a ground. In certain embodiments, the ends of the top transmission line pattern are in contact with conductive lines that extend beyond the vacuum seal between the side wall and the base plate to permit electrical connection to the detection circuitry. In certain embodiments, HV is applied to the top transmission lines and ground is applied to the bottom transmission lines. In certain embodiments, ground is applied to the top transmission lines and HV is applied to the bottom transmission lines. In certain embodiments, the top transmission lines are shorted together by a conductive crossing that permits formation of a uniform metal-glass bond at the sidewall-top transmission line plate interface and at the top transmission line plate-base plate interface, and ground is applied to the top transmission line plate. In certain embodiments, the side wall and base plate can be sealed to the anode by, for example, firing silver paste, high-temperature indium seals, or by sputtering, or evaporating to form a seal. In certain embodiments, the electrical waveforms at the corresponding top and bottom transmission line anodes, one of which is connected to ground and the other of which is connected to HV, provide a signal and are detected by the detection circuitry, including waveform sampling electronics. The photodetectors are preferably assembled and sealed under vacuum conditions so that the photocathode, microchannel plates, and top anode pattern operate at a pressure below ambient pressure. The bottom anode pattern can be adhered to the outside of the base plate, aligned with the top transmission line strips, and does not operate under vacuum conditions.

Figure 5:
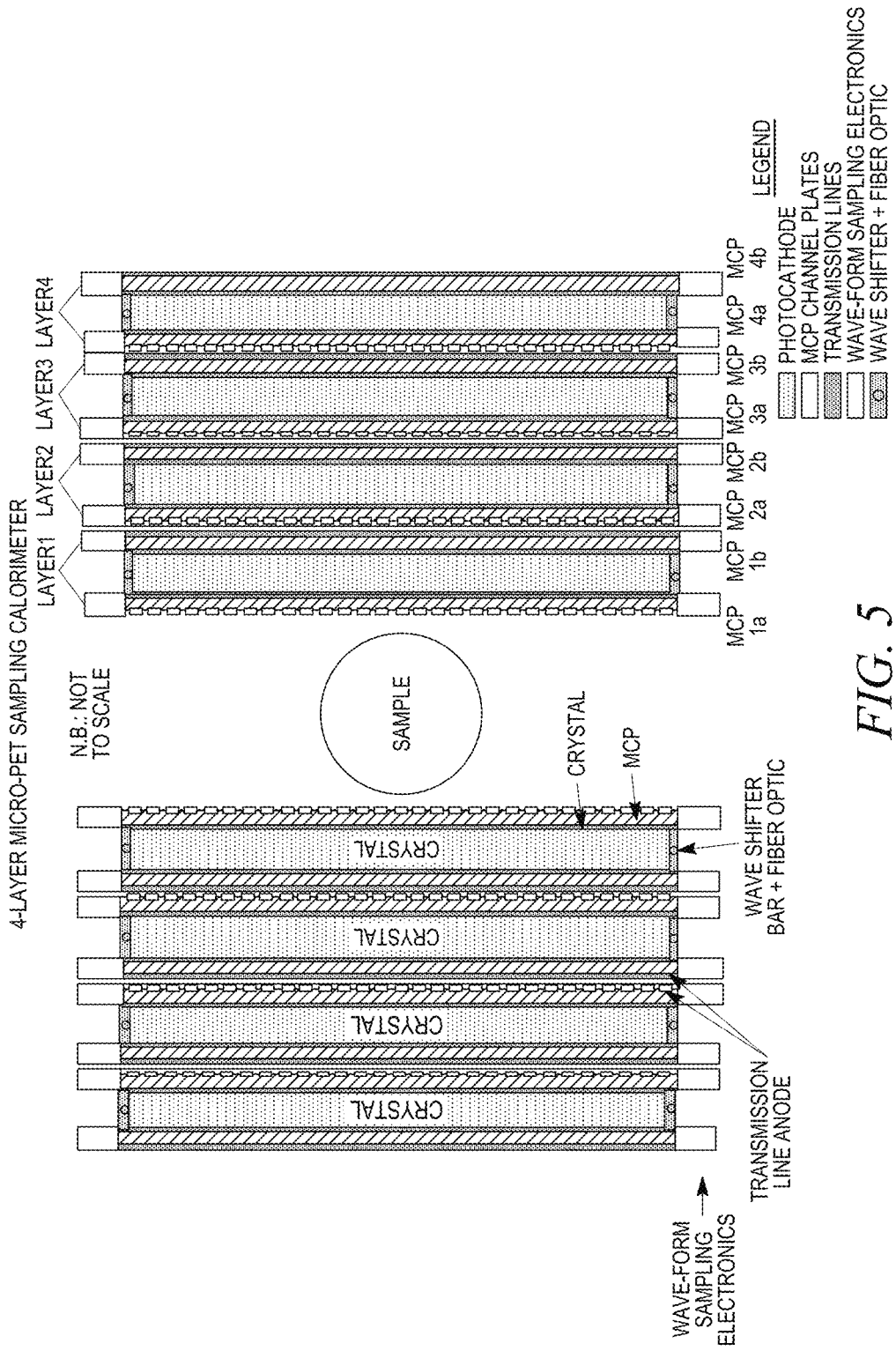
FIG. 5 illustrates the geometry of a planar Micro-PET camera with Time-of-Flight (TOF) and Depth-of-Interaction (DOI) capabilities. Each crystal is sandwiched on each side between planar MCP-PMTs with transmission-line readout. The crystals are shown as segmented; other options include use of a single block or large blocks, with internal reflection and timing used to localize the position more precisely.

FIG. 5 shows the basic geometry of alternating crystals and thin planar photo-detectors for use in a planar geometry Micro-PET camera. The same sampling construction can be used in a PET camera for clinical work.

Figure 7:
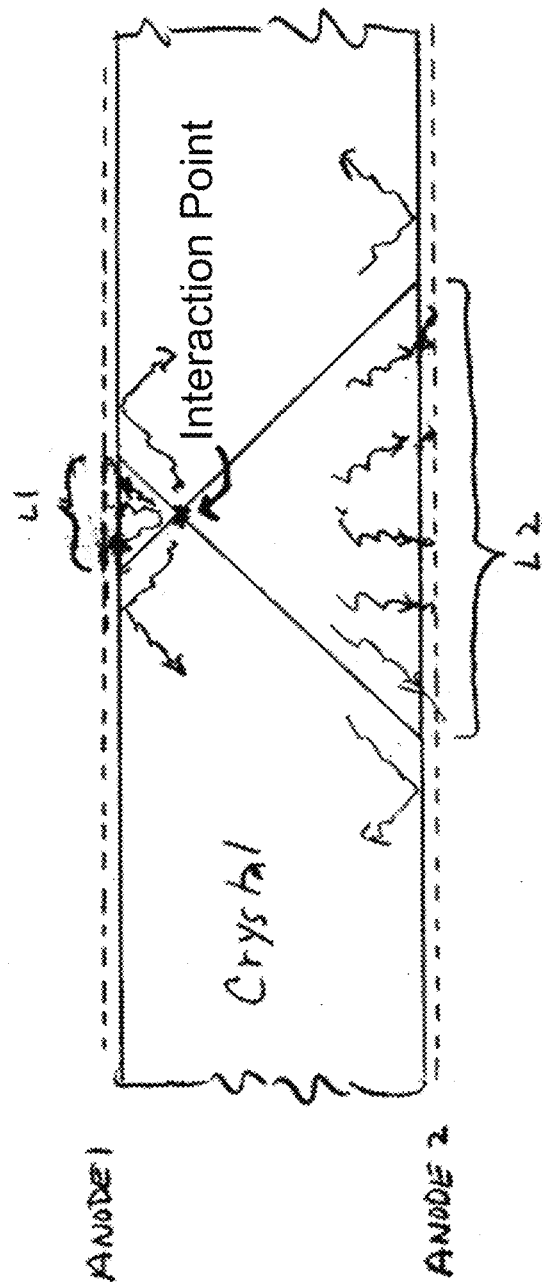
FIG. 7 illustrates a technique, preferably using the strip transmission-line readout, to determine the depth-of-interaction in a PET crystal using the total internal reflection in the crystal. The signal is transmitted through the surface of the crystal only within the Brewster angle, with light at larger angles being internally reflected. The linear size of the transmitted light spot in the direction orthogonal to the strip direction are thus linearly proportional to the distance from the crystal face to the source of the light within the crystal.

In addition to the localization in thin layers using the strip-transmission-line read-out, the width of the signal on the strips can be used to localize within a layer. The technique utilizes the total internal reflection in the crystal as shown in FIG. 7; the signal is transmitted through the surface of the crystal only within the Brewster angle, with light at larger angles being internally reflected. The linear size of the transmitted light spot in the direction orthogonal to the strip direction is thus linearly proportional to the distance from the crystal face to the source of the light within the crystal, as shown in FIG. 7.

The interactions of high-energy particles with matter are characterized by two lengths, the radiation length and the interaction length. These two scales arise from the two fundamental forces affecting particles traversing matter, the electromagnetic and strong (nuclear) forces, respectively. Photons and electrons have no strong interactions, and consequently the showering of photons and electrons is governed by only the radiation length. Muons, the heavy 'cousins' of electrons, also have only electromagnetic interactions; but are heavy and penetrating so that a sampling calorimeter typically is used as a tracking device. Certain embodiments of the invention have this capability.

Photons with energies in the multi-GeV region or above incident on material create electromagnetic showers of very large numbers of electrons, positrons, and photons. Classic cloud-chambers, which are known in the art for visualizing the cascading formation of large electromagnetic showers as they develop, visualize the passage of ionizing radiation through multiple lead plates interleaved with regions of supersaturated vapor, usually water or alcohol. As the particles pass through the vapor, the ionizing particles interact with and ionize the vapor, which produces condensation trails that may be photographed using ordinary photography techniques. Each lead plate used in such experiments is typically 2.26 radiation lengths thick. Certain embodiments of the sampling calorimeters of the invention use, for example, glass or crystal as radiators in place of the lead, and planar MCP-PMTs in place of the cloud chamber. These showers grow linearly with distance in the material up to some maximum, with the depth of the maximum in the medium growing only logarithmically (i.e., very slowly) with energy. The total number of particles in the shower above some critical energy lower cutoff is proportional to the energy.

Figure 8:
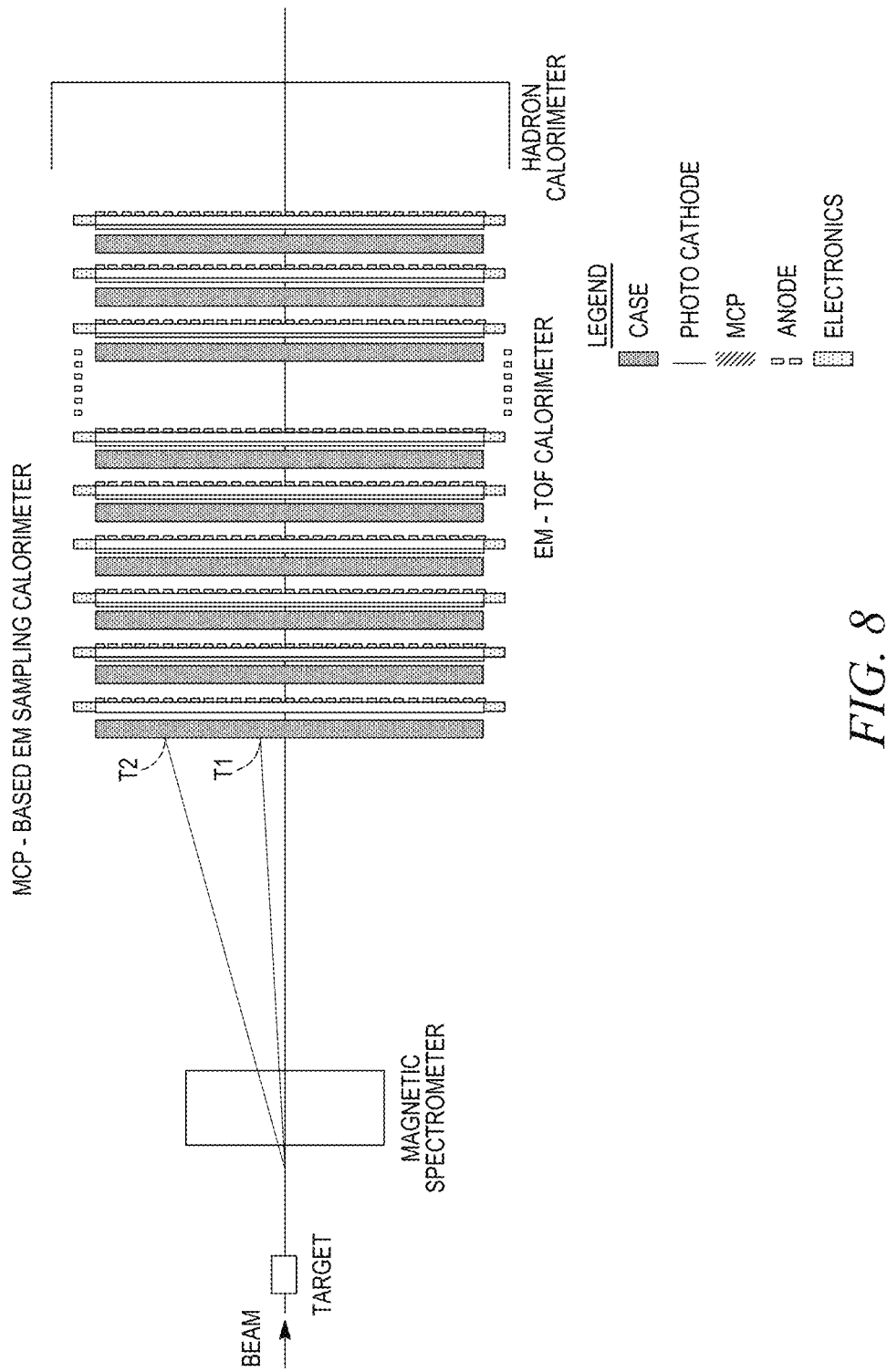
FIG. 8 is a sketch of an implementation of a sampling electromagnetic (EM) calorimeter based on planar photodetectors in a high energy experiment such as $K_L^O \to \pi^0 \nu \bar{\nu}$. The use of precise measurements in time, space, and energy allow the reconstruction of the photon directions and transit times, allowing a constrained fit to the $\pi^0$ mass. This is a very strong constraint against multi-$\pi^0$ combinatorial backgrounds.

FIG. 8 presents the design for an embodiment of a sampling electromagnetic (EM) calorimeter for high-energy photons or electrons based on planar photo-detectors. In some embodiments, the layers of bulk medium are glass, crystal (e.g., NaI, CsI), or scintillator; the detection layers can comprise micro-channel plate photomultipliers (MCP-PMTs) with transmission-line anodes and waveform sampling as described above. The digitization can be done directly in waveform-sampling chips bonded to the back of the MCP-PMT layers.

Cherenkov light produced in the bulk medium is directional and coherent, producing a very fast "spot" of light, rather than the isotropic slower pulse characteristic of scintillators. The signals thus can be directly mapped onto small pixels and strips for measurement of energy, position, time, and direction for showering particles.

Photons of energies greater than a few GeV will create showers large enough so that the time of arrival at each layer beyond the first few radiation lengths can be determined to within several picoseconds, and the position to better than a few millimeters. These time and position resolutions allow a determination of the direction of incident photons, enabling reconstruction of the vertex for photons which come from a common parent, such as a pion or eta-meson. This in turn allows mass reconstruction for pairs of photons, allowing identification of the parent particle and rejection of background combinations of unrelated photons.

The measurement of energy with good resolution at each depth with fine granularity (e.g., one radiation length) can also be used to determine depth of the first interaction, as the shape of the shower development is well known.

Sampling calorimeters for high-energy charged particles are generally divided longitudinally (along the particle direction) into two sections, with a calorimeter optimized for electromagnetic showers ("EM-calorimeter") upstream of one optimized for hadrons (Hadron-calorimeter). A hadron is a strongly-interacting particle, composed of quarks. Common examples are the proton, the neutron, and in cosmic rays and at accelerators, the pion, kaon, and other mesons (quark-antiquark pairs, like the pion) and baryons (three-quark systems, like the proton and neutron) which typically leave only a small fraction of their energy in the electromagnetic calorimeter and interact in the thicker coarser hadron calorimeter.

Electrons produce showers very similar to those of photons of the same energy. All of the measurements enabled by MCP-PMT-based sampling calorimeters described in the photon section above can be made for electrons as well. In addition, because the electron is electrically charged but very light, one can reconstruct the track in tracking chambers to measure the origin of the particle, and, knowing the time of arrival, accurately determine the time of the production of the electron and any other particles produced at the same time in an interaction.

The use of planar MCP-PMT detection layers in a hadron calorimeter allows the use of Cherenkov light as the signal from which the energy of the hadron is determined. Cherenkov light is produced only by charged relativistic particles, so the signal does not include contributions from nuclei and neutrons. This obviates one of the major problems in hadron calorimetry, which is that calorimeters in general respond differently to hadronic and electromagnetic energy.

The fine granularity and inherent time resolution of embodiments of the MCP-PMT-TL described here can give additional information on showers, including the depth-of-interaction, allowing better energy resolution. In addition it energy can be allocated from nearby incident particles due to the increased granularity.

The following references are incorporated by reference herein in their entirety: (1) U.S. Pat. No. 4,853,595; (2) U.S. Pat. No. 4,933,542; and (3) U.S. Pat. No. 7,485,872.

Micro-Channel plate (MCP) photomultiplier tube (PMT) photodetectors are useful for PET applications due to their excellent positioning accuracy, fast time response, and compactness in comparison with the conventional PMT. Despite the merits of using MCP PMTs, they have not been widely adopted for PET detectors. Recently, Weisenberger, et al. (A. G. Weisenberger, S. Majewski, D. Gilland, W. Hammond, B. Kross, V. Popov, J. Proffitt, J. Mckisson and M. F. Smith, IEEE NSS/MIC Conference Record (2007) 3705-3708.) and Salvador, et al. (S. Salvador, D. Huss and D. Brasse, IEEE Trans. Nucl. Sci. 56 (2009) 17-23) reported a mobile cardiac PET/SPECT and a small animal PET system that used a Photonis MCP PMT of 2×2 area. While they showed that MCP PMTs can be used in PET detectors, the fast timing characteristics of MCP PMTs were not fully exploited in their designs. One attractive feature of embodiments of the present invention is a transmission-line (TL) readout that reduces the channel count while still providing good spatial resolution. Large area MCP PMTs are useful for building low-cost, high-sensitivity PET systems, with, in some embodiments, TOF timing resolution.

Certain embodiments of the PET detector module design described herein comprise pixelated, thick LSO crystals and two MCP PMTs with TL readout and waveform sampling. They also have a high light-yield leading to good energy resolution. The high light-yield and fast decay of the LSO, and the fast timing characteristics of the MCP-PMT make the module attractive for TOF PET imaging.

By measuring the light outputs at two ends of the scintillator array, depth-of-interaction (DOI) measurements can be generated. With its slim thickness, the front MCP-PMT does not cause substantial attenuation and scattering of the 511 keV gamma rays. The use of the TL readout scheme and waveform sampling allows one to substantially extend the size of the detector module without requiring more electronics channels for data acquisition and processing. In combination with the aforementioned economic, large-area MCP-PMT, the use of TL readouts and waveform sampling has considerable cost benefits. At the same time, with waveform samples, sophisticated processing can be applied for extracting accurate event information. The electronics are also more robust than in prior art methods. Computer simulation codes based on the Geant4 have been developed response functions have been measured, and the developed codes have been employed to study the performance properties of the detector design. An intermediate simulation of the experimental setup was also made to calibrate the simulation code by comparing the measured experimental results. Validated simulations were then used to explore the predicted performance of the crystal array coupled to two MCP-PMTs in coincidence. Our result demonstrates that the detector design is addresses several deficiencies in the art.

A transmission-line (TL) scheme was employed for reading out the MCP PMT outputs to estimate event information. The TL readout scheme allows extending the size of the detector module without substantially increasing the number of electronics channels. To extract DOI information, two MCP PMTs were coupled to LSO scintillators at both sides (front, meaning the side facing the emitting sample, and back, meaning the side of the array facing away from the sample) of the scintillator array. The compact thickness of MCPs makes this configuration feasible. Computer simulations were conducted to study the performance properties of this design. The optical photon generation and transport were modeled using the Geant4 package. An experimental setup was built using a Photonis XP85022 MCP PMT and a prototype TL board. Experimental results were used to calibrate the simulations. The experimental results were compared to the simulation results.

PET imaging has been well recognized for its usefulness for studying normal and diseased biology, for diagnosing important diseases such as cancers, cardiac diseases, and neurological disorders, and for developing and evaluating drugs and treatments. Innovative methods for imaging many cellular and molecular processes with PET, including gene expression and translation, have been developed or are under development. PET can also have a critical role in personalized medicine.

To realize its full impact, it is beneficial that doctors and researchers have adequate devices for conducting PET imaging for various needs. Although specific imaging needs are best met by application-specific systems, due to economics, present-day PET systems are mostly developed for general-purpose imaging of human and rodents. By design, these systems yield useful results for common imaging tasks, which are defined, to a substantial degree, by the imaging capability of available PET technology. However, the results obtained are necessarily suboptimal for specific imaging tasks. In addition, these systems can be seriously inadequate for uncommon imaging tasks, even though such tasks may be highly relevant for clinical diagnosis or basic research. Therefore, current PET imaging has limited domains of application, often yields compromised results for specific tasks, and substantially under-realized its potential impacts to biomedicine. This invention aims to change this situation and has the following general and specific significance.

Small-animal imaging is an ideal platform for demonstrating new concepts and technologies in PET because of its small scale (hence lower cost) and high performance requirements. This new system is applicable to animal and human PET imaging.

An important capability of PET is that it can generate quantitative, longitudinal in vivo assessments of various biological processes. Currently, small-animal PET imaging significantly lacks sensitivity (typically below 5%). To compensate for the low sensitivity researchers are employing a radioactivity concentration that is 40-70 times that used in human imaging, creating ~20 times the radiation dose and causing serious concerns for induced radiobiological effects (especially in longitudinal studies). In addition to reducing radiation dose, high sensitivity can lead to improved image statistics, better quantification, and earlier disease detection; it can shorten the imaging time, increase throughput, enhance imaging results when short-lived PET isotopes are used, and improve temporal resolution in dynamic studies (to yield quantitatively more accurate pharmacokinetic analysis in drug development and evaluation); and it is important for detecting signals having biology- or physiology-limited strengths (e.g., concentration of receptors or the number of radiolabeled cells that can be administrated in cell-trafficking studies). Therefore, increasing the sensitivity of small-animal PET imaging is of fundamental importance for generating high-quality research results. The PET system described herein can yield a sensitivity better than 10%.

PET is particularly useful for neuroimaging and many powerful rodent models of human brain disorders (e.g., stroke, brain cancer, Parkinson, Alzheimer) are available. Having the ability to imaging these rodent models with PET can therefore substantially impact brain research. However, visualizing fine structures in rodent brains, especially in mouse brains, demands sub-millimeter spatial resolution while most known small-animal PET systems provide 1-2 mm image resolution. Prototype PET systems capable of sub-millimeter resolution have been demonstrated. Unfortunately, the high cost associated with such systems is likely to prevent their widespread deployment and often makes it necessary to compromise the system sensitivity and imaging field-of-view (FOV). The described PET system can support high-resolution imaging without incurring high cost while maintaining sensitivity.

There is strong research interest in conducting PET imaging for animals larger than a rodent (e.g., for imaging cardiovascular disease in dog models and neurological diseases in primate models), but there are barriers to developing dedicated PET systems for them. For imaging these subjects, present-day small-animal PET systems (which are actually rodent systems) are too small and human PET systems do not have the adequate resolution and sensitivity. Certain embodiments of the present invention are basically rodent systems as well; however, they can be reconfigured to provide region of interest (ROI) imaging of larger animals with high resolution and sensitivity.

Conventional PET systems assume a fixed, ring-like geometry. They typically arrange small detector modules into rings to enclose the subject to provide an approximation to the idealized imaging model based on which most PET image reconstruction methods are developed. (In this model, PET data provide line integrals of the underlying image function without missing views.) Evidently, the quality of the approximation affects the quality of resulting images. In particular, the finite spatial responses of the detector leads to degraded image resolution. A PET system preferably has high sensitivity, an adequate imaging FOV (which is determined by the detector-ring diameter and scanner length), and reasonable cost. Scattered and random events reduce the effective sensitivity of a PET system and therefore they also need to be minimized. Generally, these design objectives cannot be simultaneously met and certain design tradeoffs are necessary. To date, the tradeoffs adopted by most PET systems are determined by the "general-purpose" imaging needs. Consequently, for specific tasks current PET imaging can only yield sub-optimal resolution, sensitivity, or imaging FOV. In theory, PET systems can be developed by making specific tradeoffs that best fit the needs of specific tasks. However, except for brain and breast imaging application-specific PET systems are seldom built. In recent years, substantial efforts in PET research have been, and are being, devoted to developing depth-of-interact (DOI) detectors for yielding good approximations to the idealized imaging model (hence high resolution) as well as high sensitivity. Such detectors can be costly and hence there are active ongoing efforts in developing lower-cost DOI technologies. Alternative to the pure-hardware approach, one can model the finite detector responses of a PET system (plus others such as scatter, random and data noise) in the imaging model and correct for them in image reconstruction. The ability to effectively perform such corrections can be exploited to change the traditional way PET system is designed.

Against this picture of the conventional PET system development, three innovative components are described: (1) multi-configuration system design, (2) the use of compact and flat detector panels, and (3) system-level integration of the scanner geometry and reconstruction methods.

Figure 14:
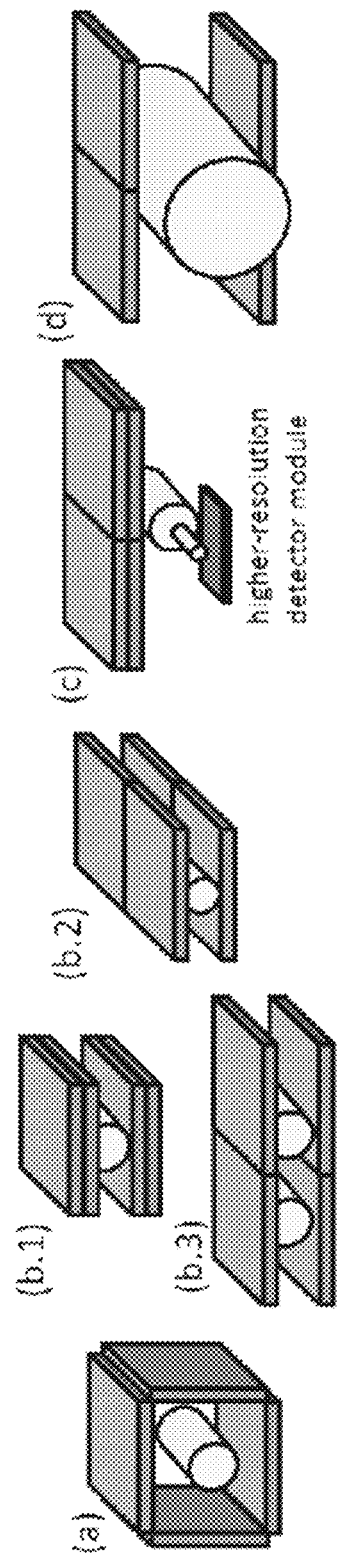
FIG. 14 illustrates sample geometries for a multi-configuration small-animal PET system that employs four compact and flat detector panels (dark shaded rectangles) for supporting various imaging tasks (light shaded cylinders represent the subjects): (a) general-purpose rodent imaging, (b.1) whole-body, high-sensitivity mouse imaging, (b.2) whole-body, high-sensitivity rat imaging, (b.3) whole-body, high-sensitivity multi-subject mouse imaging, (c) high-resolution mouse brain imaging, and (d) region-of-interest imaging for larger subjects.
Figure 15C:
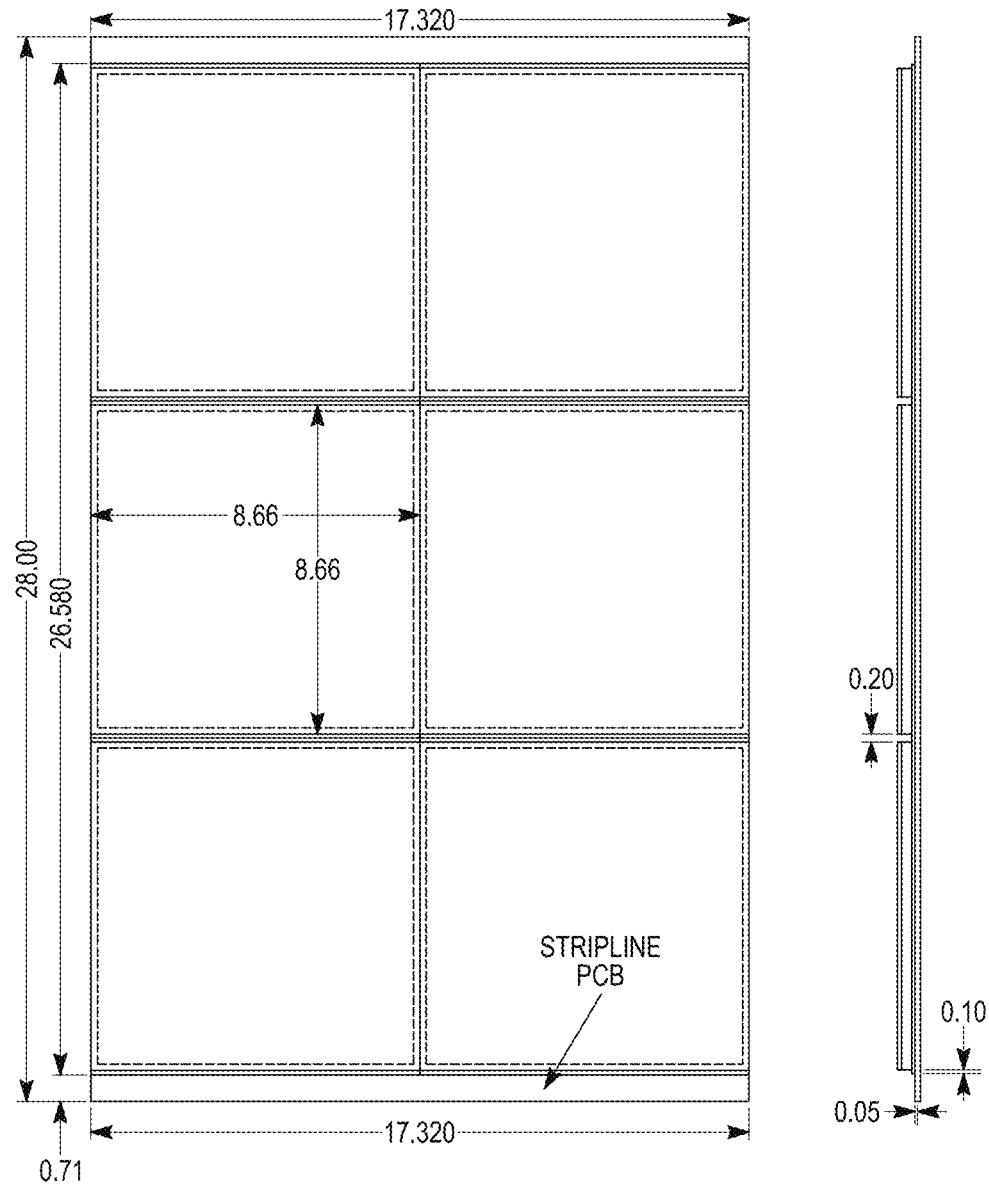
Figure 15C:
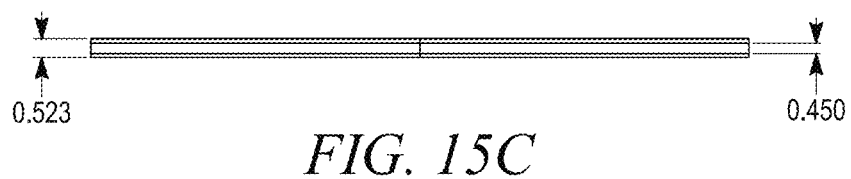
Figure 15D:
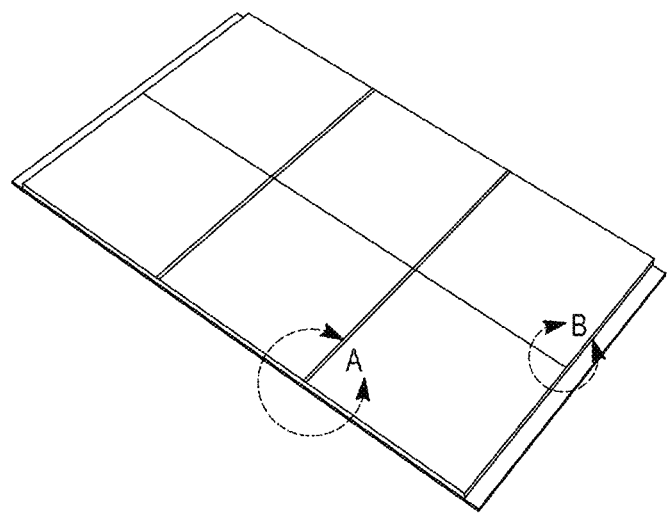
Figure 15E:
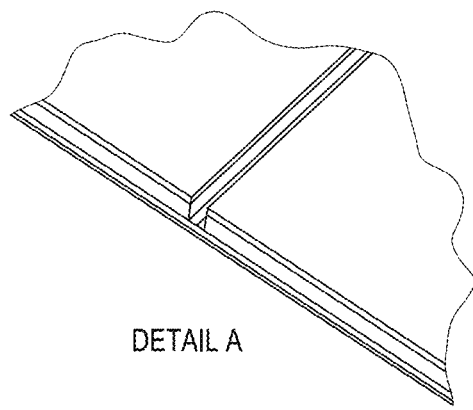
Figure 15F:
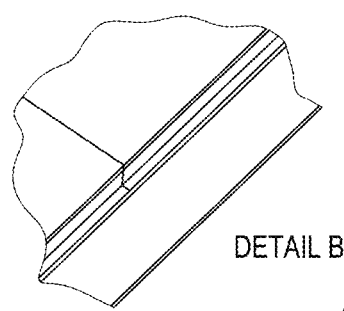

Most PET systems have a fixed geometry, but a transformable human PET system that allows users to rotate their detectors 90 degrees to obtain two configurations having different FOVs and axial lengths has been proposed before. The large- and small-FOV configurations (also having short and long axial lengths respectively) are intended for whole-body and brain imaging. Thus, this system allows users to trade FOV for sensitivity. The ClearPET small-animal PET system also provides two FOVs for imaging small and medium size animals. The two configurations provided by these systems have no basic differences: both assume the same ring-like geometry and use the same reconstruction algorithm(s). In contrast, as illustrated in FIG. 14, the use of fundamentally different scanner geometries are described herein, each of which preferably uses its own reconstruction algorithm(s), giving a single PET system the capacity to meet a wide range of imaging needs. Thus, certain embodiments of the PET systems described here are truly reconfigurable.

One important feature of the described system is the use of compact and flat PET detector panels, which are flat detectors that are large with respect to the target subject size so that a PET system only needs to employ a few such detectors. Most PET systems employ small detector modules; however, there is increasing interest in using flat detector panels because: (1) such detectors can be mechanically easier and less costly to build; (2) detection-inactive space between detector modules can be reduced; and (3) the flat geometry is natural for several cost-effective detector technologies and for using monolithic scintillation crystals (their use can further reduce cost and detection-inactive space). As depicted in FIG. 14, the use of relatively thin detector panels having no DOI capability is described. When needed, these can be stacked into layers for providing high stopping power for annihilation photons plus DOI measurements. Therefore, the need for DOI detectors to provide simultaneously high sensitivity and high resolution can be realized at the system-design level by employing basic, and hence potentially much less costly, non-DOI detector units. For this design strategy compact detector panels are preferred. Many PET investigators are actively studying the use of compact photo-detectors, including SiPM (Silicon Photomultipliers) and MCP-PMT (Microchannel-plate Photomultiplier Tubes). In addition to their compactness, SiPM and MCP-PMT have high gains so that the readout electronics can be placed at a distance to further increase the detector compactness.

A less evident innovative feature of the invention is the strategy to form system-level integration of the scanner geometry and reconstruction method(s). To meet various imaging needs with the finite hardware resources available to certain small-animal PET systems, it is preferable to consider the use of unconventional scanner geometries, and careful image reconstruction is preferred. Adequate image reconstruction methods are preferred for use with these unconventional scanner geometries. The multi-configuration system development preferably has adequate system-level integration of the system hardware and software components.

It is worthwhile to note that the described system is similar to, but not identical with, the concept of adaptive imaging, which has been proposed for SPECT imaging and extended to PET. In adaptive imaging, one speaks of changing adjustable hardware and software parameters of an imaging system for obtaining optimized results for specific tasks. The adjustments are made with respect to certain task-specific figures-of-merit based on certain prior information about the subject (e.g., scout images of the subject). The system described herein can include, but does not require such adaptive imaging capability. Even in embodiments without adaptive imaging, it offers pre-determined configurations for conducting pre-defined imaging tasks. The adaptive imaging concept can be incorporated for providing fine-tuning of the pre-determined configurations to further improve imaging performance for the pre-defined tasks.

There are several interesting recent trends in the field of positron emission tomography (PET). These include the development of large-area microchannel plate (MCP) photomultipliers (PMTs) and the introduction and improvement of silicon photomultipliers (SiPM). Among other features, these photo-detectors are extremely compact, have high gains (on the order of $10^6$), and can be low cost. In particular, there is high interest in replacing conventional bulky, analog PMTs with the compact, quasi-digital (or even fully-digital) SiPMs. The second trend is the development of high-speed waveform sampling technologies that can allow for maximal utilization of modern, highly powerful digital electronics to accurately analyze PET event pulses in sophisticated ways. For example, currently the DRS4 chip can provide up to a 6 GSps (giga samples per second) sampling rate and it has been used to yield time-of-flight (TOF) timing resolution. One can easily envision the possibility of exploiting the extraordinary computational power of modern digital electronics to improve the performance and stability of PET detectors, to allow ready upgrades as better event-processing algorithms are discovered, and to enable new detector designs. The third trend is the use of model-based image reconstruction methods that can compensate for considerable non-ideal physical responses in PET imaging (such as depth-of-interaction (DOI) blurring) and alleviate certain theoretical constraints on the scanner design. For example, it has been demonstrated that one can build a highly sensitive, extended field-of-view (FOV) small-animal PET scanner using a stationary, compact dual-head geometry in which the issues with substantial DOI blurring and incomplete-view coverage created by the scanner geometry are successfully dealt with in image reconstruction.

The detector may be integrated with additional electronics, such as a computer or other processing device. For example, the detector may include a cable that has a standard electrical connector interface (such as a USB, a BNC connector, a D-subminiature connector and an 8P8C connector). The electrical connector interface may be used to physically connect the cable to another device (such as a computer) and may be used send communications to/from the detector.

Methods

A computer simulation study was conducted to investigate the feasibility of a PET detector design using a Micro-Channel plate (MCP) PMT with transmission-line (TL) readout and waveform sampling. Although the component sizes, layout, materials, and configuration of components in the detector unit may be varied in different embodiments, the detector unit modeled in the simulation and experimentally tested here comprises a 24×24 array of pixelated LSO crystals, each 4×4×25 $mm^3$ in size, and two 102×102 $mm^2$ MCP PMTs coupled to both sides of the scintillator array. The crystal (and TL) pitch was 4.25 mm, and reflective media was inserted between crystals. Signals from the MCP-PMT were read out by using a Transmission-Line (TL) scheme. The transport of optical photons inside the scintillator were simulated using the Geant4 package. The output pulses of the MCP-PMT/TL unit were formed by applying the measured single photo-electron response of the MCP-PMT/TL unit to each individual photon that interacts with the photo-cathode of the MCP-PMT. The waveforms of the pulses at both ends of the TL strips were measured and analyzed to produce energy and timing information for the detected event. An experimental setup was built using a Photonis Planacon MCP (XP85022) and a prototype TL board for measuring the single photo-electron response of the MCP-PMT/TL. The simulation was validated by comparing the predicted output pulses to measurements obtained with a single MCP-PMT/TL coupled to an LSO crystal exposed to 511 keV gamma rays. The measured single photoelectron response (SER) was fed to the simulation of the electrical signal. The validated simulation was then used to investigate the performance of the new detector design. The simulation study results showed an energy resolution of 11% at 511 keV for the detector module. When using a 400-600 keV energy window, a coincidence timing resolution of 323 ps FWHM and a coincidence detection efficiency of 40% for normally incident 511 keV photons were obtained. The position resolution and accuracy were measured to be 2.5 mm in the direction parallel to the TLs, determined by the pitch of the TLs (and crystals). The readout at both ends of the scintillators made it possible to infer the depth of interaction (DOI) based on the energy asymmetry and time differences. The energy and timing obtained at the front- and back-end of the scintillator array also show differences that are correlated with the depth of interaction of the event. The simulation study showed that the design is suitable for Time-of-Flight (TOF) PET with DOI capability.

To test the concern that the material of the MCP affects the energy resolution, the response to 511 keV gamma rays was measured from $F^{18}$ using a 2-crystal test camera. Data were taken with and without a commercial MCP inserted on the face of one crystal (between the source and the crystal). The pulse height spectra from a 2-crystal test camera illuminated by 511 keV gamma rays from $F^{18}$ was measured. The responses of the two channels before the insertion of a commercial MCP before the face of Channel B and the same spectra with the MCP between the source and Channel B showed that the effect of the intervening MCP was manageable. The results show a negligible effect on the resolutions.

The time and energy resolutions for a 24×24 array of LSO crystals, each 25-mm thick with transverse dimensions of 4 mm by 4 mm were simulated. In the simulation, the crystals were separated by a reflective divider, with a resulting crystal pitch of 4.25 mm. In this example, the observed resolutions are 323 ps and 11% in time and energy, respectively. A simulation of the time resolution of a 24×24 array of LSO crystal layers, each 25 mm thick was conducted, resulting in a mean of −0.0004659+/−0.0022054 ns with sigma of 0.1376+/−0.0017 ns and a constant offset of 567.2 ns. Each layer is formed by individual crystals 4 mm by 4 mm. The energy resolution of the simulated array was calculated, resulting in a mean of 510.9 keV, with sigma of 24.06 keV and a constant of 241 keV.

The ability to measure the depth-of-interaction (DOI) of the gamma ray inside the crystal has been the subject of many studies to improve spatial resolution. Thin planar photo-detectors enable two simultaneous and complementary methods of determining the DOI. Gamma rays interacting at different depths in the crystals give a different ratio of energy in the front and back MCP-PMT. The interaction point of a 511 keV gamma ray was stepped in 1 mm steps longitudinally through the crystal array. The plot of the energy asymmetry, $(E_{front}-E_{back})/(E_{front}+E_{back})$, versus the distance from the front of the crystal array in millimeters showed a sinusoidal type function. The ability to measure times with resolutions significantly less than the transit time through the crystal gives another determinant, the time difference between the front and back MCP signals. The time difference as a function of the depth of the interaction of the 511 keV stepped in 1 millimeter steps longitudinally through the crystal array showed the time difference, $(t_{front}-t_{back})$, versus the distance from the front of the crystal array in mm. The time difference increased approximately linearly (with some sigmoidal character) from −150 ps at 0 mm to 150 ps at 25 mm.

Simulations: A Monte-Carlo simulation tool using MATLAB was used to generate model pulses having the temporal and spectral properties of fast photo-detector signals, and to simulate and compare the behavior of the four techniques described above. Both amplitude and timing resolution are estimated as a function of various parameters, such as the number of photo-electrons, the signal-to-noise ratio, and the analog bandwidth of the input section of the front-end electronics. In the case of sampling, the resolution is estimated as a function of the sampling frequency, the number of bits in the analog-to-digital conversion, and the timing jitter of the sampling.

Input signals: In order to run a Monte-Carlo using realistic signals, pulses were synthesized based on measurements of MCP signals. The synthesized signals from the Micro-Channel Plates signals were approximated as the convolution of a triangular waveform having a rise time of 100 ps and fall time on the same order, with a waveform of $(t/\tau)e^{-1/\tau}$ where $\tau$ is set according to the analog bandwidth of the front-end electronics. More accurate results from the Monte-Carlo can, alternatively, be obtained using a more realistic estimation of this waveform. With a 1.5 GHz analog bandwidth, τ was set to 235 ps. This waveform is then convolved with itself, in order to match the MCP pulse shape. The simulated input signals have variable spread in amplitude, implemented by taking into account the number of incident photo-electrons, $N_{pe}$, as normally distributed with σ proportional to $1(N_{pe})^{1/2}$. To average over discrete binning effects, a spread in the initial time was used, distributed uniformly between +τ and τ.

The simulation included both detector shot noise and thermal noise superimposed on the signal. The noise was taken with two contributions: (1) white shot noise from the MCP, which was then shaped by the electronics in the same way as is the MCP output signal; (2) white thermal noise was assumed to originate from the electronics components.

These two noise spectra were weighted so that they contributed equally to the overall signal-to-noise ratio. The signal-to-noise ratio was defined as the ratio of the maximum of the amplitude of the pulse to the rms amplitude of the noise. The analog bandwidth was defined as the frequency at which the system response has dropped by 3 dB. A set of 300 synthesized signals with a mean of 50 photo-electrons, assuming a 1.5 GHz analog bandwidth provided a Fourier spectra of: a noiseless MCP signal, an MCP shot noise, electronics noise, and the final noisy MCP signal, including both sources of noise, for 20 input photo-electrons, and an overall bandwidth of 1.5 GHz. The signal-to-noise ratio was taken to be 32.

Simulation of the leading edge discriminator: In the simulation, the fully simulated waveform (i.e., with noise added as described above) was intersected with a threshold set at the value providing the best timing resolution for a given set of external parameters, such as the analog bandwidth, or the number of photo-electrons. For comparison with actual threshold measurements, some overdrive effects can be considered. The comparators were assumed to be ideal, i.e. the trigger was generated by the first time step in the simulation that had a pulse amplitude over the 'arming' threshold. The threshold was set between 4% and 15% of the average amplitude pulse height to get rid of possible system noise such as baseline variations due to switching power supplies or 50-60 Hz noise pick-up.

Simulation of the multi-threshold discriminator: The multiple-threshold technique intersected the input waveform with several thresholds, typically (but not necessarily) equally spaced between a minimum and a maximum. A fit was then performed, and a single time was extracted as the time-of-arrival of the pulse. As an example, the best-fit time may be taken as the intersection of the fit extrapolated to the intersection with the time axis. For the input parameters chosen, it was found that four thresholds, equally spaced between 10% and 50% of the average pulse height, were enough so that more thresholds did not significantly improve the performance.

Simulation of the constant fraction discriminator: A constant fraction discriminator fired at a fixed fraction of the amplitude of the pulse, relying on the assumption that the pulse shape is independent of amplitude. The implementation considered was that the input pulse was attenuated between 30% and 40%, inverted, and then summed with a version of the pulse delayed between 150 and 200 ps. If the pulse passed a predetermined 'arming' threshold, set in the simulations to between 10% and 20% of the average pulse height, the time of the zero crossing of the summed pulse was measured. As in the case of the leading edge simulation, the parameters were optimized to get the best possible timing resolution for a given set of parameters.

Simulation of pulse waveform sampling: The simulation of pulse waveform sampling performed a number of samples of the signal voltage at equally spaced time intervals, digitized with a given precision in amplitude corresponding to the number of bits assumed in the A-to-D conversion, and added a random jitter in the time of each sample. Sampling rates between 10 and 60 GSa/s have been simulated for A-to-D conversion precisions of between 4 and 16-bits. The analog bandwidth of the MCP device and associated front-end electronics were included in the simulations. An iterative least-squares fit using a noiseless MCP template signal was then applied to the data using the Cleland and Stern algorithm that has been implemented for high resolution calorimetry measurements with liquid argon.

Results of the simulations: The time resolution varied with the number of photo-electrons for the four timing techniques. The number of photo-electrons varied between 15 and 110; the sampling rate was 40 GSa/s, with no sampling jitter. The analog bandwidth was assumed to be 1.5 GHz, and in the case of sampling, the digitization was taken to have a precision of 16 bits. The waveform sampling technique performed the best of the four techniques, particularly for lower numbers of photo-electrons. Note that the sampling technique was relatively insensitive to (random) clock jitter; at 40 GSa/s sampling; jitters smaller than 5 ps did not introduce significant degradation in the resolution. Systematic errors in sampling may be calibrated out with the use of extra calibration channels in the front-end readout.

The timing resolution varied with each technique for a set of parameters chosen as a baseline for use in a future detector: an input signal of 50 photo-electrons, a 1.5 GHz analog bandwidth, and for each technique, a signal-to-noise ratio of 80. The Leading Edge technique had a predicted resolution of 7.1 ps, the Multiple Threshold technique had a predicted resolution of 4.6 ps, the Constant fraction method had a predicted resolution of 2.9 ps, and the Sampling technique had a predicted resolution of 2.3 ps. All Monte-Carlo simulations were run with 300 events; the corresponding statistical uncertainty is on the order of 5%.

Figure 6:
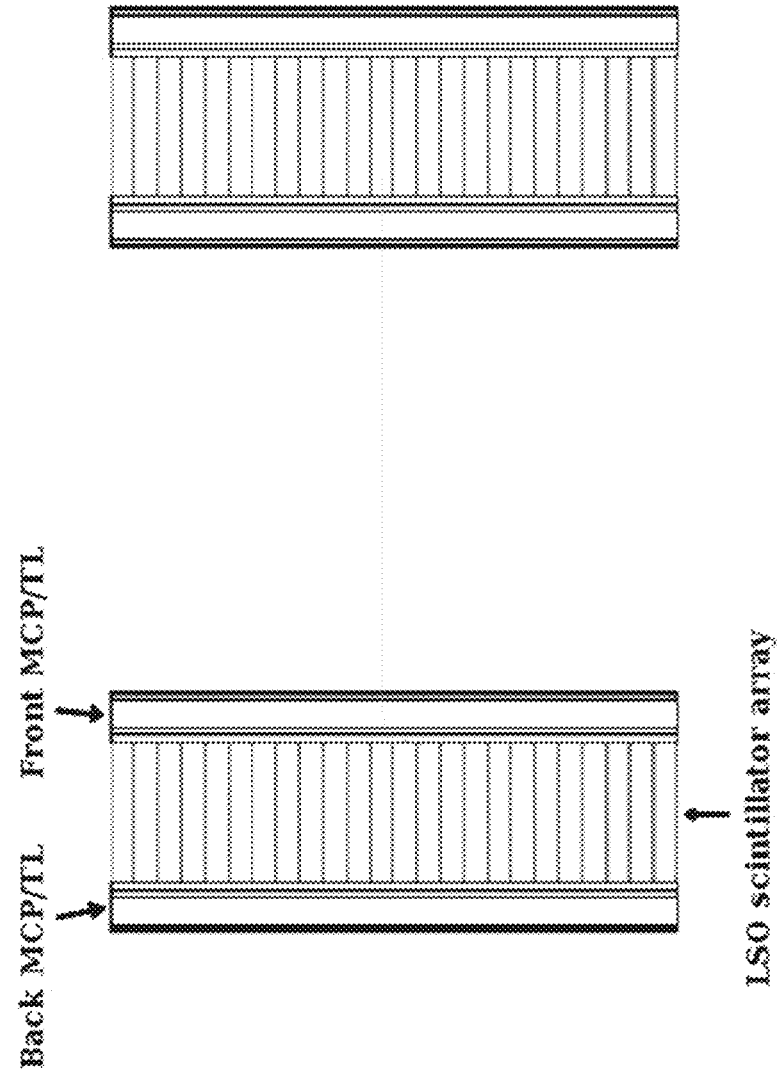
FIG. 6 illustrates a simulation setup with two detector modules. Each module consists of a 24×24 array of lutetium oxyorthosilicate (LSO) crystals with 2 MCP-PMTs coupled to the crystal arrays at both the front and back sides. Each layer is formed by individual crystals 4 mm by 4 mm.

The detector configuration with two modules facing each other is shown in FIG. 6. The two opposing detector modules are arranged for coincidence imaging and illustrate a possible configuration of the detector module. One detector module comprises 24×24 LSO crystal pixels and two MCP PMTs coupled to the front and back sides of the scintillator array. As a scintillator material for PET imaging, LSO was chosen due to its attractive properties of high light yield (20-30/keV), fast decay (~40 ns), high density (7.4 g/cm$^3$) and high effective atomic number, and large photo-fraction (~32.5%). It will be apparent to one skilled in the art that other suitable scintillator materials can be used in the present invention. U.S. Pat. Nos. 7,718,972, 7,417,231 and 7,397,035 and 7,912,177 are hereby incorporated by reference in their entirety herein. Each LSO pixel was 4×4×25 mm$^3$ in size and the crystal pitch was 4.25 mm. The selected crystal size and pitch provides a coincidence imaging resolution of ~2.1 mm, which is adequate for human imaging. Since clinical PET can benefit from the fast timing and large area of the MCP-PMT more than small animal PET, the dimension of the crystal pixel can be chosen to benefit clinical PET applications. Based on the LSO's linear attenuation coefficient (0.88 cm$^{-1}$) at 511 keV, the 25 mm crystal thickness can yield ~89% detection efficiency. Depending on the energy window used, the actual detection efficiency can be considerably lower.

Photonis Planacon MCP PMT (XP85022) was used as a benchmark in this study. The 2×2 Photonis MCPPMT XP85022 and a prototype TL board contains 32 strips, 1024 (32×32) anodes, and the prototype Transmission-Line (TL) board contained 32 micro strips. Each TL strip makes contact with only one row of the MCP PMT anodes, and signals are read out at both ends of the strip. In the simulation study, a 102×102×9.1 mm$^3$ MCP PMT was considered to match the size of the scintillator array. The TL board was assumed to have 24 strips with a 4.25 mm pitch, and these strips were provided the anodes of the MCP PMT.

A MCP-PMT/TL unit has 2D positioning capabilities: Positioning along the direction normal to the TL strips can be derived from the distribution of the relative signal amplitudes received at the TL strips (called "energy-based positioning"). Positioning along the TL strips, on the other hand, can be determined by using the time difference between the pulses reaching the ends of the TL strip (called "time-based positioning"). These positioning methods are discussed herein in detail. Energy-based positioning has been widely and successfully used in PET; on the other hand, time-based positioning is new. Here, this example describes an embodiment in which the front/back MCP-PMT/TLs were oriented orthogonal to one another so that crystal identification could be achieved using energy-based positioning in the event that the time-based positioning did not provide the needed resolution. DOI blurring was expected to be strong with the use of 25 mm thick crystals. Asymmetries between certain properties of the readouts of the front and back MCP-PMT/TL were explored for their utility in providing DOI measurements. Compared to the individual crystal pixel readout, the TL scheme reduces the number of readout channels efficiently (e.g., 576 electronics channels can be needed to read individual crystal pixel outputs whereas the TL scheme reduces the number of channels to 48.)

Geant4-based codes were developed to simulate the interactions between the gamma rays and the detector and the generation and transport of optical photons inside the scintillator array. The optical photon's behavior at the boundary surfaces was followed using the UNIFIED model. The surface of the scintillator was treated as ground, except for the interface to the MCP, which was polished and treated with optical grease for better light collection. Reflective media was inserted between the scintillator crystals in the array. For the coincidence event simulation, 511 keV gamma pairs were generated back-to-back to impinge on the centers of the two modules. To study the effects of depth of interaction (DOI), the injection position of 511 keV gamma was varied along the long side of the scintillator.

For every gamma-ray photon interacting with the detector, the Geant4 codes generated a list of scintillation photons that reached the MCP-PMT photo-cathode, recording the position and time for individual photons. An electrical signal was formed using Geant4 simulation outputs of the optical photon. In the simulation, the optical photon stops when it hits the photocathode of the MCP PMT and the position and time at the photocathode are recorded. The following procedure was then applied to this photon list to generate the electrical pulses on the TL strips.

1. A photo-electron was generated or not for each photon, in accordance with the wavelength of the photon and the quantum efficiency (QE) of the MCP-PMT at this wavelength. The QE provided by the manufacturer was used. The manufacturer provided the quantum efficiency (QE) of the XP85022MCP as a function of the photon wavelength (as given by the XP85022 specification sheet). The spectra of the optical photons arriving at the photocathode before and after accounting for the QE were simulated using the Geant4 package. A photo-electron was generated at the time and position the photon hit the photo-cathode.

2. Electron amplification within the MCP-PMT was assumed to take place and the electron cloud was assumed to follow a normal line from the release position of the photo-electron at the photo-cathode plane to the anode plane. At the anode plane, the amplified electrons were assigned to the position on the closest TL strip.

3. The amplified electrons were then spread to the adjacent TL strips in accordance with the measurements obtained with the MCP-PMT/TL described above.

4. Each electron reaching a TL strip induced a single electron response (SER); hence, the resulting pulse was a convolution of the SER with the history function of the electron arriving at the TL strip. The SER was again measured by using the MCP-PMT/TL described above. To account for variations in the MCP-PMT gain and electron transit time, the amplitude of the measured SER was randomly varied by 80% FWHM and the transit time by 80 ps FWHM. The integrated charge distribution due to a single photoelectron was calculated. Due to signal spread, charges of three TL pulses were summed together. Charge generated by a single photoelectron was estimated to be 0.1186 pC by Gaussian fitting. The averaged pulse shape of a single photoelectron from ~10K events was narrowly distributed on the nanosecond timescale. In both cases, Gaussian distributions were assumed.

The above procedure generated electrical pulses at locations on the TL strips in a neighborhood below the position where the photo-electron was released on the photo-cathode. By using measured SER and signal spread, the simulation incorporated the characteristics of real MCP-PMTs and TL boards. The measurement procedures are described elsewhere herein.

Experimental Tests for Simulation calibration. The test setup was built by using a Photonis XP85022 MCP PMT and a prototype TL board. The main purpose of the setup was to obtain the single photoelectron response (SER) of the MCP/TL. As discussed herein, the measured SER was used in forming the MCP/TL signals to make the simulation more accurate. Another aim was to measure the responses to 511 keV gamma radiation. For this, the MCP/TL was coupled with LSO and an additional LSO/PMT was used for the coincidence setup. The real coincidence setup was also simulated separately and the measured results were compared with the simulation for validation.

The single photo-electron response (SER) was measured using a Photonis XP85022 MCP-PMT and prototype TL board for calibrating our simulation codes. The coincidence response of the MCP-PMT/TL coupled to a single LSO with an additional LSO/PMT (Hamamatsu R9800) unit was measured to validate the developed simulation codes.

The XP8500 MCP PMT was assembled on top of the TL board. In this assembly, four TLs traversed the middle of the MCP with SMA-type connectors for readout. XP85022 is a chevron-shaped MCP PMT with a pore diameter of 25 μm and 1024 (32×32) anodes. The prototype TL board had 32 micro strips with 1.6 mm pitch to match the XP85022 MCP PMT anodes. One TL strip made contact with one row of the MCP PMT anodes and signals from the six MCP PMT were read out at both ends of the TL. Four TL channels were read out with SMA type connectors. The waveform from the TL board was recorded by a Tektronix DPO7354 digital oscilloscope that samples the waveform at 10-20 GSps.

For measuring the SER of the MCP-PMT/TL, an LED (CMD204UWC-ND, CML Tech. Inc.) encased in a cylindrical holder was placed on top of the MCP-PMT. The light from the LED was localized through a 0.8 mm diameter aperture and was controlled by a pulse generator (Lecroy 9211) at single-photon level. The high voltage (HV) for the XP85022 was provided by a Fluke 415B HV supply, at −2300V. The waveforms of the output pulses at three TLs were recorded by using a Tektronix DPO7354 digital oscilloscope that samples the waveform at 10-20 GS/s sampling rate. For measurements described in this section, only one side of the TLs was sampled with the other side terminated with 50 ohm to avoid reflection. A correction factor of 2 was applied to the gain calculation. The spread of the signal across TLs in response to a single photo-electron was observed to be larger than the TL pitch. Therefore, the charge induced by a single photo-electron was obtained by integrating the pulses from all three TLs. The mean of the resulting distribution was obtained by a Gaussian fit. This yielded a mean value of 0.1186 pC per single photo-electron, which is equivalent to a gain of ~1.5×10^6. In addition, the fitting yielded a FWHM of ~80%. The absolute gain of the MCP-PMT/TL was similarly measured for HV from −2100V and −2500V. The result of the XP85022 MCP gain as a function of HV, in which each data point was calculated from the measured charge distribution, indicated that the gain grew exponentially with HV. Unless mentioned otherwise, the tests described below were all conducted at −2300V.

The measured SER was obtained by averaging ~10K pulses in the set given by ±1.5σ of the mean. These pulses were aligned by fixing their peaks at the same time position. The SER showed a rise time of 560 ps.

The mean of the integrated charge was obtained by a Gaussian fit of the distribution. For this, the amplitude of ~10K events around the mean (within ±1.5K) were averaged. Timing jitter between events was corrected by fixing the peak of pulses at the same point. The rise time of SER was estimated to be ~560 ps.

The absolute gain of XP85022 was measured from the integrated charge. By varying HV in the −2100 V to −2500 V range, the gain as a function of HV was obtained and was well fitted by an exponential function as expected. The gain at −2300 V, which was the nominal HV for the other tests, was estimated as ~1.5×10^6 from the fit. During data acquisition, only one side of the TLs was used and the other was terminated with 50Ω to avoid a reflection. This was corrected by multiplying a factor of 2 in the absolute gain calculation.

Figure 13:
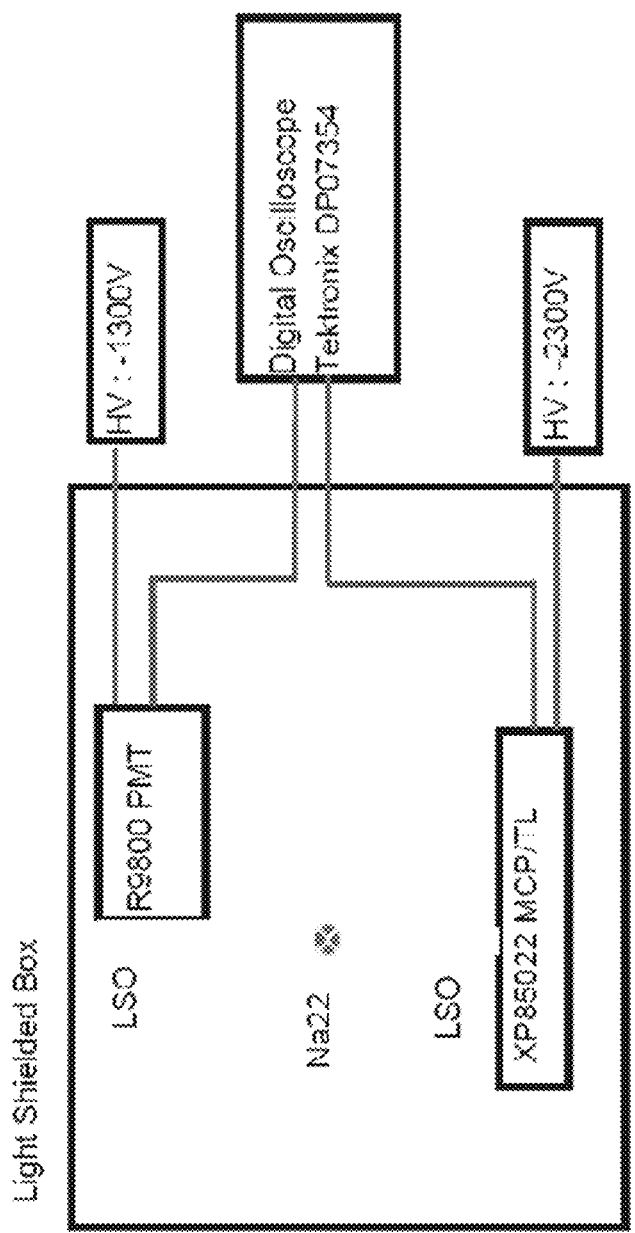
FIG. 13 is a block diagram of the experimental setup for detecting 511 keV gamma coincidence events.

Responses to 511 keV gamma rays: An LSO scintillator of 1×1×10 mm$^3$ was coupled to the XP85022 MCP/TL for measuring the responses to 511 keV gamma radiation. All the surfaces of the scintillator were polished. For a coincidence detector, another LSO of 6.25×6.25×25 mm$^3$ coupled to a Hamamatsu R9800 PMT was placed 3 cm away. The long sides of two LSO scintillators were aligned to increase the coincidence rate. Na$^{22}$ of ~1 µCi activity was used as the positron source halfway between the two crystals (FIG. 13). The waveforms from three TLs and R9800 PMT were recorded by the DPO7354 oscilloscope. The coincidence events were triggered at a 40 mV threshold for the R9800 PMT and a 8 mV threshold for the MCP/TL, respectively. The typical pulse shapes (waveforms) from the maximum signal MCP-PMT/TL strip and R9800 PMT were measured. The waveforms were recorded using a DPO7354 oscilloscope at a 20 GS/s sampling rate. FIG. 13 shows the block diagram of the coincidence setup.

The integrated charge distribution of the MCP/TL from experiment and simulation showed a ~22% FWHM (~16% in simulation) energy resolution obtained by applying a Gaussian fit to the peak corresponding to 511 keV. Charges from the three TLs were summed. The peak corresponding to 511 keV and the Compton continuum was seen clearly separated. The energy resolution at the peak was ~22% in FWHM. For comparison, the charge distribution was also obtained from simulations of the coincidence setup in the same way. In the simulation, the MCP signal was not fully confined in three TLs: ~87% of energy was contained in three TLs according to the simulation. In the simulation, the collection efficiency (CE) was applied to reflect the open area ratio of the MCP in addition to the QE of the MCP photocathode. To make the simulation peak value agree with the experimental result, the CE was adjusted to 0.8, which was consistent with the value from the XP85022 specification sheet.

The distributions obtained by measurement and simulation agreed well qualitatively. Two notable differences were the shape of Compton-scattering component and the energy resolution at peak: an energy resolution of 22% from measurement and 16% from simulation was observed. These differences may be due to incomplete readouts by using only three TL strips. To address this issue, full readout of the 32 TL strip can be achieved using alternative configurations of the TL board.

The coincidence time distributions of the MCP/TL and R9800 PMT obtained by measurement and simulation were compared. A coincidence timing resolution of ~416 ps FWHM (~398 ps in simulation) was estimated from Gaussian fits. The waveforms were recorded using a DPO7354 oscilloscope at 20 GS/s sampling. These distributions were obtained by including events having an integrated charge between 35 and 60 pC on the MCP-PMT/TL, which was equivalent to energy windows of 415 and 710 keV. For both the real and simulation data, event timing was determined by the leading-edge (LE) time pickup method with 3 mV and 50 mV thresholds to the signal waveforms of the MCP-PMT/TL and R9800 PMT, respectively. These threshold levels correspond 10% of the maximum amplitudes of the signal generated by the respective detectors. By applying a Gaussian fit, the coincidence timing resolution was measured to be 416 ps FWHM from the measurement and 398 ps FWHM from simulation. Again, the simulation and measurement results agreed quite well. By using two identical LSO/R9800 PMTs, the contribution from the R9800 PMT to the coincidence timing resolution was estimated to be 200 ps FWHM. Thus, the timing resolution of the MCP-PMT/TL is estimated to 360 ps FWHM.

20K simulated events were analyzed. In each event, two 511 keV gamma were injected to the central scintillator pixel of the detector whose coordinate was (2.125 mm, 2.125 mm) in XY. Positron range and non-colinearity were not considered in the gamma generation. The signal pulses of the MCP/TL were formed by applying the measured SER of the XP85022 MCP/TL to the detected photoelectron as explained in the Methods section. The gain variation of a single photoelectron (80% FWHM) and the transit time spread (80 ps FWHM) were taken into account for each photoelectron.

To obtain energy in each event, the TL strip having the maximum signal was searched (called the maximum TL strip below) and then the signals of the five TL strips, having the maximum TL strip at the center, were summed. The results of the front and back MCP/TLs of a detector module were then summed to provide the energy measurement for an event. The pulse height spectrum obtained at one detector module indicated a peak at zero energy corresponding to the events that passed the scintillator array without interaction. Fitting the photo-peak with a Gaussian function indicated a 11% (FWHM) energy resolution at 511 keV.

The event time was obtained by applying the LE time pickup method using a 3 mV threshold to the waveforms obtained at the maximum TL strip. The measured timings at the front and back MCP/TL were averaged to reduce the effect of DOI on the timing determination. The coincidence timing histogram obtained by using a 400-600 keV energy window showed ~323 ps FWHM coincidence timing resolution. With this energy window, the detection efficiency for normally incident coincidence events was measured to be ~40% (each module had a detection efficiency of ~63%). Event time in each module was determined by applying the LE pickup method, using a 3 mV threshold, to the waveforms obtained at the maximum TL strip. A coincidence timing resolution of ~323 ps FWHM was estimated from Gaussian fit.

The energy weighted centroid of the most energetic five TLs was taken as the interaction position. The coordinates in two dimensions were calculated separately from the front/back MCP/TL. The histogram of the resulting X position was calculated by applying the centroid method to the front MCP/TL signals for events in the energy window of 400-600 keV. Positions were reconstructed using (a) the spatial centroid and (b) the time differences on the TLs, calculated from the histogram of the Y coordinate time differences on the maximum TL strip. Since the scintillator was pixilated with a polished side surface all the way to the MCP, the light produced in a scintillator was highly localized and resulted in the discrete pattern of the reconstructed position. For multiple-scattering events that deposit their energies in multiple crystals, the energy-based positioning may result in incorrect estimates of the event position. The coordinate along the TL was also determined based on the time difference at both ends of the TL by using Eq. 1. For the signal propagation speed of V, a measured value of 1.1 mm/ps was used. The mean of the position histogram, 2.236 mm, RMS 1.975 mm, Integral 6157, was consistent with the result using the centroid method. The FWHM of the distribution was comparable to the 4.25 mm of the scintillator pitch.

Small shoulders in the spatial distribution histogram, used for centroid determination, corresponded to mis-positioned events. For comparison, the histogram of the event position obtained by applying time-based positioning to the back MCP-PMT/TL was slightly broader, with a mean of 2.172 mm, RMS ~2.5 mm, and integral of 6164. (The front and back MCP-PMT/TLs are placed in orthogonal directions; therefore this provides a position estimate in the same direction as described above). The mean of the position was consistent with that generated by energy-based positioning applied to the front MCP-PMT/TL. It was not discrete, however, and had a FWHM of 2.5 mm. This resolution is adequate for the 4.25 mm crystal pitch investigated.

The energy asymmetry and time difference between the front and back MCP-PMT/TL was correlated with the DOI. Energy asymmetry was defined as the ratio $(E_{front} - E_{back})/(E_{front} + E_{back})$, where $E_{front}$ and $E_{back}$ are the event energy measured by the front and back MCP-MPT/TLs, respectively. The time difference is the difference between the event time observed at the most energetic TL strip on the front and back MCP-PMT/TLs. In a study, 511 keV gamma radiation was injected from the side of the scintillator array along the Z axis with 1 mm steps along the depth. At each injection point, 20K events were generated. The correlations of the energy asymmetry and the time difference at the front and back MCP-PMTs as a function of the gamma injection position along the Z axis (known depth) of the scintillator were calculated. The time difference and DOI were clearly linearly correlated. Without wishing to be bound by theory, the S-shape curve observed for the correlation between the energy asymmetry and DOI might be due to total internal reflection: When optical photons are generated closer to the ends of the scintillator, a larger amount of light bounces back at the boundary of LSO/MCP by total internal reflection. In addition to using the correlation in time-difference, exploiting this distinctive feature can improve DOI measurement.

A simulation package based on MATLAB models the time resolution for fast pulses from photo-detectors and demonstrates signal detection for the present invention. Using the parameters measured from commercial micro-channel plate photo-multipliers as an example, the time-resolutions for four signal processing techniques were simulated and compared: leading edge discriminators, constant fraction discriminators, multiple-threshold discriminators and pulse waveform sampling. Timing using pulse waveform sampling gives the best resolution in the presence of white noise and a substantial signal, such as fifty photo-electrons. With micro-channel plate photo-detectors, the simulations show a precision of several picoseconds or better with pulse sampling given large-enough input signals. At high sampling rates of the order of 40 GHz, a relatively low precision digitization (8-bit) can be used. For large-area photo-detectors a lower sampling rate and longer buffer, such as in existing sampling chips are a developed economical and low-risk solution.

Time resolution versus the number of primary photo-electrons, for the four different timing techniques were measured, including one-threshold, constant fraction, multiple threshold, and pulse sampling at 40 GHz. All time resolutions decreased from ~10-~20 ps at 20 photoelectrons to ~1-~5 ps for 100 photoelectrons. The analog bandwidth of the input to the sampling is taken to be 1 GHz, no sampling jitter was added. The time resolution of the 20 photoelectrons decreased from 30 ps at 0.5 GHz to about 5 ps at 4 GHz, and the time resolution of the 50 photoelectrons decreased from 10 ps at 0.5 GHz to about 1 ps at 4 GHz. Time resolution versus analog bandwidth for a fixed sampling rate of 40 GS/s, for input signals of 20 and 50 photo-electrons and an 8-bit A-to-D precision was measured. The time-resolution versus the number of photo-electrons for the four timing techniques. The number of photo-electrons is varied between between 10 and 110; the sampling rate is 40 GHz, with no sampling jitter. The analog bandwidth is assumed to be 1 GHz, and the digitization is 16 bits.

The pulse sampling technique performed best of the four techniques, particularly for lower numbers of photo-electrons. Note that the sampling technique was relatively insensitive to (random) clock jitter; at 40 GHz sampling; jitters smaller than 5 ps did not introduce significant degradation in the resolution.

The dependence of the time resolution with the analog bandwidth for the baseline sampling rate of 40 GS/s was simulated. The degradation of the time resolution at high analog bandwidths is due to the fact that fewer points participated in the timing extraction, since the signal gets shorter. The time resolution versus analog bandwidth for a sampling rate proportional to the analog bandwidth, and shows the resolution improving with analog bandwidth/sampling rate, as expected.

Figure 11:
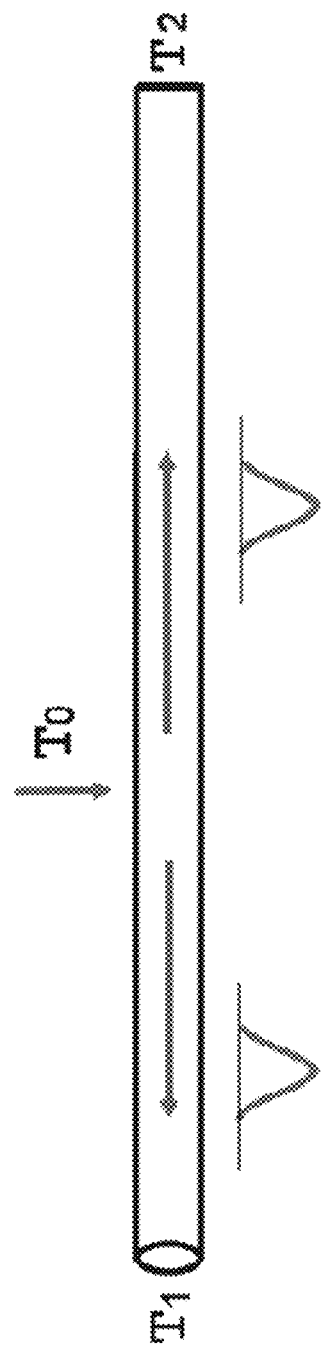
FIG. 11 shows a schematic illustrating the principle of TL readout. Upon arrival of an electron cloud at a position along the TL at time $T_0$ at the location indicated, two correlated pulses are generated which propagate toward the ends of the TL, where they are detected. By measuring the time difference for pulse arrival at the two ends of the TL, the interaction position along the TL can be calculated. The summed amplitude of the signals measured at the two TL ends yields the amplitude of the input signal. The average of the event times obtained at the ends ($T_1$ and $T_2$) gives the event time $T_0$ (plus a constant offset).
Figure 12:
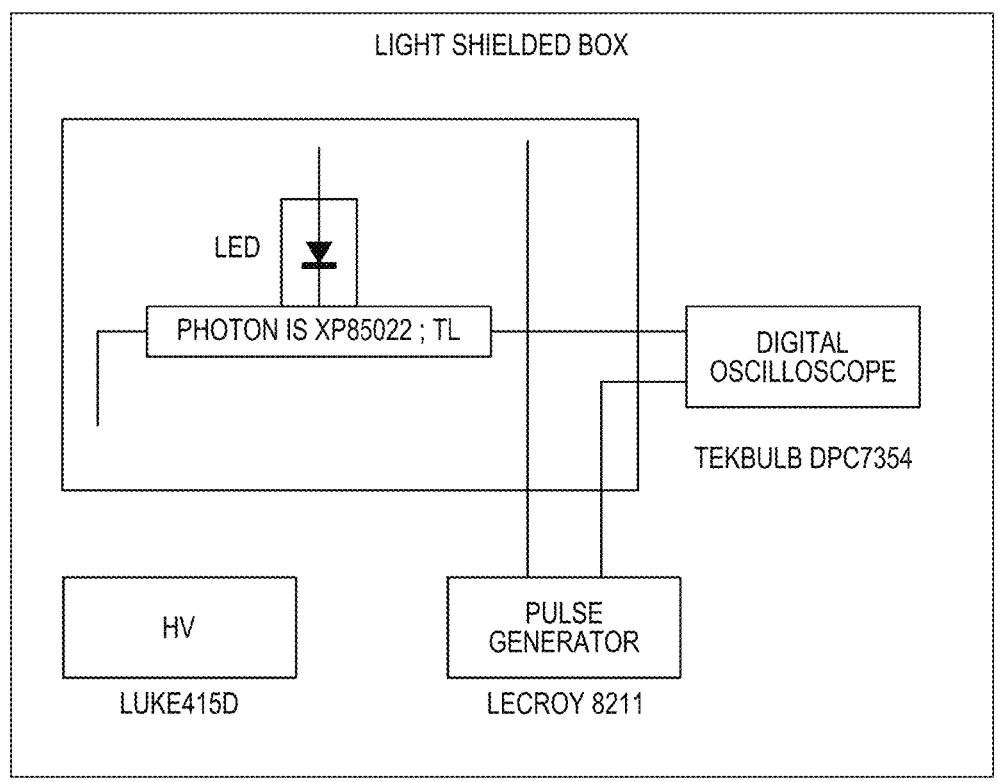
FIG. 12 illustrates a block diagram for measuring the single electron response (SER) using an LED light source.

FIG. 11 depicts the TL readout scheme. After the charge clouds are amplified through MCP channels, the two electrical pulses generated on a TL strip by the procedure described above can propagate in opposite directions to reach the ends of the TL strip at a characteristic speed (such as a measured speed of propagation of 1.1 mm/10 ps). Since, in certain embodiments, the TL board has a wide bandwidth, one can assume no degradation to the pulse shape as it propagates along the TL strip. Also, no electronic noise was introduced. At the ends of the TL strips, the waveforms of the pulses may be recorded with a 10-40 GS/s sampling rate (or more particularly at a 20 GS/s sampling rate) at each end of the TL, which may be achieved using a digital oscilloscope. From the waveforms at the TLs, event information is obtained as follows: The event energy observed on a particular TL strip was estimated by using the summed amplitudes of the two pulses measured at its ends, i.e., by summing its waveform samples. Let $e_i$ denote the energy observed on the ith TL strip, the detected energy of the event was then estimated by $$e = \Sigma_i e_i. \quad (1)$$

In energy-based positioning, the detected position of the event normal to the TL strips was calculated by using $$y = \Sigma_i e_i y_i / \Sigma_i e_i, \quad (2)$$

where $y_i$ is the position of the ith TL strip. In the current study, the above summation was performed over five TL strips surrounding the maximum-energy TL strip (a simulation study showed that these five TL strips collected about 98% of the total signal). The arrival time of the pulse observed at one end of the TL strip was determined by using leading-edge (LE) discrimination employing a fixed voltage threshold (such, for example, as 3 mV). Let t denote the time electrons reaching the TL strip, and $t_1$ and $t_2$ the observed arrival time at the two ends of the TL strip. Clearly, $t_1 = t + l_1/v$ and $t_2 = t + l_2/v$, where $l_1$ and $l_2$ are the path lengths that the pulses travel to reach the ends and v is the propagation speed of the pulse. It follows that $$t = \frac{1}{2}(t_1 + t_2) - \frac{L}{2v} \quad (3)$$

$$l_2 = \frac{v}{2}(t_2 - t_1) + \frac{L}{2}, \quad (4)$$

where $L = l_1 + l_2$ is the length of the TL strip. Neglecting the constant terms, the detection time of the event on a TL strip could be estimated from the average of the arrival times observed at its two ends. Similarly, the detected position of the event along the TL strip can be estimated by using time-based positioning given by $x = v(t_2 - t_1)/2$.

Certain embodiments of the detector design contain two MCP-PMT/TL, each of which can generate estimates for the energy and 2D position of the event, and also detection time, on every TL strip. The sum of the estimated event energies obtained by these MCP-PMT/TL then yielded the final estimate for the event energy. The event time was taken as the average of arrival times determined at both ends of the TL strip receiving the maximum energy. As mentioned above, the two MCP-PMT/TL were placed in orthogonal directions. Therefore, one can obtain the 2D event position by using either energy-based positioning, time-based positioning, or some combination of them. The average of arrival times determined at both ends is taken as the event time. The interaction position is extracted from the energy-weighted position of the five TLs around the maximum-energy TL. The readout configuration using two MCPs makes it possible to determine the position in two dimensions. The 24 strips in the front MCP PMT run vertically to give the X coordinate. On the other hand, the strips in the back MCP PMT are rotated 90° with respect to the front TL for decoding the Y coordinate. In addition, the Y (X) position along the front (back) TL is also calculable from the measured time difference of the TL as follows, $X = (T_1 - T_2)/2 \times V$, where $T_1$ and $T_2$ are the arrival times at the ends of the TL and V is the propagation speed of the signal on the TL. Compared to the individual crystal pixel readout, the TL scheme reduces the number of readout channels efficiently (e.g., 576 can be needed to read individual outputs while the TL scheme reduces it to only 48.)

In each event, a unit of radiation, for example, but not limited to a gamma ray, alpha or beta particle, hadron, electron, or any other units of radiation known in the art is injected to a scintillator pixel of the detector. The signal pulses of the MCP/TL are formed by applying the measured SER of the XP85022 MCP/TL to the detected photoelectron as explained in the Methods section. The gain variation of a single photoelectron and the transit time spread are considered for each photoelectron.

To obtain energy in each event, the TL strip having the maximum signal was searched (called the maximum TL strip below) and then the signals of the five TL strips, having the maximum TL strip at the center, were summed. The results of the front and back MCP/TLs of a detector module were then summed to provide the energy measurement for an event. The pulse height spectrum obtained at one detector module indicated a peak at zero energy corresponding to the events that passed the scintillator array without interaction. Fitting the photo-peak with a Gaussian function indicates the FWHM energy resolution at a particular energy, which can vary.

The event time can be obtained by applying the LE time pickup method using a voltage threshold to the waveforms obtained at the maximum TL strip. The measured timings at the front and back MCP/TL were averaged to reduce the effect of DOI on the timing determination. The coincidence timing histogram obtained by using a given energy window can be used to determine the FWHM coincidence timing resolution. With this energy window, the detection efficiency for normally incident coincidence events can be measured according to each module detection efficiency. Event time in each module was determined by applying the LE pickup method, using a voltage threshold, to the waveforms obtained at the maximum TL strip. A coincidence timing resolution FWHM may be estimated from Gaussian fit.

The energy weighted centroid of the most energetic five TLs may be taken as the interaction position. The coordinates in two dimensions were calculated separately from the front/back MCP/TL. The histogram of the resulting X position was calculated by applying the centroid method to the front MCP/TL signals for events in the energy window. Positions were reconstructed using (a) the spatial centroid and (b) the time differences on the TLs, calculated from the histogram of the Y coordinate time differences on the maximum TL strip. Since the scintillator was pixilated with a polished side surface all the way to the MCP, the light produced in a scintillator was highly localized and resulted in the discrete pattern of the reconstructed position. For multiple-scattering events that deposit their energies in multiple crystals, the energy-based positioning may result in incorrect estimates of the event position. The coordinate along the TL was also determined based on the time difference at both ends of the TL by using Eq. 1. For the signal propagation speed of V, a measured value may be used. In some embodiments, the FWHM of the distribution may be comparable to the scintillator pitch.

Small shoulders in the spatial distribution histogram, used for centroid determination, can correspond to mis-positioned events. For comparison, the histogram of the event position obtained by applying time-based positioning to the back MCP-PMT/TL may be slightly broader. (The front and back MCP-PMT/TLs are placed in orthogonal directions; therefore this provides a position estimate in the same direction as described above). The mean of the position was consistent with that generated by energy-based positioning applied to the front MCP-PMT/TL. This resolution is adequate for crystal pitch.

A PET detector design is described herein which, in certain embodiments, adopts MCP PMTs and a TL readout scheme. The detector, in certain embodiments, comprises, for example, a 24×24 LSO scintillator array coupled to two MCP/TL assemblies at the front and back faces of the array. Geant4-based simulation codes were developed and validated through measurements. The experimental tests were conducted using a Photonis XP85022 MCP PMT and a prototype TL board. In the study, an ~11% energy resolution was obtained at 511 keV and ~323 ps FWHM coincidence timing resolution while attaining ~40% coincidence detection efficiency with a 400-600 keV energy window. When applying energy-based positioning, the event position could be accurately located to the center of the interacting crystal. When using time-based positioning, the event position could also be accurately estimated in the mean, with a spread of 2.5 mm FWHM. The energy asymmetry and time difference of the signals measured by the front and back MCP-PMT/TLs showed strong correlations with the DOI. The simulation results show that the design is suitable for TOF PET with high sensitivity and DOI capability.

The results reported here were obtained by using simple processing of the output signals. It will be readily apparent to one skilled in the art that advanced processing techniques can be used to achieve better performance properties. For example, the signal waveforms at the TL can be sampled and digitally processed for producing more accurate arrival-time estimates (and more accurate positioning along the TL when estimated by using the arrival time difference) than the LE method. It is also possible to analyze the spatial pattern of the TL signals for improving estimates of the event position, timing, and DOI.

Multi-Configuration PET

Multi-configuration positron emission tomographs (PET) that employ a few compact and flat detector panels are described for us in, for example, small animal PET systems using four such detector panels. The technique described here is not limited to small animal PET and can also be applied to other animals, mammals, and, in particular, humans. FIG. 14 illustrates sample scanner geometries of interest.

An example of a re-configurable system design for positron emission tomography (PET) for the purpose of maximizing the cost effectiveness of a PET system design is described. In this system, a PET system employs a number of compact, flat-panel (cFP) PET detectors (such as MCP-PMT and/or MCP-PMT-TL), to assume various scanner geometries to yield performance properties that are desired by various imaging applications. Consequently, the imaging needs in a range of applications can be met without requiring the development of dedicated systems for each application. For the purpose of demonstration, a re-configurable small-animal system consisting of four cFP detectors that are approximately 8×8 $cm^2$ in size and made of 10 mm thick LSO is described. Several possible scanner geometries are considered. Monte-Carlo simulations have been run to study their sensitivity, scatter fraction, random fraction, and noise-equivalent count rates. The results indicate that in terms of sensitivity the re-configurable system described meets a wide range of performance properties in small-animal imaging.

In this example, a prototype stationary, high-sensitivity small-animal PET tabletop prototype scanner was constructed that employed two large-area detector panels (which are detector heads of the High-Resolution Research Tomograph (HRRT) developed by Siemens for human brain imaging) and model-based image reconstruction. The detectors are 25×17 $cm^2$ in size and contain 20 mm double-layered LSO crystals. The detector spacing in this example was 6 cm. A resolution phantom demonstrated that the scanner in this configuration could provide 1.2 mm spatial resolution. No image artifacts were observed in a whole-body rat image (MW rendering) obtained at a single bed position. Comparison of the NECR curves obtained for a mouse- and rat-sized cylinder (45 $cm^3$ and 220 $cm^3$) at various lower energy window settings (the upper energy window is fixed at 750 keV) with the reported peak NECRs of other micro PET systems indicated the scanner is substantially more sensitive at the typical radioactivity range than those currently employed in FDG-PET rodent imaging. In fact, with the advent of TV-based image reconstruction methods (as described, for example, in U.S. Pat. No. 8,605,975, incorporated by reference herein in its entirety) many theoretical constraints on the imaging configuration can now be eliminated to provide more flexible, non-conventional PET system geometries.

Figure 22:
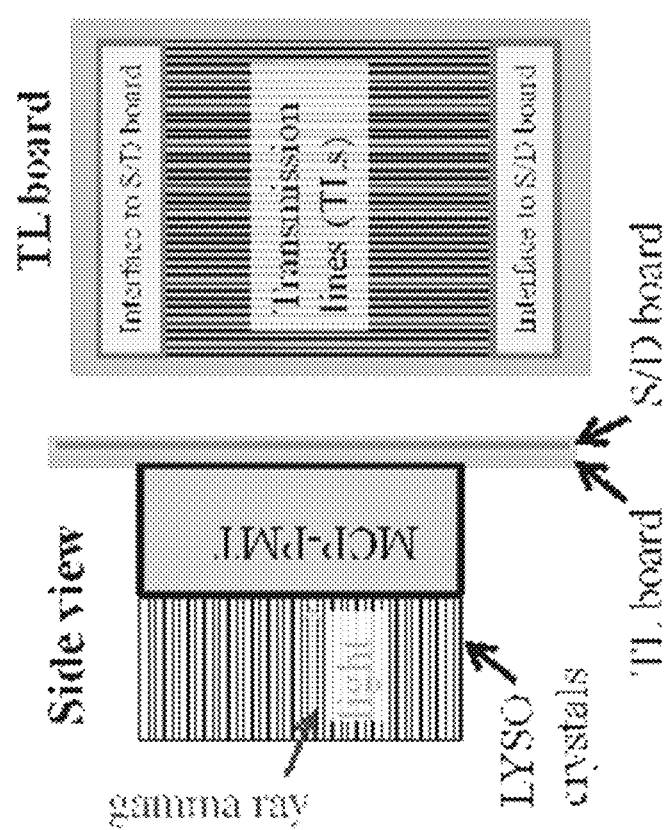
FIG. 22 shows a schematic illustration of the design of a cFP PET detector based on MCP-PMT, transmission-line (TL) readout scheme, waveform sampling and digital signal processing for the inside-out design. (Left) In this example, a gamma ray enters a radiation-creating material (shown here as a Cerium-doped Lutetium Yttrium Orthosilicate (LYSO) crystal, the photons created by the interaction between the gamma ray and the LYSO crystal are converted to an electron cascade in the photodetector (for example, the MCP-PMT shown here), the electrons impinge on the transmission line anodes of the TL board, the ends of which interface to the S/D board. (Right) a front-view of the TL board.

The present invention can use compact, flat-panel (cFP) PET detectors that make use of compact photo-detectors, waveform sampling, and digital signal processing (DSP). Such a cFP detector can be compact, can have a single high-speed serial input/output connection, and can be robust to use. Such cFP detectors (see FIG. 22) can be based on large-area MCP-PMT technology. Waveforms can be sampled by time- or voltage-based methods, and the resulting waveform samples can be digitally processed to yield event energy, position and time. The commercial 2"×2" Photonis Planacon XP85022 MCP-PMT was used in a prototype detector. A prototype TL board provided 32 TLs (1.6 mm pitch) for reading a custom-made 32×32 anode structures of the XP85022 MCP-PMT. The TLs were read at both ends. The experimental prototype demonstration described below provided readout for 6 TLs only. The DSR4 evaluation board had 4 channels for time-based sampling (i.e., at regular, pre-defined time intervals) at 5 GSps. Alternative are possible, including for example, one in which a voltage-based sampling technique in which waveforms are sampled with respect to a few user-defined voltage thresholds is used to circumvent the needs for high sampling rate to accurately capture the temporal transitions of the event pulses generated by fast scintillators and fast photo-detectors. In the re-configurable system design described herein, a PET system can employ a number of cFP detectors to assume various scanner geometries to yield, in conjunction with the use of model-based image reconstruction methods, sensitivity and resolution performance properties that are useful for various imaging applications. As a result, substantially different imaging needs can be met without requiring the development of dedicated PET systems.

Small-animal imaging applications, for example, are considered here. A re-configurable PET system is described which employs four cFP detectors. Monte-Carlo simulations were conducted to model the detection performance of the system for various scanner geometries.

Figure 23:
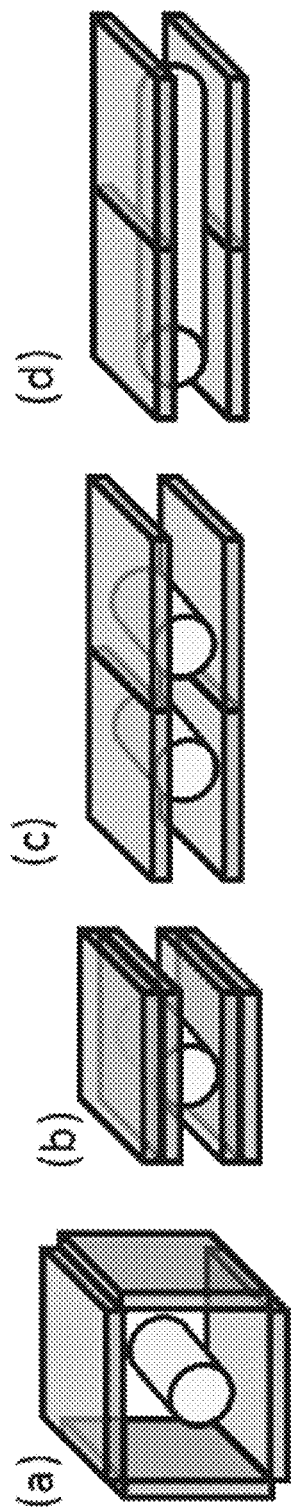
FIG. 23 shows scanner geometries of a re-configurable small-animal PET system. The rectangles represent the cFP detectors and the cylinders indicate the subjects.
Figure 28:
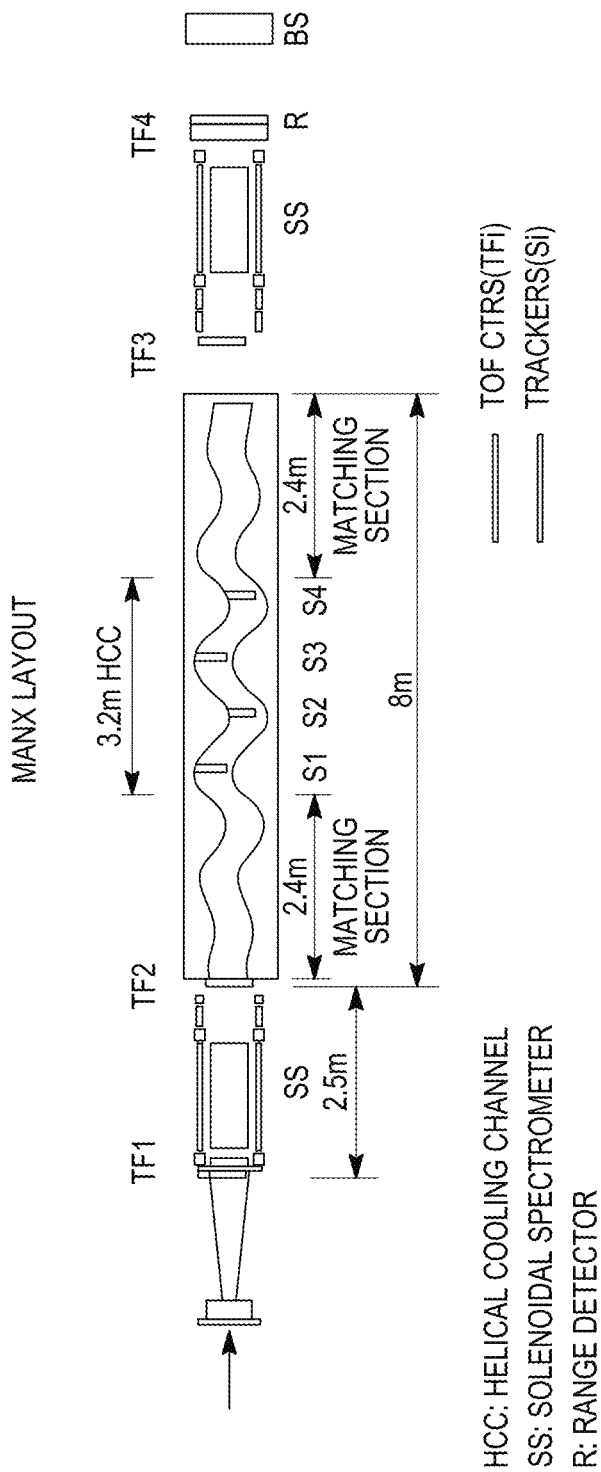
FIG. 28 shows the layout of the MANX muon cooling experiment. The Helical Cooling Channel (HCC) is a 3.2 m-long helical solenoidal magnet filled with liquid helium, with matching section magnets filled with helium at STP.
Figure 29:
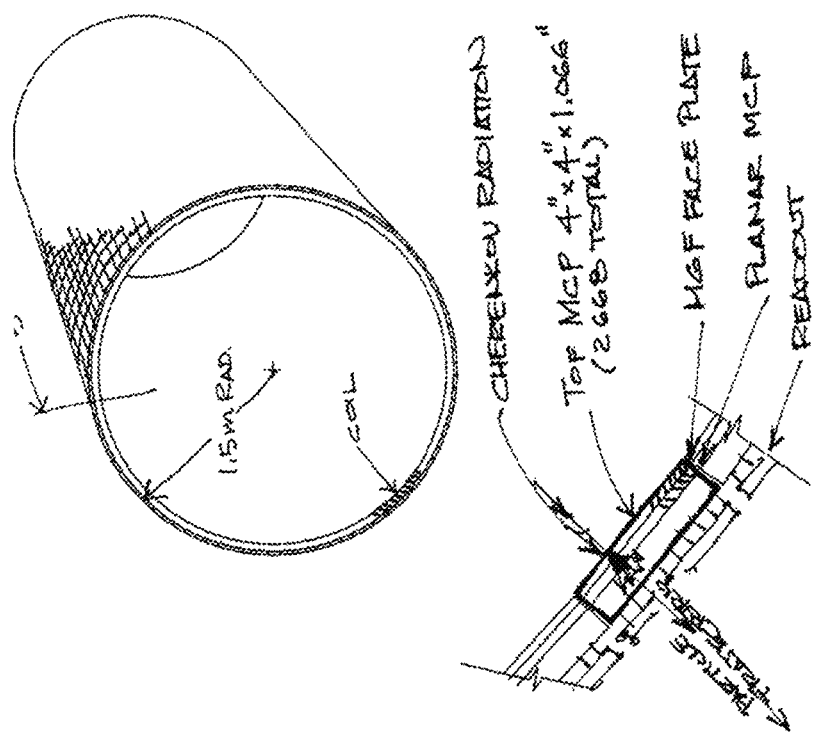
FIG. 29 shows an example of "tiling" of the outer surface of a solenoidal magnet coil such as that of Fermi Lab or the ATLAS experiment.
Figure 30:
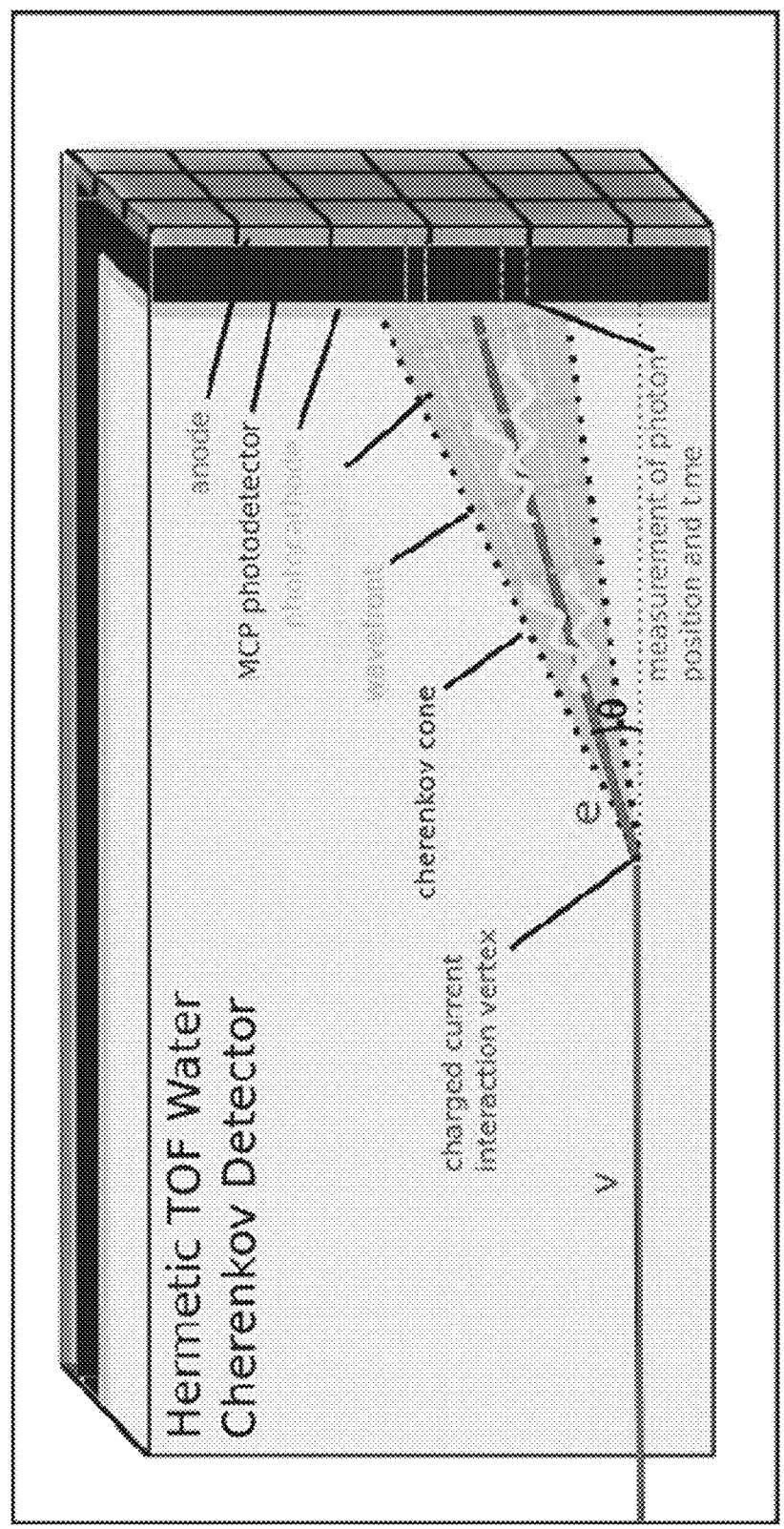
FIG. 30 shows a "cartoon" of one wall of a large "hermetic" water Cherenkov neutrino detector, with the wall covered in large photo-detector panels. The time and space resolution allows reconstruction of the Cherenkov photons as an evolving ring collapsing onto the wall, so that the angle of the track, and the origin, may be reconstructable.
Figure 31A:
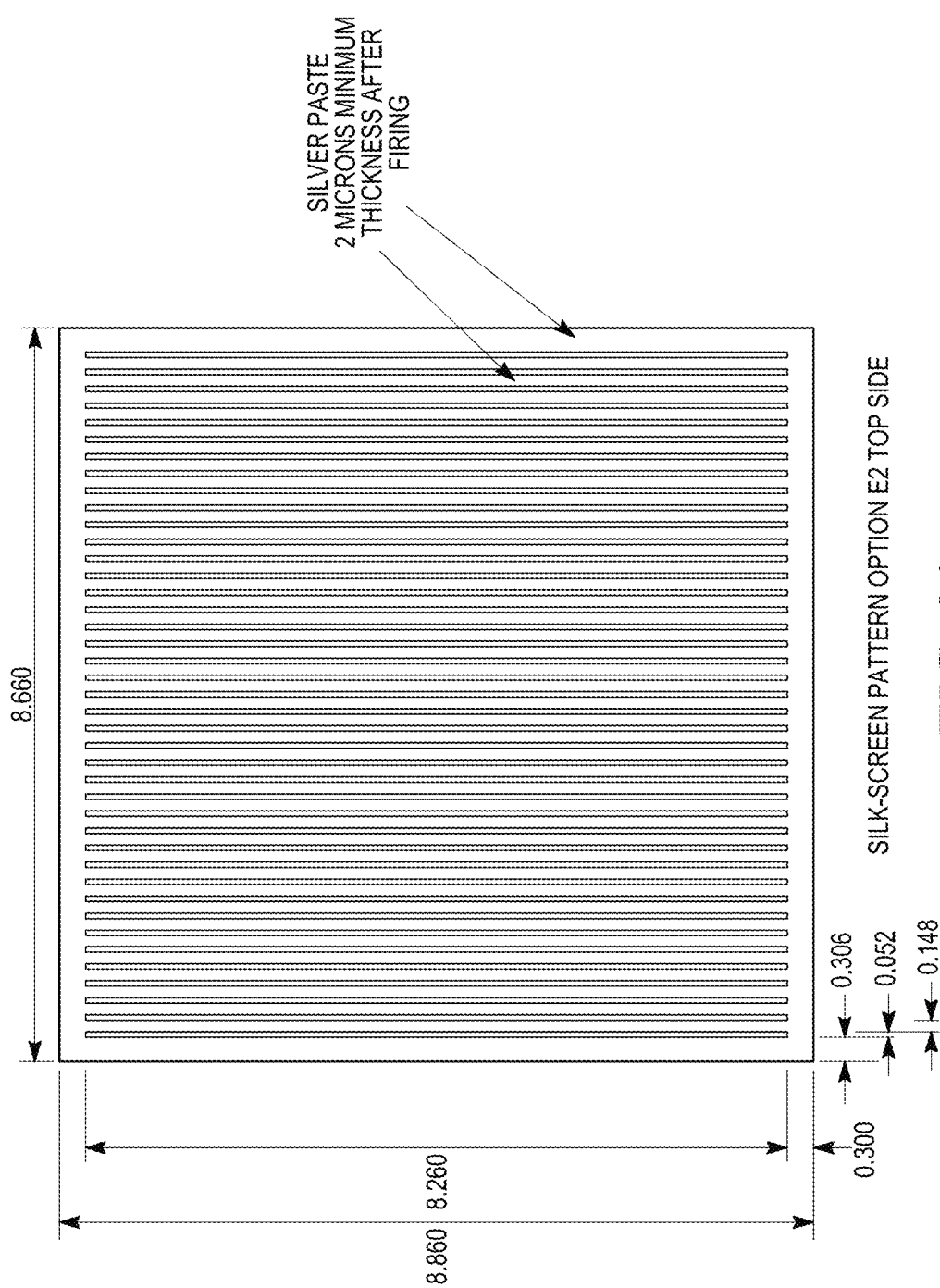
FIGS. 31A-B are illustrations of an Inside-Out design. In this option, the sealing surface under the side-wall is continuous, so that the frit seal between the side-wall and the metalized top surface of the anode has no penetrations under the side-wall.
Figure 31B:
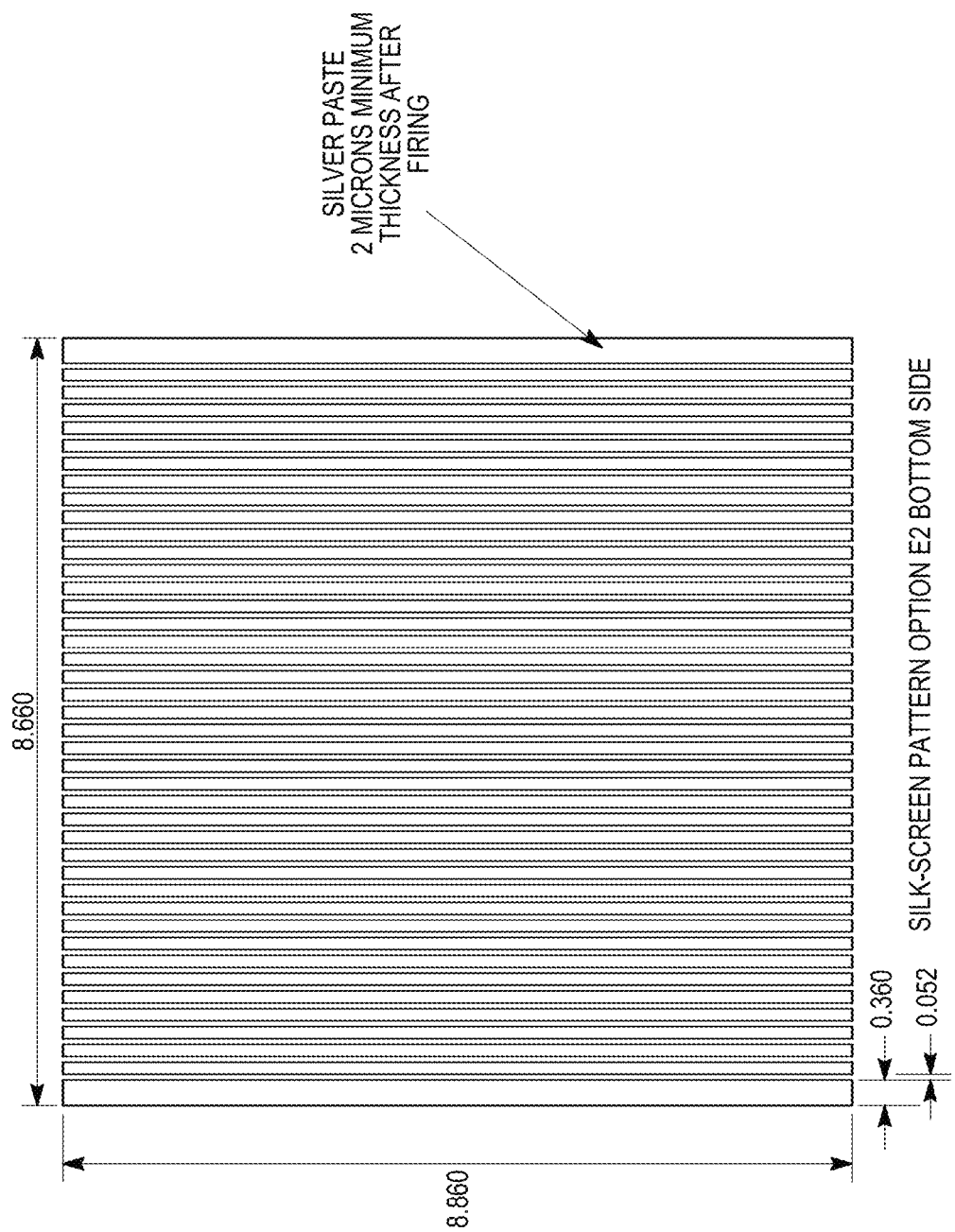

FIG. 23 illustrates a re-configurable small-animal PET system that employs 4 cFP detectors. These detectors are approximately 8×8 cm$^2$ in size and contain 10 mm thick LSO scintillators. With this detector size, a whole mouse (which is 7 cm long) can be covered by one detector and a rat (which is 15 cm long) by two side-by-side detectors. The choice of 10 mm LSO scintillators provides a good tradeoff between sensitivity and DOI blurring in this application. Four stationary scanner geometries are considered for meeting different interests in small-animal imaging applications:

Geometry (a) (shown as (a) in FIG. 23): This box geometry provides an FOV of 8×8×8 cm$^3$ useful for general rodent imaging. It generates complete-view data and no substantial DOI blurring.

Geometry (b) (shown as (b) in FIG. 23): This geometry comprises two opposing detector heads, each of which contains two stacked-up cFP detectors. It provides an FOV of 8×8×d cm$^3$ where d is the spacing between the detector heads. The design interest here maximizes the sensitivity in mouse imaging, possibly at the cost of the spatial resolution. Therefore, one can use a small d (tight spacing) to increase the detection solid-angle and stacked cFP detectors to increase the detection efficiency with binary DOI measurement. The scanner is stationary and thus produces incomplete-view data. Also, the DOI blurring increases as d decreases.

Geometry (c) (shown as (c) in FIG. 23): This geometry also comprises two opposing detector heads, each of which now contains two side-by-side cFP detectors for, for example, performing simultaneous imaging of multiple mice. The imaging FOV is 16×8×d cm$^3$, where d is the detector head spacing. Again, the scanner is stationary and one can use a small d for increasing the sensitivity. The above considerations for incomplete view and DOI blurring apply.

Geometry (d) (shown as (d) in FIG. 23): This geometry is identical with Geometry 23(c), but with its long side oriented along the axial direction of the subject. The object of this geometry is to provide high-sensitivity, for, for example, whole-body imaging of rats.

The DOI-blurring and incomplete-view problems in configurations 50(b)-(d) can be addressed by using model-based image reconstruction methods. The well-validated GATE package has been used to conduct Monte-Carlo simulations to examine the sensitivity properties. The simulation parameters are: 81.3×81.3 mm$^2$ cFP detectors consisting of an 34×34 array of 2.1×2.1×10 mm$^3$ LSO crystals with 2.4 mm crystal pitch, air in crystal gaps 15% energy resolution, 2 ns coincidence timing resolution, 250-750 keV energy window, 6 ns coincidence window, 250 ns paralyzable dead time model for each cFP, no LSO natural radioactivity, back-to-back gamma rays with no positron range or photon acolinearity, air spacing between the stacked cFP detectors in Geometry 23(b) for the space of the photo-detectors and electronics, air in this space.

Line sources and phantoms defined in the NEMA NU4-2008 standard were modeled to evaluate the sensitivity, scatter fractions, random fractions, and noise-equivalent count rates (NECRs) for the geometries described above.

FIG. 24 illustrates a table that shows the sensitivity of the scanner to a point source in air placed at the center of the scanner (central sensitivity) for various detector-head spacing and energy windows. It is clear that Geometries (c) (illustrated as (c) in FIG. 23) and (d) (illustrated as (d) in FIG. 23) have substantially identical central sensitivity. All four scanner geometries yield high central sensitivity in comparison with previously known systems. The highest central sensitivity is obtained by Geometry (b) (illustrated as (b) in FIG. 23) with 4 cm spacing, reaching 18.6% (15.6%) when using a 250-750 (450-750) keV energy window. At 8 cm spacing, Geometries (a) (illustrated as (a) in FIG. 23) and (b) (illustrated as (b) in FIG. 23) have similar sensitivity and are more sensitive than Geometries (c) (illustrated as (c) in FIG. 23) and (d) (illustrated as (d) in FIG. 23).

FIG. 25 illustrates a table that shows the sensitivity to a 7 cm and a 15 cm long line source in air placed at the center of the scanner (in accordance with the NEMA NU4-2008 standard for evaluating the sensitivity to mouse and rat). For Geometry (c) (illustrated as (c) in FIG. 23), the line was also placed at 40.6 mm off-center to simulate multi-mouse imaging. A 450-750 keV energy window is used. It is observed that for mouse imaging Geometry (b) (illustrated as (b) in FIG. 23) with 4 cm spacing is most sensitive while for rat imaging Geometry (d) (illustrated as (d) in FIG. 23) with 4 cm spacing is most sensitive. Also, the gains in sensitivity with respect to the general-purpose Geometry (a) are larger with respect to the gains observed for central sensitivity, especially for rat. Thus, sensitivity depends on subject size. When optimizing a scanner configuration for long subjects (such as rats) using a fixed amount of scintillation material, it is preferable to increase its axial length rather than its thickness (Geometry (d) (illustrated as (b) in FIG. 23) versus (b) (illustrated as (b) in FIG. 23)) or angular coverage (Geometry (d) versus (a) (illustrated as (a) in FIG. 23)), provided that accurate image reconstruction is feasible. In fact, at 8 cm spacing Geometry (d) is observed to be more sensitive than Geometry (a) for both mouse and rat imaging.

FIG. 26 illustrates a table that shows scatter fractions (SFs) calculated by using the scatter phantom defined in the NEMA NU-4 2008 standard. It is observed that the SF depends strongly on the energy window but only weakly on the scanner geometry and spacing. When using a 450-750 keV energy window, the SF is 5% for mouse imaging and 10% for rat imaging. When extending the energy window to 250-750 keV, the SF increases to 15% for mouse and 30% for rat.

Since the SF only weakly depends on the scanner geometry and spacing, geometries that increase sensitivity also increase the NECR. A comparison of the NECR curves obtained for mouse or rats with various scanner geometries and various spacings, using a 450-750 keV energy window, following the NEMA NU-4 2008 standard shows that: (1) at the same spacing the NECR ordering for mouse imaging is Geometry 23 (b)>(d)>(c); (2) higher NECRs are obtained by using small detector-head spacing; and (3) at 8 cm spacing, Geometry 23 (b) has the highest NECR and the general-purpose Geometry 23 (a) has higher NECR than Geometry 23 (c) and (d). In this case, the NECR ordering now becomes Geometry 23 (d)>(b)>(c). At 8 cm spacing, Geometry 23 (b) and (d) both have higher NECRs than Geometry 23 (a), and (c) has the lowest NECR. Also, Geometry 23 (d) with 8 cm spacing has slightly higher NECR than (b) with 6 cm spacing. Thus, Geometry 23 (d) provides the best count-rate performance for rat imaging due to its long axial extension.

The table illustrated in FIG. 25 summarizes the NECR ratios obtained for scanner geometries with various detector-head spacing and various geometries to Geometry (a) (illustrated as (a) in FIG. 23). The results indicate that using the same hardware resources the NECR can be doubled from the general-purpose Geometry (a) by employing geometries that are matched better with the imaging applications: Geometry (b) with 4 cm spacing for mouse imaging and Geometry (d)

with 6 cm spacing for rat imaging. However, these geometries have tight spacing that may make animal handling more difficult, and more advanced and computationally intensive reconstruction algorithms are preferable for dealing with the incomplete-view and DOI-blurring issues in these geometries. Also, the higher NECRs are obtained at the expense of spatial resolution.

The throughput of multi-subject imaging with Geometry (c) was studied. The NECR for imaging two mouse/rat cylinders (in accordance with NEMA NU-4 2008) placed at 40.6 mm off-center) to the NECR for imaging a single mouse/rat cylinder placed at the center were compared. The resulting NECRs at low activities for various detector-head spacing showed that the two-subject to one-subject NECR ratios for imaging mouse were found to be 0.87, 0.78, and 0.72 at 4 cm, 6 cm, and 8 cm spacing, respectively. For rat, the ratios were found to be 0.79 and 0.73 at 6 cm and 8 cm. All ratios are greater than 0.5; therefore, there can be a net gain in the imaging throughput by employing two-subject imaging. In addition, larger ratios are obtained by using smaller spacing.

Simulation studies show that using four cFP panels different scanner geometries can be formed to yield substantially different sensitivity and FOV properties for different rodent imaging applications. It is shown that a large axial FOV is preferred for achieving high sensitivity, especially for long subjects such as rat. The higher-sensitivity geometries can generate incomplete-view data and considerable DOI blurring, but it will be appreciated by one skilled in the art that these issues can be addressed by employing model-based image reconstruction. However, there is a tradeoff between sensitivity and resolution.

Applications of the MCP-PMT-TL include PET, muon cooling, neutrino detectors, and collider TOF systems. In certain embodiments, the tile has no pins penetrating the vacuum envelope and no internal connections. In certain embodiments, the tile has subassemblies consisting of the tile base, the MCP "stack", the getter, and the window. The MCP stack and the tile base can be pre-assembled so that glove-box pre-assembly of all but the window is possible before the tile enters vacuum for the bake, scrub, photocathode deposition, and top seal.

The manufacturing process can take advantage of the fabrication by ALD of the MCP surfaces from ultra-clean materials, with no unknown contaminants or dirt. One can consequently start with the bulk of the surface area being already baked and clean; the surfaces preferably remain sterile during the transfer to vacuum assembly. Preferably, this idea is extended to the other interior surfaces: spacers, sidewalls, and anodes, so that all surfaces are man-made at the time of assembly.

The following patents and publications describing atomic layer deposition are hereby incorporated by reference in their entirety: U.S. Pat. Nos. 8,148,293, 9,040,113, 8,518, 845, 8,318,248, 8,143,189, 7,972,569, 8,012,860, 8,258,398, U.S. Patent Published Application Nos. 2006/0251875, 2006/0222850, 2004/0178175, and 2007/0257265, U.S. Pat. Nos. 7,426,067, 7,713,907, 7,709,056 and 7,625,840 and International Patent Application PCT/US2005/020596.

The manufacturing process can be capable of automated process control and data acquisition (e.g. temperature, time, photocathode quantum efficiency and dark current, etc.) for each internal step. The tiles can be, for example, 8 inches by 8 inches=64 square inches, and the tile size can be continuously scaled according to manufacturing and performance convenience. The tiles may be connected in a planar array so that the transmission line anode termini of each tile are in electrical contact with the transmission line anode termini of adjacent tiles to form supermodule arrays, such that the transmission line signal readout is implemented at the free transmission line anode termini but not necessarily at the contacting termini at the adjacent tile interface. Supermodules are scalable, in that m×n supermodule arrays may be prepared, where m is equal to or greater than one and n is equal to or greater than one.

An exemplary manufacturing process may include the following steps. Note that all steps after the transfer into the vacuum assembly facility (VAF) are preferably in vacuum until the last one. 1. Tile base fabrication: QA, cleaning, and sealing, of sidewalls and anode plates; 2. QA and preparation of Incom plates and glass spacers; 3. QA and preparation of windows; 4. QA and preparation of getters; 5. ALD of spacers to a specified resistivity (preferably much lower than the MCP resistivity, so it will dominate); 6. Bonding of Gap-3 spacer to anode in Gap-3 2-mil-tolerance jig; 7. Bonding of Gap-1 and Gap-2 spacers to MCP1 and MCP2, respectively in their 2-mil-tolerance jigs; 8. Bond MCP1 and MCP2 together (both already have their spacers on them); 9. ALD the MCP sandwich to a sheet resistance of, for example: $10^7 \Omega$ per square; 10. Pure-gas transfer of, for example, more than 6 MCP sandwiches from ALD facility to vacuum assembly facility (VAF); 11. ALD the tile-bases at a relatively low resistance; 12. Pure-gas transfer of, for example, more than 6 tile-bases into VAF; 13. Vacuum baking of tile-bases; 14. Vacuum baking of MCP sandwiches and tile bases; (alternatively, one can use a separate chamber for bases and sandwiches to avoid contaminating the ALD surfaces, or alternatively load a sandwich into a clean tile-base and then vacuum-bake both); 15. Vacuum installation of sandwiches, getter strips into tile-bases (at this point one has a complete tile except for the window); 16. Vacuum transfer to scrub stations; 17. Plasma clean of windows, vacuum bake; 18. Photocathode shoot (for example, using a Au foil PC); 19. Vacuum transfer of window and tile to the top-seal chamber; 20. Vacuum hook-up HV, DC-ground; electronic test (preferably using tray-equiv transmission lines below tile); 21. Cold-seal preparation and compression; 22. Test hermeticity in situ; 23. Full function test: dark current, QE, gain, etc.; 24. Store module in output magazine/load-lock; 25. Transfer batch to air. In certain embodiments, ALD can be used on the anode and sidewalls too. In certain embodiments, if all surfaces in the tile base (except the getter) are made with ALD, one can first assemble the complete tile-base and then vacuum-bake the completed tile-base assembly. In certain embodiments, one can use a fixed MCP itself illuminated by a light source as the source for the scrubbing of the processed MCPs. In certain embodiments, one can assemble the pairs of plates before scrubbing.

A typical electrical circuit for the large-area MCP-PMT development, including a scheme for an internal HV distribution is described. A current string, which is composed of series-resistors with stiffening capacitors, supplies current to the photocathode and micro-channel plates that form the amplification section of a large-area planar photo-detector. The design has the capacitors and resistors completely inside the vacuum volume, fed by metalized surfaces on the top and bottom plates of the package, with no penetrations of pins necessary through the side walls or bottom plate.

Embodiments of a mechanical design for a large-area "frugal" fast planar photo-detector (MCP-PMT-TL) based on glass packaging are described. This generic design can be customized in parameter space for different applications with different requirements. For example, cost, area, and, in certain embodiments, quantum efficiency are important parameters for large water Cherenkov neutrino detectors; time resolution, occupancy, depth-of-buffer, and thinness are key for high-energy physics collider detectors; cost, footprint, data reduction, and system issues are important for medical imaging, and cost and ease of manufacture are preferred for the adoption of these for digital calorimetry.

The mechanical design is preferably intimately connected with the electrical design, as might be expected for a large object with a high ($\approx 10^6$) gain and a bandwidth in the multi-GHz region. The paths for the high-frequency (RF) signals consist of 50-ohm strip lines on the anode, with each of the strip line pairs being read out differentially on each end by fast (20 GS/s) wave-form sampling chips. A typical HV DC path is described herein. In certain embodiments, the high frequency signal path is not completely decoupled from the DC path, as charge has to return to the MCPs, and capacitive decoupling around the edges of the Burle 2" Planacons is preferred to help with ringing.

Figure 32:
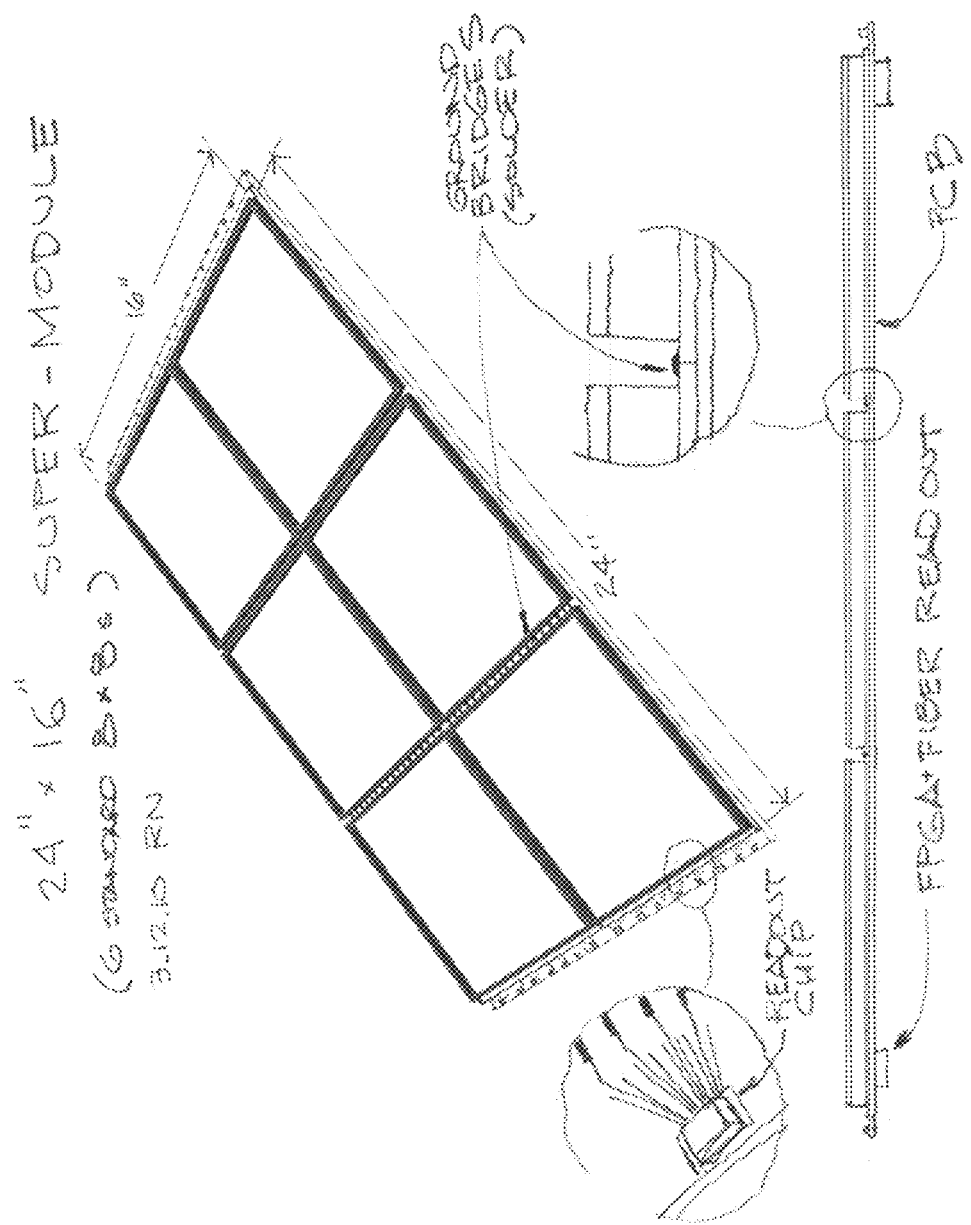
FIG. 32 shows an embodiment of the basic "SuperModule" layout of 6 tiles in a 3×2 array, forming a unit with a photo-sensitive area of 24"×16". The SuperModule can comprise the following tiles, a tray, a lower anode board, an analogue board, and a digital board. In certain embodiments of the supermodule arrays, the transmission line anode ends of adjacent tiles are contacted (in some embodiments, by ground bridges formed from solder) and the readout chips contact the transmission line anode ends to enable waveform sampling and waveform detection with timing information that can be analyzed to provide both spatial and temporal information about a collision, between an electron and a transmission line anode within the hermetically sealed tile module, which induced the electric signal along the transmission line external to the hermetically sealed tile module.
Figure 33:
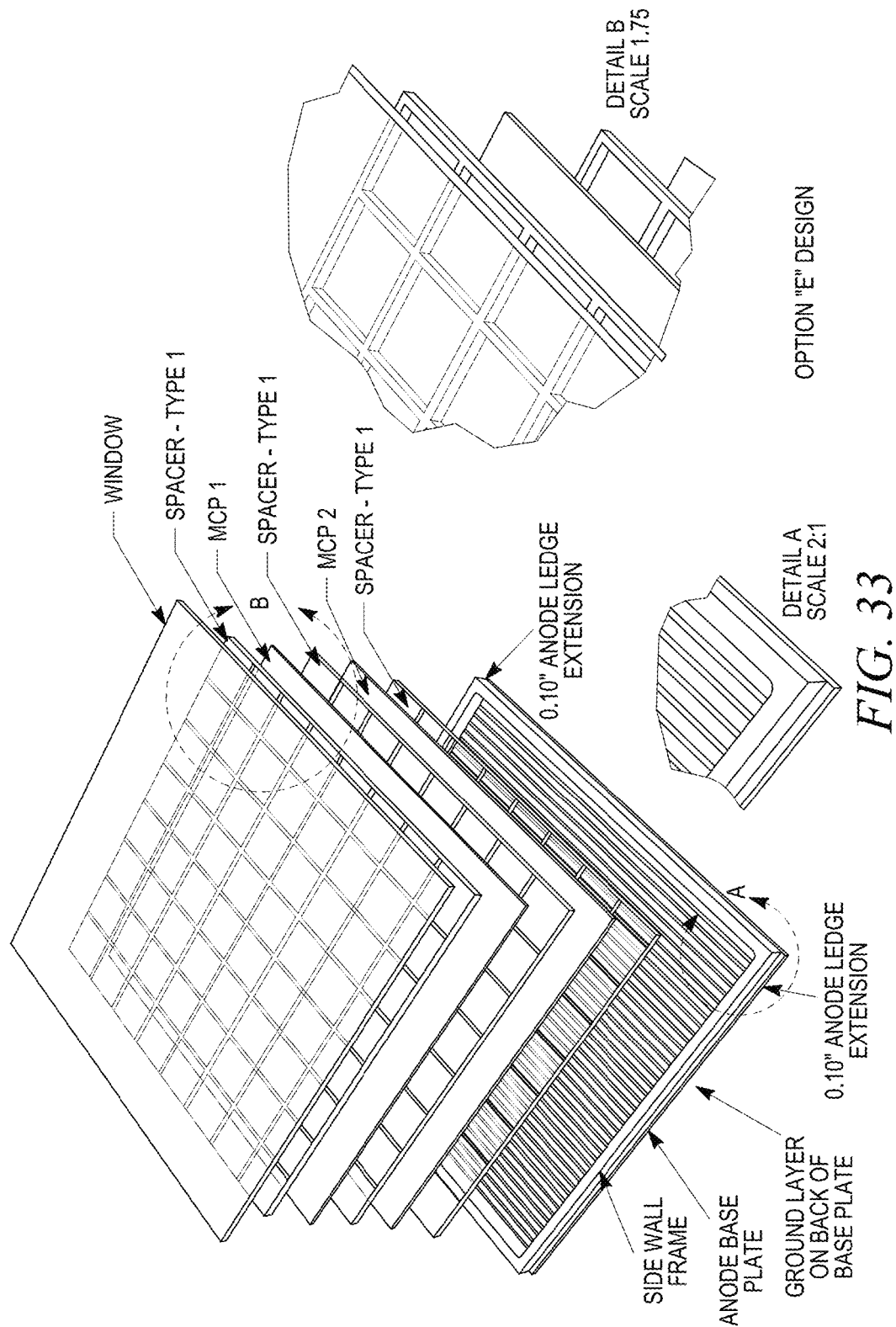
FIG. 33 shows an embodiment of a MCP-PMT-TL photodetector, including a window with photocathode coating on the inside surface, a spacer comprising a grid, two MCP mutually separated by a second spacer, a third spacer, a side wall frame, an anode base plate comprising transmission lines and a dielectric base plate substrate, and a ground layer on the back of the base plate.

Certain embodiments of the basic unit of the large-area glass-based photo-detector are an 8"-square MCP-PMT sealed tube ("tile"). These tiles may be assembled in a larger "Supermodule" with a common readout. FIG. 32 shows an embodiment of the basic "SuperModule" layout of 6 tiles in a 3×2 array, forming a unit with a photo-sensitive area of 24"×16". The SuperModule can comprise the following tiles, a tray, a lower anode board, an analogue board, and a digital board. In certain embodiments of the supermodule arrays, the transmission line anode ends of adjacent tiles are contacted (in some embodiments, by ground bridges formed from solder) and the readout chips contact the transmission line anode ends to enable waveform sampling and waveform detection with timing information that can be analyzed to provide both spatial and temporal information about a collision, between an electron and a transmission line anode within the hermetically sealed tile module, which induced the electric signal along the transmission line external to the hermetically sealed tile module.

Figure 9:
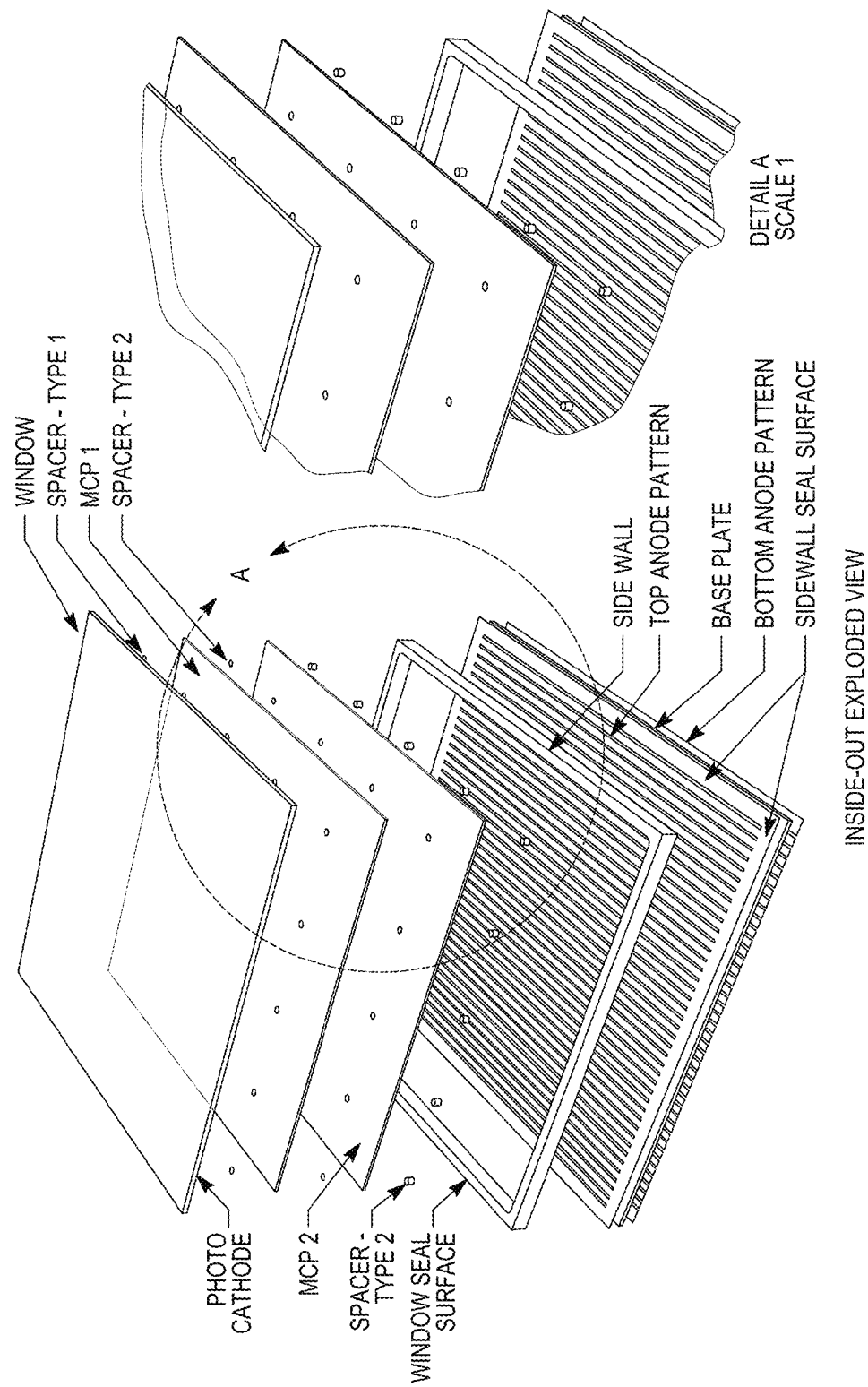
FIG. 9 illustrates an inside-out exploded view of an 8 in×8 in flat panel photodetector, showing constituent layers. The top layer is the front window and a photocathode. The second layer comprises spacers. The third layer comprises one or more MCPs, separated by spacers. The fourth layer is a side frame. The fifth layer is, in this embodiment (the inside-out configuration), the shorted and grounded top transition line anode pattern (other embodiments are shown in FIG. 17 and FIG. 21 (Right)), the sixth layer is the base plate, and the bottom layer is the bottom anode pattern, with non-shorted transmission lines, the ends of which provide for signal readout (for example, see FIGS. 3A-F). In this embodiment of the device, all strip lines on the top of the glass are shorted together by the metal coating that bonds the glass frame to the anode plate. In some embodiments, the frame can be attached to the anode by, for example, firing silver paste, high-temperature indium seals, or by sputtering, or evaporating to form a seal. The photodetectors are preferably assembled and sealed under vacuum conditions so that the photocathode, microchannel plates, and top anode pattern operate at a pressure below ambient pressure. The bottom anode pattern is adhered to the outside of the base plate and does not operate under vacuum conditions.
Figure 10:
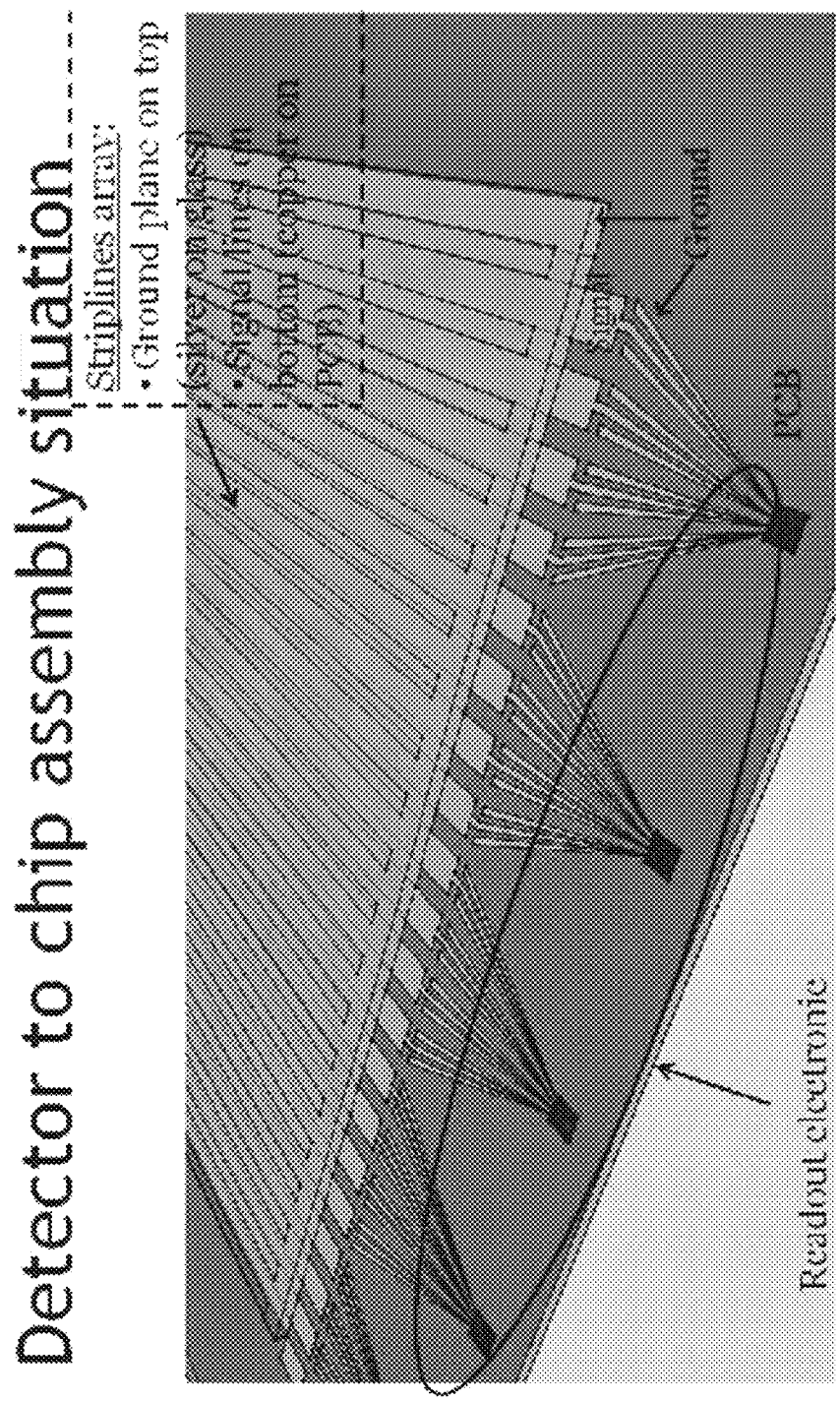
FIG. 10 illustrates an example of the "inside-out" configuration of an embodiment of the photodetector in which the bottom anode pattern strip lines (signal lines on bottom, copper on a PCB) outside of the vacuum are coated onto a printed circuit board (PCB), which is brought into contact with the base plate, above which is the ground plane transmission pattern strip lines (silver on glass) so that each signal transmission line on the PCB is aligned with a ground strip line inside the vacuum. Transmission line readout electronics are present for waveform sampling of the electric signal on the signal transmission lines (relative to the aligned grounded transmission lines).

Certain embodiments of the tiles are sealed glass vacuum tubes, for example, 8.86" by 8.66", with a sensitive area of 8-inches square. HV can be brought in to the vacuum volume by the electrode on the underside of the window; ground can be brought in by the, for example, silver conducting surface on the anode plate. There need be no other external connections in certain embodiments (signals are collected on strip lines on the top of the anode, and these are all connected as ground at the interface between the vacuum and the outside, under the sidewall.) FIG. 9 shows an exploded view of an embodiment of the tile. Starting at the top, one sees the window with the photocathode on its inner surface, the Gap 1 spacers, MCP-1, the Gap 2 spacers, MCP-2, the Gap 3 spacers, and the top conductor of the strip-line transmission lines.

Figure 16A:
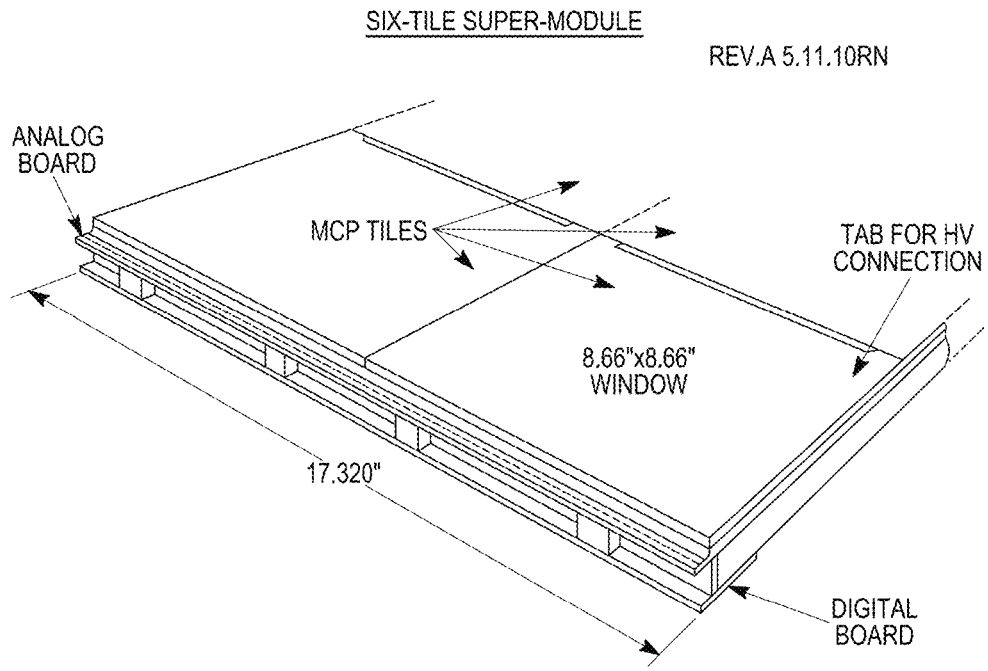
FIGS. 16A-B show a typical 6-tile supermodule showing the tiles, the Analog Board with front-end chips, and the Digital Board with the clock cleaner, FPGA, power and HV connectors, and serial interface.
Figure 16B:
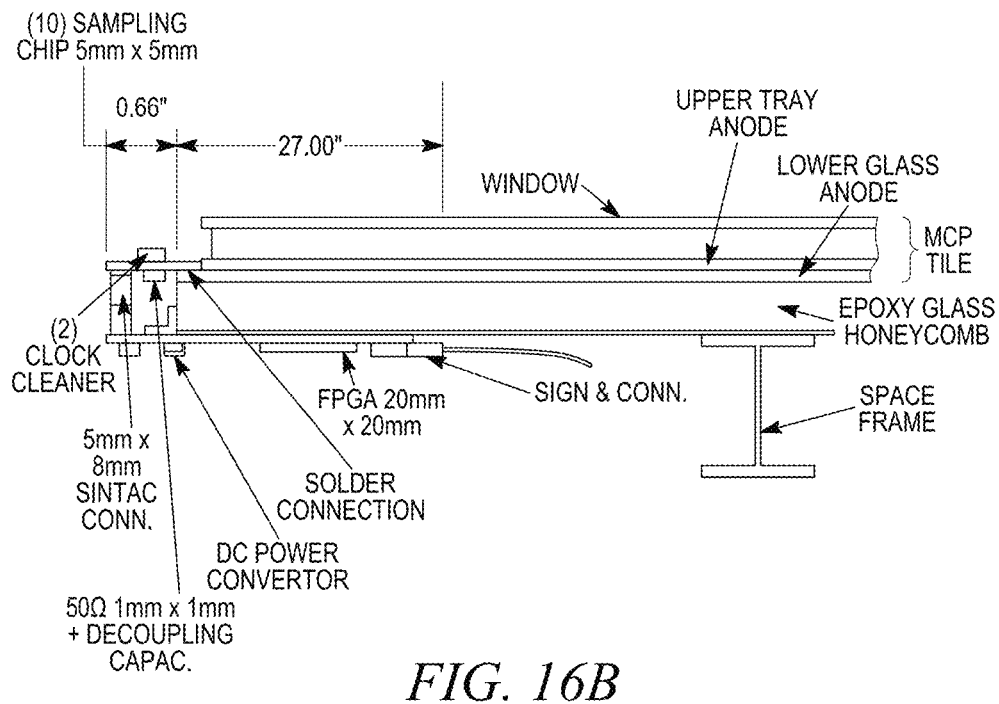

Certain embodiments of the supermodule tray comprise a lower anode board, an analog board, a digital board, and, for example, a honeycomb support structure. FIGS. 16A-B show a 6-tile supermodule embodiment including tiles, an analog board with front-end chips, and a digital board with a clock cleaner, FPGA, power and HV connectors, and a serial interface.

Certain embodiments of the lower anode board include a, for example, 27"-long printed-circuit card with the strips that form the lower half of the strip-line pairs on its upper surface.

Certain embodiments of the analogue boards comprise a pair of printed-circuit cards, one at each end of the lower anode board, on which the front-end chips are mounted.

Certain embodiments may contain 40 strips per tile, providing, for example, 80 strips total at the ends of the tray. Other embodiments have 2 analog cards per end with 10 chips each, rather than a single one with 20. The analog boards provide the transition between the long strips, which are on a 0.2" pitch, and the front-end chips, which can have pins spaced on a, for example, 114 micron pitch. In certain embodiments, these are soldered onto the lower anode board with the analog board strip-side down.

Certain embodiments of the digital board comprise a pair of printed-circuit cards, one at each end of the tray on the backside (the side away from the tiles) of the honeycomb support structure. The digital board can house the FPGA, the local jitter-cleaner chip, serial link, and power connectors, and can be connected electrically to the ASIC outputs from the analog board.

Figure 17:
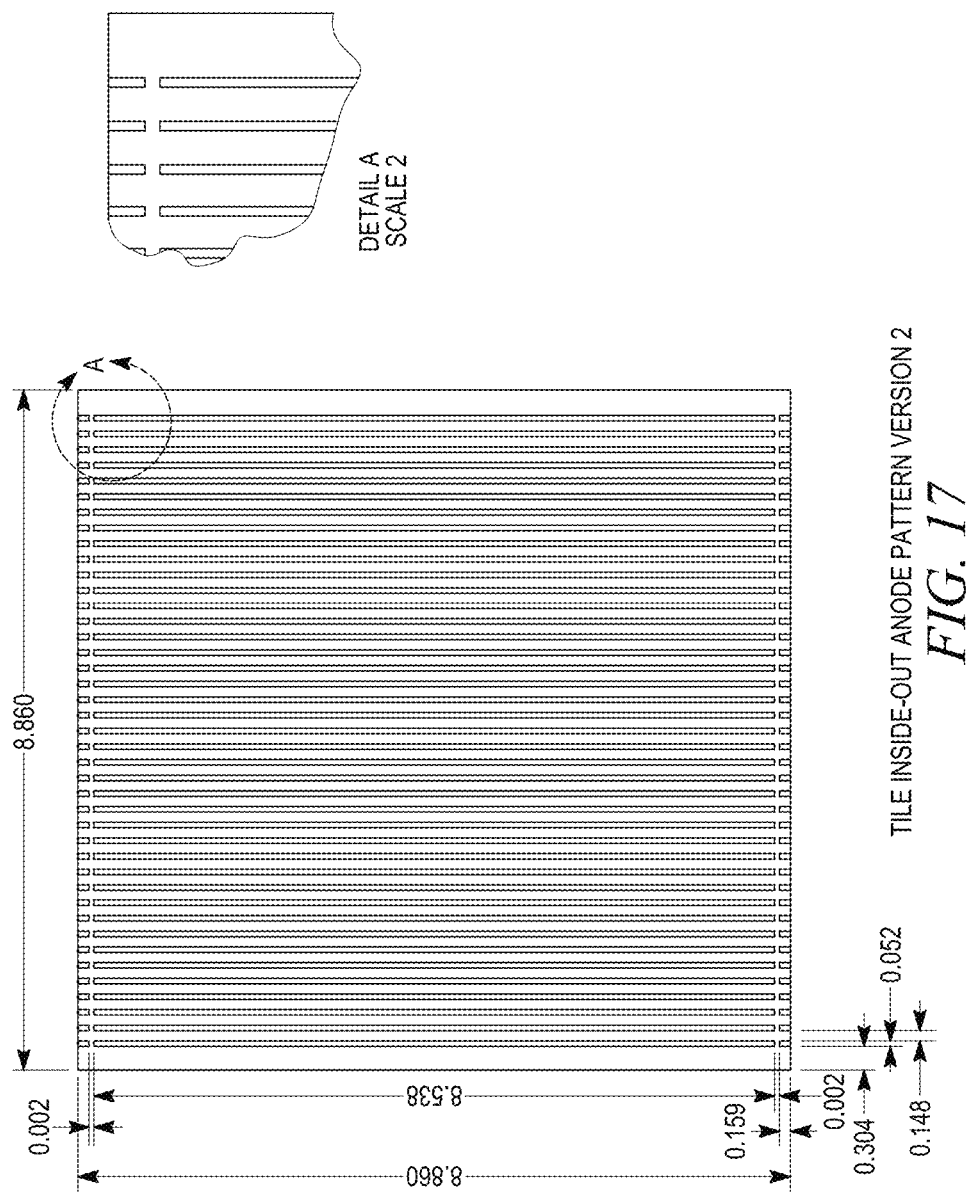
FIG. 17 shows ground anode traces in the "inside-out" design, showing the interconnection between the traces under the sidewall (see Detail A). The interconnection has a mechanical function, preventing a direct path for vacuum leaks through the bottom seal along the strips. Electrically it provides a dead short DC connection for the "ground" side of the signals, while at RF frequencies the lines function independently as the top traces of their transmission strip lines pairs.

The inside-out photodetector shown in FIG. 9 comprises a top layer and bottom layer of transmission-line strips, with glass in-between. The width of the traces, thickness of the glass, and glass dielectric constant are all such that the lines are 50 ohms at a few GHz. In this embodiment, all the lines are shorted together on the top of the glass (i.e., the vacuum side) as shown in FIG. 17 so that the sidewall frame can be bonded to a homogeneous silver surface, rather than having to cross the strips. The shorted top layer transmission lines may be connected to ground at the metal seal or at an overhanging portion of the anode strip, which extends past the vacuum seal. The strips on the bottom layer provide the "signal" and those on top provide the "ground" for the signals on the lines, which are looked at differentially by the front-end chips at the ends of the lines. This is analogous to grounding the center conductor of a long cable and floating the braid—one still sees the differential signal at the end of the cable, although inverted. The bottom trace then can be on the top surface of the "Tray" rather than on the bottom surface of the tile, so that there are no signals that need to brought out of the vacuum volume of the tile. One only has to connect the grounds tile-to-tile or tile-to-tray, and this can be done with, for example, a copper strip along the tile edges.

In this embodiment, no signals need to be brought out through the sidewalls or back plate—the tile needs only to be stuck down on the tray. The signal path is thus very simple to construct.

A similar solution for the HV current path involves transmitting the HV to the photocathode and the four MCP electrode surfaces by metalization on the bottom side of the window (i.e., the vacuum side). The ground is the same ground as the signal, which is differential with respect to it to ameliorate power-supply common mode noise.

Figure 18:
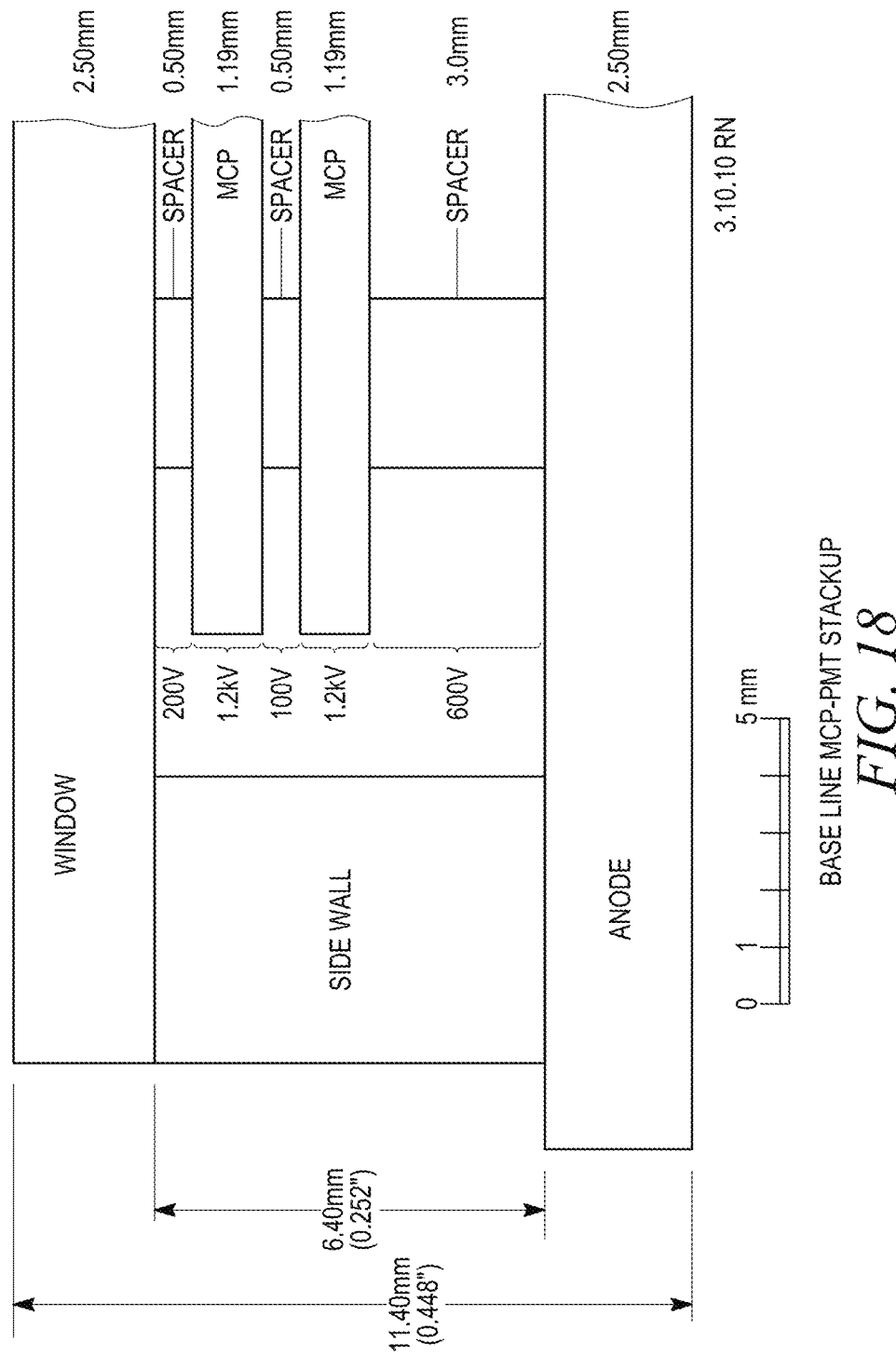
FIG. 18 shows the "stack-up" of an example tile embodiment. The resistive spacers enable application of appropriate voltages across each layer by maintaining uniform separation. Example values associated with one embodiment are shown. Gap 1 is at the top (photocathode to MCP1-In), and Gap 3 is at the bottom (MCP2-Out to Anode). HV enters at the top of the sidewall; ground enters and leaves under the bottom of the sidewall. Note that the values shown for gaps and voltages can be optimized.

FIG. 18 shows a side-view of an embodiment of the stack-up of the MCP layers. Gap 1 is at the top (Photocathode to MCP1-In), and Gap 3 is at the bottom (MCP2-Out to Anode).

Figure 19:
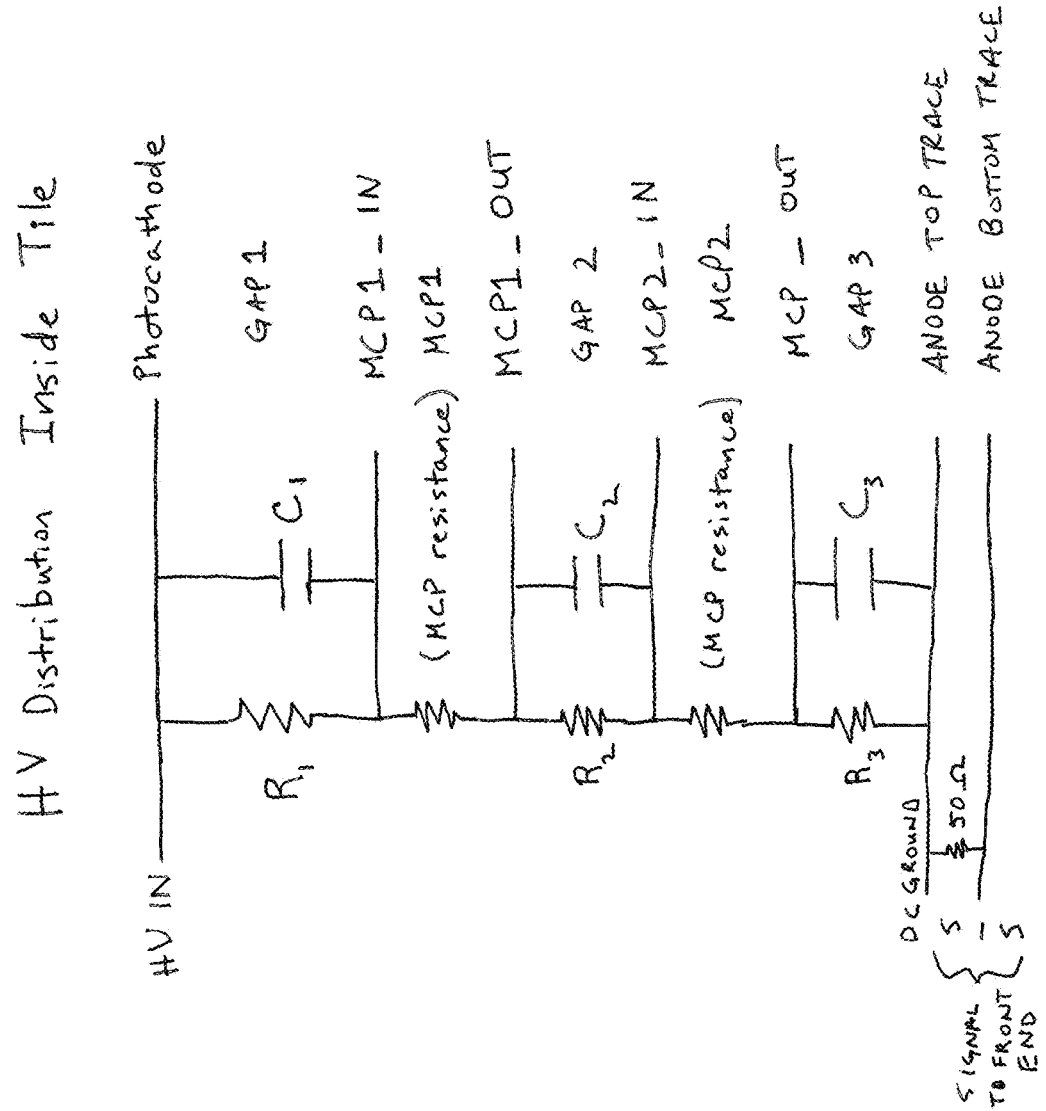
FIG. 19 shows a typical circuit diagram for the HV. The resistors and capacitors in each gap are preferably integral to the spacers.
Figure 20A:
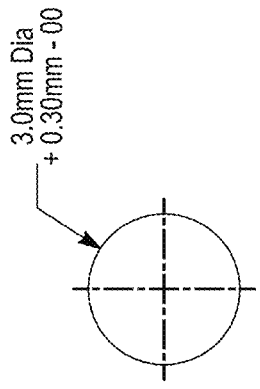
FIGS. 20A-D show typical dimensions of two kinds of spacers—Gaps 1&2 and Gap 3.
Figure 20B:
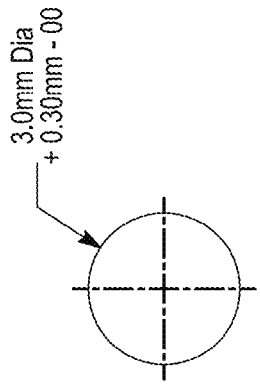
Figure 20C:
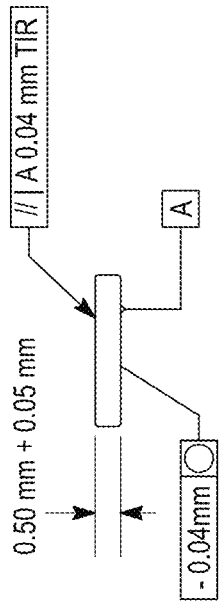
Figure 20D:
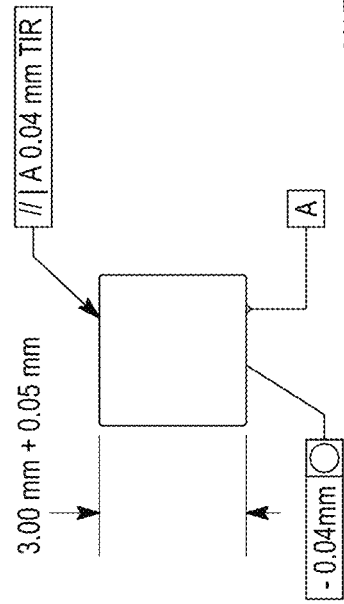

FIG. 19 shows a circuit diagram used in some embodiments of the HV. Resistors and capacitors in each gap are preferably integral to the spacers, for example, using ALD. Note that C3 stiffens the HV string at the point of highest current, after MCP2 where the gain is largest by a factor of 1000. Note that in a conventional PMT the voltage divider is stiffened for the last dynodes; in a two-MCP PMT as described here MCP2 has a gain of about 1000, comparable to the last 6-10 dynodes in a PMT.

As an example, a 1 MHz rate in an 8"-square tile, i.e. 16 kHz/in-sq, with a 100 mV output pulse of width 1 ns, driving 50 ohms (this is conservative, as the output pulses will be smaller) is described. The average current is then:

$$I = (\text{Rate})(I_{pulse})(\Delta t) \tag{5}$$

$$I = (1\ \text{MHz})(0.1\text{V}/50\ \text{ohms})(1\ \text{nsec}) \tag{6}$$

$$I = 10^6(2 \times 10^{-3}) \times (10^{-9}) = 2 \times 10^{-6}\ \text{A} \tag{7}$$

The string can carry 10 times this peak average current of 1 μA, i.e., one needs a supply string capable of supplying at least 20 μA.

Taking, for example, 10 M-ohm for the MCP resistance (8" by 8") as a starting point, and a nominal operating voltage for a single MCP plate of 1 kV for convenience of calculation, the current through the MCP is $$I = V/R = 10^3/10^7 = 10^{-4} = 100\ \mu\text{A} \tag{8}$$

which satisfies the current requirement by a factor of 5.

The resistance of each element in the string may then be calculated. There are a number of considerations on the gaps and voltages that can be determined by simulation and confirmed by measurements: 1. In certain embodiments, it is simpler to have the spacers in each of the three gaps to yield the same resistance per length. All spacers may, therefore, be made in the same batch, which improves the uniform resistance and behavior as a function of other factors, such as temperature, aging, contaminants; 2. In certain embodiments, a higher voltage and shorter path in Gap 1 can result in a lower transition time spreads (TTS); 3. In certain embodiments, a higher voltage in Gap 2 results in fewer pores being illuminated in MCP2, and hence a lower gain (fewer saturated pores) but narrower distribution (all pores saturated); 4. In certain embodiments, a larger Gap3 and lower voltage spreads the charge out over more strips, allowing better centroid localization and better uniformity.

In some embodiments, the HV chain starts with an external connection (outside the vacuum) to the metalization on the bottom side (inside the vacuum) of the top window (see FIG. 18). Table 1 gives the height, voltage, and resistance in each element. For simplicity, it is assumed the spacers have the same resistance per unit length.

TABLE 1

| Name | Height | V | I | $R_{Tot}$ | $N_{spacer}$ | $R_{spacer}$ | κ |
|---|---|---|---|---|---|---|---|
| G1 | 1.0 mm | 200 V | 100 μA | 2 M-ohm | 25 | 50 M-ohm | 5000 -ohm -cm |
| MCP1 | 1.2 mm | 1200 V | 100 μA | 12 M-ohm | — | | |
| G2 | 0.5 mm | 100 V | 100 μA | 1 M-ohm | 25 | 25 M-ohm | 5000 -ohm Ω-cm |
| MCP2 | 1.2 mm | 1200 V | 100 μA | 12 M-ohm | — | | |
| G3 | 2.5 mm | 500 V | 100 μA | 5 M-ohm | 25 | 125 M-ohm | 5000 -ohm -cm |
| Total | 6.4 mm | 3.4 KV | 100 μA | 32 M-ohm | — | — | — |

Table 1: The dimensions of the elements in the current string of the example shown in FIG. 18. Gap 1 (G1) is the photocathode-MCP1$_{IN}$ gap, Gap 2 is between the 2 MCP plates, and Gap 3 is the MCP2$_{OUT}$-Anode spacing. Each gap has 25 spacers made of 3-mm diameter glass rods, coated with ALD to achieve the resistance $R_{spacer}$ per spacer and hence a parallel resistance of $R_{Tot}$. The last column, κ, is the atomic layer deposition (ALD) sheet resistance in -ohm Ω-cm FIGS. 20A-D show the dimensions of the two kinds of spacers described in this example—Gaps 1 and 2, and Gap 3. Both are made from glass rod cut into precise lengths; the rod can be substantially CTE (coefficient of thermal expansion)-matched to the glass window and anode.

An approximate calculation of the ALD sheet resistance on the sides of the cylindrical spacer follows. The resistance of the spacer is given by:

$$R = \kappa L/A = \kappa L/(\pi t d) \tag{9}$$

where L is the length, A is the area of the resistive layer, d is the diameter of the spacer, and t is the thickness of the resistive layer. Putting in typical spacer values of L=0.1 cm, d=0.3 cm, t=100 nm=$10^{-5}$ cm, and R=50 mega-ohms (see Table 1), one finds the sheet resistance is $$\kappa = RA/L = R(\pi t d)/L = 5000\ \Omega\text{-cm}. \tag{10}$$

In a photomultiplier one typically stiffens the last several stages with increasingly large capacitors, and also has a cap across the HV-to-ground total string. The MCP design example described here effectively has only two stages, and so in this embodiment, it is only the second MCP that needs the stiffening. Each spacer adds local capacitance, with the total being the sum of the parallel caps.

There are two functions of these caps in this example: 1. stiffening the string so that the DC voltage doesn't dip after a pulse, and 2. providing an AC high-frequency return path for the fast pulse to diminish ringing (bypassing).

The charge in a single pulse is $$I\Delta t = 2\mu\text{A} \times 10^{-9} = 2 \times 10^{-15}\ \text{Coulombs} \tag{11}$$

If one wants to have charge for 1000 pulses stored locally, i.e., $2 \times 10^{-12}$ Coulombs, one needs a capacitance of $$C = Q/V = 2 \times 10^{-12}\ \text{Coulombs}/1000\text{V} = 2 \times 10^{-15}\ \text{Farads} = 2\ \text{fF} \tag{12}$$

which is tiny, and at the macroscopic level of the spacers is already supplied by the MCP plates.

The perimeter of the 2" Planacon may be bypassed with 3 capacitors per side, connecting the anode to MCP2-OUT. Each capacitor is 100 pf, and as they are small they are very low inductance. If each spacer is a capacitor, distributed bypassing capacitance is achieved.

In some embodiments, the relative resistances in the HV divider string shown in FIG. 19 determine the voltages across the MCPs and gaps. As the sheet resistance between the spacers and the MCPs is different, the ALD process may be broken up into two separate runs, one for the spacers and one for the MCP plates. In some embodiments, there is no gain in the gaps, and the dependence on the voltage may be mild. The MCPs, however, can have a strong dependence of gain vs voltage, typically a factor of 1.7 per 100V at 1.6 kV. Consequently the resistances of the two MCPs are preferably matched. For a 10% difference in gain from MCP1 to MCP2, the two preferably have an overall resistance difference less than about 1% (18V out of 1.6 kV gives a 10% gain change).

In summary, the tolerance for the absolute resistance of the spacers can be 10-20%, and, for certain embodiments, is not critical. The relative resistances for the spacers are preferably within about 10% of each other, as is expected if they are made in the same batch, for example. The tolerance on the average resistance for the MCPs is also not so critical, e.g. 10%. The operation of the two MCPs is, for certain embodiments, good if they have the same resistance within about 1-2%.

For certain embodiments, the tolerances on the capacitances may be very loose—up to about 50% even can be acceptable. It is preferred that all capacitors in a single batch come out the same within 10%.

Figure 21A:
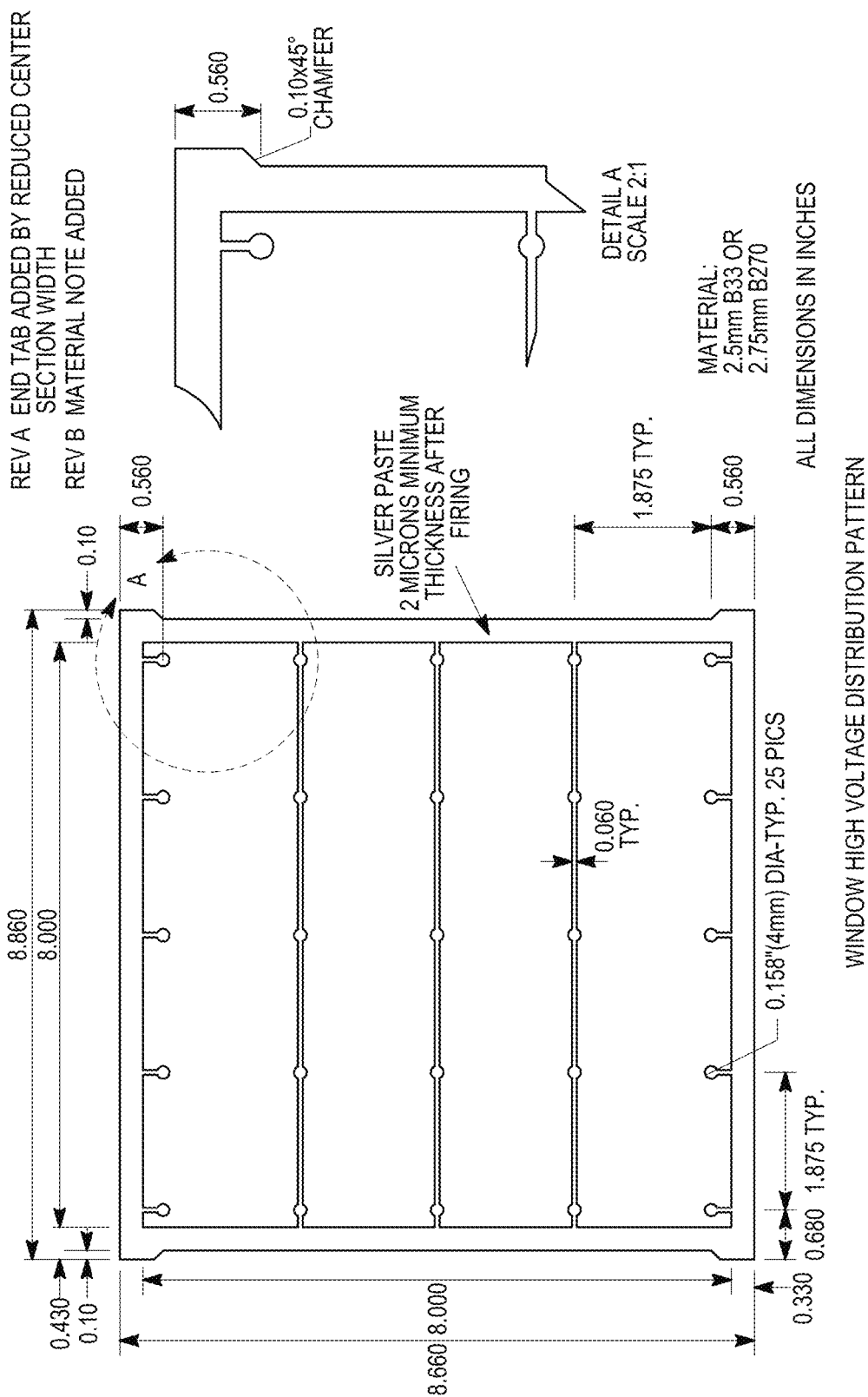
FIGS. 21A-B show typical electrode patterns on the window (FIG. 21A) and top of the anode (FIG. 21B).
Figure 21B:
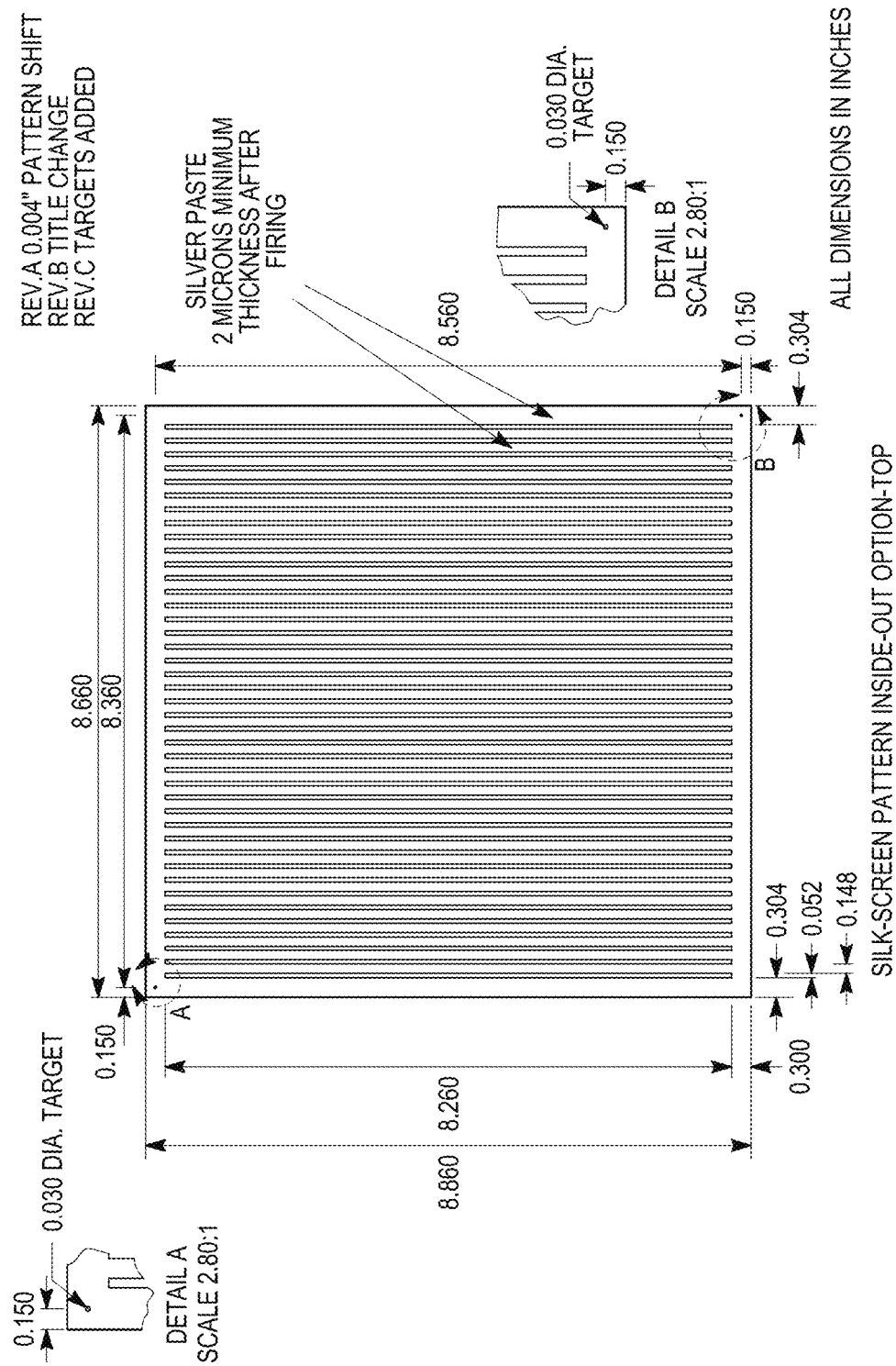

The pattern on the inside of the window, shown in FIG. 21A, can serve several functions: it provides a uniform metal surface for the top seal between the sidewall and the window; it distributes HV across the large photocathode so that there is no voltage drop in the PC itself; and it distributes current to the resistive spacers that form the HV string to ground, providing current for the MCP amplification.

The embodiments described here form a basic family of economical robust large-area photo-detectors that can be tailored for a wide variety of applications that now use photomultipliers. Advances in materials science and nanotechnology, complemented by recent innovations in microelectronics and data processing, all the basic concept of micro-channel plate detectors to be used in large-area economical photo-detectors with quantum efficiencies and gains similar to those of photo-tubes, and with inherent good space and time resolution. The new devices are designed so that certain embodiments may cover large areas economically, being a sandwich of simple layers rather than an assembly of discrete parts.

Glass capillary MCP substrates and conventional photocathode technologies, for example, can provide solutions for each of these components in some embodiments. The tiles may be mechanically assembled and existing photo-cathode technology may be extended to large area planar applications.

Higher quantum efficiency photo-cathodes based on nano-science morphology with customized work-functions and the adaptation of techniques from the solar-energy sector can be used in some embodiments of the large area detectors and can enable cheaper assembly techniques.

Atomic Layer Deposition (ALD) provides a powerful technique for controlling the chemistry and surface characteristics of photo-cathodes. In some embodiments, ALD also can be used to form the secondary emission surfaces of the channels one molecular layer at a time, including controlling the geometry of the electron cascade itself, to enable functionalization of channel-plate substrates with high gain and low noise. This capability allows the separation of the properties of the substrate material from the amplification functionality. For example, self-organized nanoporous ceramic (Anodic Aluminum Oxide, AAO) can provide low-cost batch-produced substrates in some embodiments, and substrates made from glass capillaries may be used in others.

Fast waveform sampling using CMOS ASICs at both ends of transmission line anodes allows the coverage of large areas with small numbers of channels, permitting excellent time and space resolution and a built-in noise identification and reduction mechanism.

Large-area, robust, and affordable photo-detectors can be transformational in a wide variety of areas. Applications include cheaper and more precise Positron Emission Tomography (PET) cameras in medical imaging, scanners for transportation security, and particle detectors in high-energy neutrino and collider physics, astrophysics, and nuclear physics. Because the new devices are planar, relatively thin, and physically robust, they require less volume and infrastructure in large-area applications for which photomultipliers are presently the current solution, providing additional economies and offering new measurement opportunities.

Herein is described a family of large-area robust photo-detectors that can be tailored for a wide variety of applications for which large-area economical photon detection can be transformational.

In addition to having excellent resolution, the new devices can be relatively economical to produce in quantity, being a simple sandwich of layers rather than an assembly of discrete parts. Because certain embodiments of the present invention are planar, relatively thin, and physically robust, there are additional economies associated with the overall system design for applications such as precision time-of-flight measurements at particle accelerators such as the LHC, RHIC, JPARC, Super-B, and the ILC; Positron-Emission Tomography; large-area detectors such as those being proposed for DUSEL; and non-proliferation security.

Photomultipliers are high-bandwidth, high-gain, current-source amplifiers, with high quantum efficiency (QE) for photons and the ability to resolve single photo-electrons. Photomultipliers (PMTs) can have excellent time resolution, and multi-anode PMTs allow spatial resolution as well. Specialized PMTs and hybrid variations can be tailored for specific high-precision uses. In addition, PMTs are robust, well-understood, easy to use, and can be quite inexpensive.

Micro-channel plate photomultipliers (MCP-PMTs) are an evolution from the basic principles of photo-multipliers, and have been developed to be a robust and mature technology. The carefully crafted planes of small pores, which form the amplification sections of the complete MCP-PMT device, have been thoroughly characterized, and sophisticated simulation programs and an extensive literature exist to predict their performance.

Micro-channel plate photomultipliers combine many of the virtues of photomultipliers with a relatively simple planar package construction that lends itself to scaling to large-area detectors. In addition, MCP-PMTs employ a local amplification construction with very small path-lengths for the photon conversion and electron multiplication, resulting in exceptionally fast rise times. The present invention has all these characteristics at once—in particular both large area and good time resolution. In one aspect, the present invention solves the problem of the complementarity (or trade-off) between time resolution and large transverse dimensions. The solution to this problem is an anode design that uses transmission lines digitized on both ends by waveform sampling to get position (from the difference in times on the two ends) and time (from the average). The solution is economical as the number of electronics channels goes as L, the transverse size of the MCP-PMT, rather than $L^2$, as in a pixel detector. The solution also scales well to large transverse sizes, up to many feet in a single panel. There is extensive successful experience with wave-form sampling integrated circuits; sampling chips exist now for many applications. It will be apparent to one skilled in the art that the present invention can be used together with designs made with silicon processes with small features, increasing the time resolution.

Certain embodiments can be used for high-precision time-of-flight systems, with resolutions below a few picoseconds, for, for example, new or upgraded detectors in particle and nuclear physics. Such a system can provide photon vertexing, multiple-interaction separation, and charge-particle identification.

Certain embodiments can be used for photo-detectors to construct a Positron Emission Tomography (PET) camera employing thin crystals in a sampling-calorimeter configuration, giving depth-of-interaction information as well as superb energy and time resolution. In addition this design can cut system costs as well as the cost of the photo-devices, resulting in a highly economical all-digital design of a clinical PET scanner with depth-of-interaction and TOF measurement.

Certain embodiments can be used for a large water Cherenkov detector with active photon coverage over essentially 100% of the surface area, using large-area planar MCP-PMTs. Photo-detectors with complete coverage and 100-psec-time and 1"-position resolution on each photon provides new capabilities, such as increased fiducial volume, electron separation, track reconstruction, and the introduction of a low magnetic field for charge determination. Certain embodiments can be used for diagnostics at accelerators and in beam lines, such as the MANX muon cooling experiment, or the Advanced Photon Source (APS) at Argonne National Lab.

Certain embodiments can be used for nuclear non-proliferation and transportation security. MCPs can be optimized for neutron or photon detection; large area panels can allow economical scanners for containers and trucks.

The different applications have different cost targets, as the areas covered and resolution requirements differ. For example, the surface area of the typical collider solenoid to be tiled by MCP-PMTs, or of a precision time-of-flight (TOF) plane at LHCb, is 30 m$^2$; at $100,000 per square meter the cost for a time-of-flight system with a resolution less than 10 ps for charged particles and photon-vertexing to 3 mm in the direction of flight system can be 3M$. Similarly, for Positron Emission Tomography, one planar 8"×8" MCP can typically replace 64 photo-tubes and bases, with additional reduced electronics costs, so that a target price of even as high as $1000 per MCP-PMT results in an order-of-magnitude lower photo-device cost as well as increased capability. For use in a large water Cherenkov detector, to economically achieve "hermetic" (close to 100%) coverage, which allows sub-radiation-length vertex resolution for electron separation and tracking capability requires the ability to integrate the individual components into large panels.

Commercial MCP-PMTs have been used in some examples, although these MCP-PMTs are typically a factor of 10 to 100 more expensive per unit area than a typical PMT. However, these commercial MCP-PMTs demonstrate the design principles for a simple MCP-PMT as a test-bed for scaling up the interior pieces to larger areas. FIG. 9, FIGS. 15A-F, and FIGS. 16A-B show an exploded view illustrating the concept of an economical large-area prototypical MCP-PMT module, which can be used for a much larger mosaic of either complete modules, or only the active layers in a single common shell (for example, a 4-foot-long anode transmission lines that spans multiple 8" panels with a bandwidth of over 1 GHz).

In order to best take advantage of large-area photo-detectors with good intrinsic space and time resolution, high-speed front-end electronics systems with low power and cost are preferred, as is collecting a signal over distances large compared to the time resolution while preserving the fast time resolution inherent in the small feature size of the detectors themselves. Space and time resolution are preferred in low-cost large-panel detector technologies as the noise rate from an emitter-based cathode or a batch-process MCP can, in certain embodiments, integrate over large areas to be significant. Spatial resolution allows the identification of "hot-spots" which then can be identified and eliminated in the local FPGA without ever entering the data stream. This is particularly important for very high QE photo-cathodes, which can have locally high dark-currents due to occasional hot-spots of field-emission due to surface defects or impurities. The locally high dark-currents in the front-end electronics can be automatically suppressed, with the FPGA itself keeping only an internal list of the areas that are bad actors. Maintenance of higher efficiency requires better space and time resolution. Since some of the applications such as large water Cherenkov detectors require thousands of square meters of photo-detector, the readout electronics are preferably integrated with the photo-detector itself in order to provide better analog band-width and to reduce the channel count and power.

An example of a physical design described here uses strip transmission lines which serve as the MCP anodes and face a set of grounded transmission lines inside the vacuum volume. A Photonis Planacon and transmission line readout anode card were used as an example, and scope traces of the two ends of the transmission line readout for a laser pulse equivalent to 50 photo-electrons incident on the Planacon were measured. Both ends of each line are sampled by a channel of the front-end waveform sampling chip. The time of a pulse is given by the average of the times measured at the two ends, and the position along the line by the difference. The orthogonal coordinate is given by which lines are hit and the relative pulse heights and shapes. Simulations of the integrated system for a 2-inch-square MCP give expected time resolutions down to several ps and spatial resolutions of 0.1 mm. In this example, the transmission line end signal measurements, illustrated in FIG. 11 and described above, yield a spatial resolution of 97 μm and a relative time resolution between the two ends of several ps, in agreement with the simulation.

The development of cheaper, more robust, large-area photo-detectors with intrinsic position resolution can be useful for a number of fields of science. It can also be used for health care and security.

The requirements for systems vary with the size of the system and the characteristics of the input signal. A system for the Fermilab MTEST test beam, for example, can consist of 4 stations totaling 0.01 m$^2$, with a resolution of better than 10 ps. A system for measuring 6-dimensional cooling of 250-MeV muons, for example, can consist of 4 stations, totaling 1 m$^2$, also with 10 ps resolution. An advanced micro-PET detector with TOF capability, for example, can require less than 0.5 m$^2$, with resolution in the 30-100 ps range. A system for an upgrade to an existing collider detector such as ATLAS at the LHC, for example, can require 30 m$^2$ at 1-ps resolution. A detector system that fully covers the proposed water Cherenkov system for neutrino detection at the proposed NSF/DOE DUSEL laboratory, for example, can require 30,000 m$^2$ at ~100 ps resolution.

For example, in the application of large-area photo-detectors as replacements for conventional PMTs in a water Cherenkov detector in DUSEL, a second-generation hermetic detector (100% photo-coverage) can measure events much closer to the detector wall with good efficiency, and so the ratio of fiducial volume to total volume can be much larger, with a significant savings in excavation, tank, and photo-detector cost for the same fiducial volume. The limit in span of the cavern wall is also significantly different in the vertical and horizontal directions, and so removing the constraint on height due to water pressure on the PMTs allows a change in the aspect ratio of the cavern, with possible additional large savings for the same volume. These two effects are clearly inter-dependent, as the latter depends on how close to the photo-surface one can work. The MCP-PMT devices do not need photo-multiplier bases, magnetic shielding, or implosion protection, changing the support and infrastructure requirements. A different geometry allowed by hermetic coverage and tracking ability allows the addition of a magnetic field for lepton sign determination. The addition of space and time information can also transform the detector into a tracking device, with reconstruction capability, allowing smaller uncertainties on measurements of things that exist, or more stringent limits on things that don't, for the same running time. This is related to the overall geometry of certain embodiments of the device, as a tall, thin, deep detector has much better properties with respect to scattering of the light, and may even be able to support a magnetic field for sign determination.

Another application of the MCP-PMT-TL technology is in all-digital readout, using time-of-flight to add a third-coordinate for faster reconstruction, for Positron Emission Tomography. The development of transmission line readout enables the development of new and cheaper PET detectors, as certain embodiments of the transmission line readout have a much smaller number of electronics channels, resulting in a lower cost.

The development of cheap planar photo-detectors with good time and space resolution can be transformational for PET, allowing much cheaper crystal arrays, much cheaper electronics, and a much faster reconstruction, allowing either lower dose or faster throughput. In addition the planar nature of the detector allows designs with better energy, space, and time-of-flight (TOF) resolution. FIG. 5 shows a possible sampling calorimeter design, in which sheets of polished crystal are interspersed with planar MCP-PMTs instrumented with transmission-line readout and cheap waveform sampling on both ends (Note that the waveform sampling electronics are located on both the top and bottom ends of the transmission line anodes, but are only shown here on the top ends). Each crystal is measured in x and y by the transmission lines on either side; addition spatial resolution in the orthogonal direction from the strips is obtained from the timing on the ends, so that the position of a cluster is over-constrained to eliminate noise from multiple clusters.

This design solves the "depth-of-interaction" problem, as each crystal can be thin and viewed from the side. Only light within the Snell's-Law transmission cone crosses the air gap to the MCP close to the point of interaction, limiting the transverse spread. The depth is limited by the thickness of the crystal. One can put wave-shifter or scintillator bars with embedded optical fibers to collect the light on the four edges of the crystal, providing better energy resolution and also a fast Level-1 (deadtime-less) trigger for the data acquisition.

In one example, a 2-crystal PMT setup included a Photonis MCP placed in front of the crystal, and the energy resolution and coincidence efficiency were measured. The change in resolution showed that the efficiency dropped by less than 5%.

A two-plane sampling-calorimeter "micro-PET" detector for small animal research was simulated, as described above, based on the design of FIG. 5. A full-size PET camera can be made out of similar modules.

In addition to having better spatial and time resolution, a flat panel MCP optical readout based on a single MCP panel has a cost advantage over a typical conventional PET detector. For example, consider the cost for a 4-photo-tube array reading out a 2"×2" crystal block versus the cost of a single plane of MCP with transmission-line anodes reading out an 8" by 8" array of pixelated blocks. A conventional block detector covers a 2"×2" area and uses four 1" diameter PMTs that cost $100 each, i.e., $400 for PMTs. A rough estimate is another $200 for readout electronics, and $50 for each photo-multiplier base, leading to a total of about $650 per 4 square inches, i.e., about $160/in². Taking $1000 as a conservative upper limit for a fully implemented 8"×8" MCP, or about $16/in², is an order-of-magnitude cheaper. The system can be also be more compact than conventional cameras.

Measuring at high precision the time-coordinate in addition to the transverse coordinates in a large-area photo-detectors gives a 3-dimensional picture, as the time-coordinate gives the distance from the plane to the origin of the photon. This leads to shorter exposure and reconstruction times, advantageous for radiation-sensitive scanners used in transportation security, such as for scanning shipping containers, baggage, packages, and other transported goods and vessels.

It is intended that the foregoing detailed description be regarded as illustrative, rather than limiting, and that it be understood that the following claims, including all equivalents, are intended to define the scope of this invention.

The invention claimed is:

1. A detector comprising:
    at least one substantially planar slab of radiation-creating material; and
    at least one substantially planar photodetector, the at least one substantially planar photodetector comprising:
        a window having an inside surface;
        one or more microchannel plates;
        a dielectric base plate having in inside surface;
        an electrically conductive coating on the inside surface of the base plate;
        a first spacer or first set of spacers separating the window from the one or more microchannel plates;
        a second spacer or second set of spacers separating the one more microchannel plates from the dielectric base plate; and
        if the photodetector comprising more than one microchannel plate, a third spacer or third set of spaces separating the microchannel plates; and
        a dielectric side frame hermetically sealed between the window and the dielectric base plate to form a vacuum volume in which the one or more microchannel plates and the spacers are disposed, wherein the seal between the dielectric side frame and the dielectric base plate comprises a frit seal.

2. The detector of claim 1, wherein the photodetector further comprises a photocathode and the photocathode is disposed in the vacuum volume with the one or more microchannel plates and the spacers.

3. The detector of claim 1, wherein the window is a glass window, the dielectric side frame is a glass side frame, and the dielectric base plate is a glass base plate.

4. The detector of claim 1, wherein the electrically conductive coating comprises one or more transmission line anodes.

5. The detector of claim 4, wherein the dielectric side frame is hermetically sealed to a portion of the one or more transmission line anodes that runs continuously under the dielectric side frame.

6. The detector of claim 5, wherein the window is a glass window, the dielectric side frame is a glass side frame, and the dielectric base plate is a glass base plate.

7. The detector of claim 4, wherein the one or more transmission lines are non-shorted transmission lines that extend from the vacuum volume, under the dielectric side frame, to the outside of the vacuum volume.

8. The detector of claim 7, wherein the window is a glass window, the dielectric side frame is a glass side frame, and the dielectric base plate is a glass base plate.

9. The detector of claim 1, wherein the electrically conductive coating provides a ground plane and further wherein an electrically conductive interconnection extends from the electrically conductive coating inside the vacuum volume, under the dielectric side frame, to the outside of the vacuum volume.

10. A detector comprising:
   at least one substantially planar slab of radiation-creating material; and
   at least one substantially planar photodetector, the at least one substantially planar photodetector comprising:
      a glass window having an inside surface;
      one or more microchannel plates;
      a glass base plate having in inside surface;
      an electrically conductive coating on the inside surface of the base plate;
      a first spacer or first set of spacers separating the glass window from the one or more microchannel plates;
      a second spacer or second set of spacers separating the one more microchannel plates from the glass base plate; and
      if the photodetector comprising more than one microchannel plate, a third spacer or third set of spaces separating the microchannel plates; and
      a glass side frame hermetically sealed between the window and the dielectric base plate to form a vacuum volume in which the one or more microchannel plates and the spacers are disposed.

11. The detector of claim 10, wherein the photodetector further comprises a photocathode and the photocathode is disposed in the vacuum volume with the one or more microchannel plates and the spacers.

12. The detector of claim 10, wherein the electrically conductive coating comprises one or more transmission line anodes.

13. The detector of claim 12, wherein the glass side frame is hermetically sealed to a portion of the one or more transmission line anodes that runs continuously under the glass side frame.

14. The detector of claim 12, wherein the one or more transmission lines are non-shorted transmission lines that extend from the vacuum volume, under the glass side frame, to the outside of the vacuum volume.

15. The detector of claim 10, wherein the electrically conductive coating provides a ground plane and further wherein an electrically conductive interconnection extends from the electrically conductive coating inside the vacuum volume, under the dielectric side frame, to the outside of the vacuum volume.

* * * * *

UNITED STATES PATENT AND TRADEMARK OFFICE
CERTIFICATE OF CORRECTION

PATENT NO. : 9,625,588 B2
APPLICATION NO. : 14/982387
DATED : April 18, 2017
INVENTOR(S) : Henry Frisch et al.

It is certified that error appears in the above-identified patent and that said Letters Patent is hereby corrected as shown below:

In the Specification

Column 1, Lines 19-22:
Delete the phrase:
"This invention was made with Government support under Grant Numbers NSF-PHY-0757-196 and DOE-DE-SC0002015. The Government may have certain rights to this invention."

And replace with:
--This invention was made with government support under grant number DE-SC0002015 awarded by the Department of Energy and grant number PHY0757196 awarded by the National Science Foundation. The government has certain rights in the invention.--.

Signed and Sealed this
Fifth Day of January, 2021

Andrei Iancu
*Director of the United States Patent and Trademark Office*